US009798751B2

(12) United States Patent
Birdwell et al.

(10) Patent No.: US 9,798,751 B2
(45) Date of Patent: Oct. 24, 2017

(54) METHOD AND APPARATUS FOR CONSTRUCTING A NEUROSCIENCE-INSPIRED ARTIFICIAL NEURAL NETWORK

(71) Applicant: University of Tennessee Research Foundation, Knoxville, TN (US)

(72) Inventors: J. Douglas Birdwell, Oak Ridge, TN (US); Catherine Schuman, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 389 days.

(21) Appl. No.: 14/513,280

(22) Filed: Oct. 14, 2014

(65) Prior Publication Data

US 2015/0106310 A1   Apr. 16, 2015

Related U.S. Application Data

(60) Provisional application No. 61/891,621, filed on Oct. 16, 2013, provisional application No. 61/934,052, (Continued)

(51) Int. Cl.
*G06F 17/30* (2006.01)
*G06N 3/02* (2006.01)
(Continued)

(52) U.S. Cl.
CPC ......... *G06F 17/30312* (2013.01); *G06N 3/02* (2013.01); *G06N 3/049* (2013.01); (Continued)

(58) Field of Classification Search
CPC ...................................................... G06N 3/02
(Continued)

(56) References Cited

U.S. PATENT DOCUMENTS 7,533,071 B2   5/2009   Snook
8,311,965 B2   11/2012  Breitwisch et al.
(Continued)

FOREIGN PATENT DOCUMENTS

WO   WO2004027704   4/2004

OTHER PUBLICATIONS

Stewart et al ("Python scripting in the Nengo simulator" 2009).*
(Continued)

*Primary Examiner* — Lut Wong
(74) *Attorney, Agent, or Firm* — Cameron LLP

(57) ABSTRACT

A method and apparatus for constructing a neuroscience-inspired dynamic architecture (NIDA) for an artificial neural network is disclosed. The method comprises constructing, in one embodiment, an artificial neural network embodiment in a multi-dimensional space in memory such that a neuron is connected by a synapse to another neuron. The neuron and the synapse each have parameters and have features of long-term potentiation and long-term depression. Furthermore, crossover and mutation are employed to select children of parents. Through learning, an initial network may evolve into a different network when NIDA is applied to solve different problems of control, anomaly detection and classification over selected time units. The apparatus comprises in one embodiment a computational neuroscience-inspired artificial neural network with at least one affective network coupled to receive input data from an environment and to output data to the environment.

89 Claims, 52 Drawing Sheets

Related U.S. Application Data filed on Jan. 31, 2014, provisional application No. 61/946,179, filed on Feb. 28, 2014, provisional application No. 61/951,690, filed on Mar. 12, 2014, provisional application No. 62/001,951, filed on May 22, 2014, provisional application No. 62/024,081, filed on Jul. 14, 2014.

(51) Int. Cl.

| | |
|---|---|
| *G06N 3/08* | (2006.01) |
| *G06N 3/10* | (2006.01) |
| *G06N 3/063* | (2006.01) |
| *G06N 3/04* | (2006.01) |

(52) U.S. Cl.
CPC .......... *G06N 3/063* (2013.01); *G06N 3/0635* (2013.01); *G06N 3/08* (2013.01); *G06N 3/086* (2013.01); *G06N 3/10* (2013.01)

(58) Field of Classification Search
USPC ......................................................... 706/20
See application file for complete search history.

(56) References Cited

U.S. PATENT DOCUMENTS

| | | | |
|---|---|---|---|
| 8,433,665 | B2 | 4/2013 | Tang et al. |
| 8,510,239 | B2 | 8/2013 | Modha |
| 8,515,885 | B2 | 8/2013 | Modha |
| 8,600,919 | B2 | 12/2013 | Poon et al. |
| 2009/0292661 | A1 | 11/2009 | Hass |
| 2009/0327195 | A1 | 12/2009 | Iscen |
| 2011/0028827 | A1 | 2/2011 | Sitaram et al. |
| 2012/0005141 | A1 | 1/2012 | Sasagawa |
| 2012/0036099 | A1 | 2/2012 | Venkatraman et al. |
| 2012/0109863 | A1 | 5/2012 | Esser et al. |
| 2013/0073497 | A1 | 3/2013 | Akopyan et al. |
| 2014/0195468 | A1 | 7/2014 | Mohammadi et al. |
| 2015/0006444 | A1 | 1/2015 | Tamatsu et al. |

OTHER PUBLICATIONS

Izhikevich et al ("Spike-timing Dynamics of Neuronal Groups" 2004).*
Scott Frederick Hansen ("Exploration of Neural Structures for Dynamic System Control" Dec. 2012).*
Velazcoan et al ("Optimization with Neural Networks Trained by Evolutionary Algorithms" 2002).*
Furutania ("A System-Theoretic Approach to the Clinical Stage Classification Problem" 1999).*
Hawkins, Jeff et al., "Sequence memory for prediction, inference and behavior," Phil. Trans. Royal Soc. B, pp. 1203-1209, 2009.
Glackin et al., "A Novel Approach for the Implementation of Large Scale Spiking Neural Networks on FPGA Hardware," IWANN 2005, LNCS 3512, pp. 552-563, 2005.
Cassidy et al., "FPGA Based Silicon Spiking Neural Array," Biomedical Circuits and Systems Conference (BIOCAS 2007), pp. 75-78, IEEE, 2007.
Cassidy et al., "Cognitive Computing Building Block: A Versatile and Efficient Digital Neuron Model for Neurosynaptic Cores," IBM Research, pp. 1-10, 2013.
Sharp et al., "Power-efficient simulation of detailed cortical microcircuits on SpiNNaker," Journal of Neuroscience Methods, 201, pp. 110-118, 2012.
Lewis, M. Anthony et al., "Control of a robot leg with an adaptive a(nalog)VLSI CPG chip," Neurocomputing, 38-40, 2001, pp. 1409-1421.
Lewis, M. Anthony et al., "CPG Design Using Inhibitory Networks," Proc. of the 2005 IEEE International Conference on Robotics and Automation, (ICRA 2005), pp. 3682-3687, 2005.

Friedmann, Simon et al., "Reward-based learning under hardware constraints—using a RISC processor embedded in a neuromorphic substrate," Frontiers in Neuroscience, 7-160, pp. 1-17, 2013.
Benjamin, B. V. et al., "Neurogrid: A mixed-analog-digital multichip system for large-scale neural simulations." Proceedings of the IEEE, 102, pp. 699-716, 2014.
Indiveri, Giacomo et al., "Neuromorphic silicon neuron circuits." Frontiers in Neuroscience, 5-73, pp. 1-23, 2011.
Abbass, Hussein A., Michael Towsey, and G. Finn. "C-Net: A method for generating non-deterministic and dynamic multivariate decision trees." Knowledge and Information Systems 3.2 (2001): pp. 184-197.
Belatreche, Ammar, Liam P. Maguire, and Martin McGinnity. "Advances in design and application of spiking neural networks." Soft Computing 11.3 (2007): pp. 239-248.
Bohte, Sander M., Joost N. Kok, and Han La Poutre. "Error-backpropagation in temporally encoded networks of spiking neurons." Neurocomputing 48.1 (2002): pp. 17-37.
Garcia-Pedrajas, Nicolás, Domingo Ortiz-Boyer, and César Hervás-Martínez. "An alternative approach for neural network evolution with a genetic algorithm: Crossover by combinatorial optimization." Neural Networks 19.4 (2006): pp. 514-528.
Jin, Yaochu, Ruojing Wen, and Bernhard Sendhoff. "Evolutionary multi-objective optimization of spiking neural networks." Artificial Neural Networks—ICANN 2007. Springer Berlin Heidelberg, 2007. pp. 370-379.
Mangasarian, Olvi L., R. Setiono, and W. H. Wolberg. "Pattern recognition via linear programming: Theory and application to medical diagnosis." Large-scale numerical optimization (1990): pp. 22-31.
Michie, Donald, David J. Spiegelhalter, and Charles C. Taylor. "Machine learning, neural and statistical classification." (1994).
Parekh, Rajesh, Jihoon Yang, and Vasant Honavar. "Constructive neural-network learning algorithms for pattern classification." Neural Networks, IEEE Transactions on 11.2 (2000): pp. 436-451.
Pavlidis, N. G., et al. "Spiking neural network training using evolutionary algorithms." Neural Networks, 2005, IJCNN'05, Proceedings, 2005 IEEE International Joint Conference on, vol. 4., IEEE, 2005. pp. 2190-2194.
Setiono, Rudy, and Lucas Chi Kwong Hui. "Use of a quasi-Newton method in a feedforward neural network construction algorithm." Neural Networks, IEEE Transactions on 6.1 (1995): pp. 273-277.
Moore, Kendra E., and Jack C. Chiang. "ALPHA/Sim: ALPHA/Sim simulation software tutorial," Proceedings of the 32nd conference on Winter simulation, pp. 259-267. Society for Computer Simulation International, 2000.
Poor, H. Vincent, and Olympia Hadjiliadis. Quickest detection, vol. 40, pp. 102-129, Cambridge: Cambridge University Press, 2009.
Van Trees, Harry L.. Detection, Estimation, and Modulation Theory-Part I-Detection, Estimation, and Linear Modulation Theory, pp. 23-45, John Wiley & Sons, 2001.
Rosenblatt, F., "The perceptron: A probabilistic model for information storage and organization in the brain." Psychological Review, 65(6): pp. 386-408, 1958.
Fogel, David B., Eugene C. Wasson III, and Edward M. Boughton. "Evolving neural networks for detecting breast cancer." Cancer letters, 96.1, pp. 49-53 (1995).
Boyd, Stephen P., Venkataramanan Balakrishnan, Craig H. Barratt, Nasser M. Khraishi, Xiaoming Li, David G. Meyer, and Stephen A. Norman. "A new CAD method and associated architectures for linear controllers." IEEE Transactions onAutomatic Control, 33, No. 3, pp. 268-283, 1988.
Garcia, Carlos E., and A. M. Morshedi. "Quadratic programming solution of dynamic matrix control (QDMC)." Chemical Engineering Communications 46, No. 1-3, pp. 73-87, 1986.
Athans, Michael, David Castanon, K-P. Dunn, C. Greene, Wing Lee, N. Sandell Jr, and Alan S. Willsky. "The stochastic control of the F-8C aircraft using a multiple model adaptive control (MMAC) method—Part I: Equilibrium flight." IEEE Transactions on Automatic Control, 22, No. 5, pp. 768-780, 1977.
Narendra, Kumpati S., and Jeyendran Balakrishnan. "Adaptive control using multiple models." IEEE Transactions on Automatic Control, 42, No. 2, pp. 171-187, 1997.

(56) References Cited

OTHER PUBLICATIONS

Anderson, Brian, Thomas Brinsmead, Daniel Liberzon, and A. Stephen Morse. "Multiple model adaptive control with safe switching." International journal of adaptive control and signal processing 15, No. 5, pp. 445-470, 2001.

Morshedi, A. M., C. R. Cutler, and T. A. Skrovanek. "Optimal Solution of Dynamic Matrix Control with Linear Programing Techniques (LDMC)." Proc. American Control Conference, pp. 199-208, 1985,.

Gattu, Gangadhar, and Evanghelos Zafiriou. "Nonlinear quadratic dynamic matrix control with state estimation." Industrial & engineering chemistry research 31, No. 4, pp. 1096-1104, 1992.

Morari, Manfred, and Jay H Lee. "Model predictive control: past, present and future." Computers & Chemical Engineering 23, No. 4, pp. 667-682, 1999.

Yao, Xin, "Evolving artificial neural networks," Proceedings of the IEEE, 87(9):1423-1447, Sep. 1999.

Montana, David J. and Lawrence Davis, "Training feedforward neural networks using genetic algorithms," Proceedings of the 11th international joint conference on Artificial intelligence—vol. 1, pp. 762-767, San Francisco, CA, USA, 1989, Morgan Kaufmann Publishers Inc.

Fogel, D. B., L. Fogel, and V. Porto, "Evolving neural networks," Biological Cybernetics, 63(6): 487-493, 1990.

Beer, Randall D. and John C. Gallagher. Evolving dynamical neural networks for adaptive behavior, Adapt. Behav., 1(1):91-122, Jun. 1992.

Wieland, A. P., "Evolving neural network controllers for unstable systems," Neural Networks, 1991, IJCNN-91-Seattle International Joint Conference on, vol. II, pp. 667-673, Jul. 1991.

Dominic, S., R. Das, D. Whitley, and C. Anderson, Genetic reinforcement learning for neural networks, Neural Networks, 1991, IJCNN-91-Seattle International Joint Conference on, vol. ii, pp. 71-76 vol. 2, Jul. 1991.

Gomez, Faustino, Jurgen Schmidhuber, and Risto Miikkulainen, "Efficient non-linear control through neuroevolution," Johannes Furnkranz, Tobias Scheffer, and Myra Spiliopoulou, editors, Machine Learning: ECML 2006, vol. 4212 of Lecture Notes in Computer Science, pp. 654-662, Springer Berlin/Heidelberg, 2006.

Gomez, Faustino, Jurgen Schmidhuber, and Risto Miikkulainen, "Accelerated neural evolution through cooperatively coevolved synapses," J. Mach. Learn. Res., 9: 937-965, Jun. 2008.

Floreano, Dario, Peter Durr, and Claudio Mattiussi, "Neuroevolution: from architectures to learning," Evolutionary Intelligence, 1(1): 47-62, 2008.

Branke, Jurgen, "Evolutionary algorithms in neural network design and training —A review," Jarmo T. Alander, editor, Proc. of the First Nordic Workshop on Genetic Algorithms and their Applications (1NWGA), vol. 95-1, pp. 145-163, Vaasa, Finland, 1995.

Whitley, D., T. Starkweather, and C. Bogart, "Genetic algorithms and neural networks: optimizing connections and connectivity," Parallel Computing, 14(3): 347-361, 1990.

Koza, J.R. and J.P. Rice, Genetic generation of both the weights and architecture for a neural network. In Neural Networks, 1991., IJCNN-91-Seattle Inter-national Joint Conference on, vol. ii, pp. 397-404 vol. 2, Jul. 1991.

Dasgupta, D. and D.R. McGregor, "Designing application-specific neural networks using the structured genetic algorithm," Combinations of Genetic Algorithms and Neural Networks, 1992, COGANN-92. International Workshop on, pp. 87-96, Jun. 1992.

White, David and Panos Ligomenides, "Gannet: A genetic algorithm for optimizing topology and weights in neural network design," Jos'e Mira, Joan Cabestany, and Alberto Prieto, editors, New Trends in Neural Computation, vol. 686 of Lecture Notes in Computer Science, pp. 322-327, Springer Berlin/Heidelberg, 1993.

Maniezzo, V. Genetic evolution of the topology and weight distribution of neural networks. Neural Networks, IEEE Transactions on, 5(1):39-53, Jan. 1994.

Angeline, P. J., G.M. Saunders, and J.B. Pollack, "An evolutionary algorithm that constructs recurrent neural networks," Neural Networks, IEEE Transactions on, 5(1):54-65, Jan. 1994.

Tang, K.S., C.Y. Chan, K.F. Man, and S. Kwong. "Genetic structure for nn topology and weights optimization," Genetic Algorithms in Engineering Systems: Innovations and Applications, 1995. GALESIA. First International Conference on (Conf. Publ. No. 414), pp. 250-255, Sep. 1995.

Liu, Yong and Xin Yao, "A population-based learning algorithm which learns both architectures and weights of neural networks," Chinese Journal of Advanced Software Research (Allerton), 10011:54-65, 1996.

Moriarty, David E. and Risto Mikkulainen, "Efficient reinforcement learning through symbiotic evolution," Machine Learning, 22(1):11-32, 1996.

Moriarty, David E. and Risto Miikkulainen, "Forming neural networks through efficient and adaptive coevolution," Evol. Comput., 5(4):373-399, Dec. 1997.

Gomez, Faustino and Risto Miikkulainen, "2-d pole balancing with recurrent evolutionary networks," Proceeding of the International Conference on Artificial Neural Networks (ICANN), pp. 425-430, 1998.

Yao, Xin and Yong Liu, "A new evolutionary system for evolving artificial neural networks," Neural Networks, IEEE Transactions on, 8(3): 694-713, May 1997.

Pujol, Joo Carlos Figueira and Riccardo Poli, "Evolving the topology and the weights of neural networks using a dual representation," Applied Intelligence, 8:73-84, 1998.

Abbass, Hussein A., "An evolutionary artificial neural networks approach for breast cancer diagnosis," Artificial Intelligence in Medicine, 25(3):265-281, 2002.

Stanley, Kenneth O. and Risto Miikkulainen, "Evolving neural networks through augmenting topologies," Evolutionary Computation, 10(2): 99-127, 2002.

Stanley, K.O., B.D. Bryant, and R. Miikkulainen, "Evolving adaptive neural networks with and without adaptive synapses," Evolutionary Computation, 2003. CEC '03, The 2003 Congress on, vol. 4, pp. 2557-2564, Dec. 2003.

Alba, Enrique and J. Chicano, "Training neural networks with ga hybrid algorithms," Kalyanmoy Deb, editor, Genetic and Evolutionary Computation, GECCO 2004, vol. 3102 of Lecture Notes in Computer Science, pp. 852-863. Springer Berlin/Heidelberg, 2004.

Fieldsend, J. E. and S. Singh, "Pareto evolutionary neural networks," Neural Networks, IEEE Transactions on, 16(2):338-354, Mar. 2005.

Palmes, P. P., T. Hayasaka, and S. Usui, "Mutation-based genetic neural network," Neural Networks, IEEE Transactions on, 16(3):587-600, May 2005.

Kassahun, Y. Towards a Unified Approach to Learning and Adaptation, PhD thesis, Christian-Albrechts-University, Kiel, Germany, Feb. 2006.

Siebel, Nils T. and Gerald Sommer, "Evolutionary reinforcement learning of artificial neural networks," Int. J. Hybrid Intell. Syst., 4(3):171-183, Aug. 2007.

Siebel, Nils T., J. Botel, and G. Sommer, "Efficient neural network pruning during neuro-evolution," Neural Networks, 2009. IJCNN 2009. International Joint Conference on, pp. 2920-2927, Jun. 2009.

Stanley, Kenneth O., David B. D'Ambrosio, and Jason Gauci, "A hypercube-based encoding for evolving large-scale neural networks," Artificial Life, 15(2):185-212, 2009.

Gauci, Jason and Kenneth O. Stanley, "Autonomous evolution of topographic regularities in artificial neural networks," Neural Computation, 22(7):1860-1898, 2010.

Markram, Henry, Wulfram Gerstner, and Per Jesper Sjostrom, "A history of spike-timing-dependent plasticity," Frontiers in Synaptic Neuroscience, 3:4, pp. 1-24, 2011.

Beer, Randall D., "On the dynamics of small continuous-time recurrent neural networks," Adaptive Behavior, 3(4):469-509, 1995.

Beer, Randall D., "The dynamics of adaptive behavior: A research program," Robotics and Autonomous Systems, 20(2-4):257-289, 1997, ice:title;Practice and Future of Autonomous Agents.

Gallagher, John C. and Saranyan Vigraham, "A modified compact genetic algorithm for the intrinsic evolution of continuous time

(56) References Cited

OTHER PUBLICATIONS recurrent neural networks," Proceedings of the Genetic and Evolutionary Computation Conference, GECCO '02, pp. 163-170, San Francisco, CA, USA, 2002, Morgan Kaufmann Publishers Inc.

Merolla, P., J. Arthur, F. Akopyan, N. Imam, R. Manohar, and D.S. Modha, "A digital neurosynaptic core using embedded crossbar memory with 45pj per spike in 45nm," Custom Integrated Circuits Conference (CICC), 2011 IEEE, pp. 1-4, Sep. 2011.

Preissl, Robert, Theodore M. Wong, Pallab Datta, Myron Flickner, Raghavendra Singh, Steven K. Esser, William P. Risk, Horst D. Simon, and Dharmendra S. Modha. "Compass: a scalable simulator for an architecture for cognitive computing," Proceedings of the International Conference on High Performance Computing, Networking, Storage and Analysis, SC '12, pp. 54:1-54:11, Los Alamitos, CA, USA, 2012, IEEE Computer Society Press.

Kashtan, Nadav, Uri Alon, and Jr. Callan, Curtis G., "Spontaneous evolution of modularity and network motifs," Proceedings of the National Academy of Sciences of the United States of America, 102(39): pp. 13773-13778, 2005.

Caelli, T., Ling Guan, and W. Wen, "Modularity in neural computing," Proceedings of the IEEE, 87(9): 1497-1518, Sep. 1999.

Cho, Sung-Bae and K. Shimohara, "Modular neural networks evolved by genetic programming," Evolutionary Computation, 1996, Proceedings of IEEE International Conference on, pp. 681-684, May 1996.

Garcia-Pedrajas, N., C. Hervas-Martinez, and J. Munoz-Perez, "Covnet: a cooperative coevolutionary model for evolving artificial neural networks," Neural Networks, IEEE Transactions on, 14(3): 575-596, May 2003.

Garcia-Pedrajas, N., C. Hervas-Martinez, and D. Ortiz-Boyer.Cooperative coevolution of artificial neural network ensembles for pattern classification, Evolutionary Computation, IEEE Transactions on, 9(3):271-302, Jun. 2005.

Reisinger, Joseph, Kenneth O. Stanley, and Risto Miikkulainen, Evolving reusable neural modules. In Proceedings of the Genetic and Evolutionary Computation Conference, pp. 69-81, 2004.

Hornby, Gregory S., "Measuring, enabling and comparing modularity, regularity and hierarchy in evolutionary design," Proceedings of the 2005 conference on Genetic and evolutionary computation, GECCO '05, pp. 1729-1736, New York, NY, USA, 2005, ACM.

Kamioka, Takumi, Eiji Uchibe, and Kenji Doya, "Neuroevolution based on reusable and hierarchical modular representation," Proc. 15th Int. Conf. Advances in Neuro-Information Processing, Part I (ICONIP'08), pp. 22-31. Berlin, Heidelberg: Springer-Verlage, 2009.

Yao, Xin and M.M. Islam, "Evolving artificial neural network ensembles," Computational Intelligence Magazine, IEEE, 3(1): 31-42, Feb. 2008.

Singh, S., A. Barto, and N. Chentanez, "Intrinsically motivated reinforcement learning," 18th Annual Conference on Neural Information Processing Systems (NIPS), pp. 1-8, 2004.

Wang, Fang, Vijaya K. Devabhaktuni, and Qi-Jun Zhang. "A hierarchical neural network approach to the development of a library of neural models for microwave design." IEEE transactions on microwave theory and techniques 46.12 (1998): 2391-2403.

Lawrence, Steve et al. "Face recognition: A convolutional neural-network approach." IEEE transactions on neural networks 8.1 (1997): 98-113.

Izhikevich, Eugene M, "Which Model to Use for Cortical Spiking Networks," IEEE Transactions on Neural Networks, pp. 1063-1070, 2004.

Dipl. Phys. Andreas Grubl ("VLSI Implementation of a Spiking Neural Network" 2007).

Matlab, Neural Network Toolbox 6 User's Guide, 2010.

J. Yoshimi, "Simbrain: A visual framework for neural network analysis and education", Brains, Minds, and Media, vol. 3, May 23, 2008.

L. Hansen and P. Salamon, "Neural Network Ensembles", IEEE Trans. on Pattern Analysis and Mach. Intel., vol. 12, No. 10, Oct. 1990, pp. 993-1001.

Y. Le Cun et al., "Handwritten Digit Recognition with a Back-Propagation Network", in Neural Information Proc. Sys., 1989, pp. 396-404.

Jin, Yaochu, Rojing Wen, and Bernhard Sendhoff. "Evolutionary multi-objective optimization of spiking neural networks." International Conference on Artificial Neural Networks. Springer Berlin Heidelberg, 2007.

Ijspeert, Auke Jan. "Central pattern generators for locomotion control in animals and robots: a review." Neural Networks 21.4 (2008): 642-653.

Martinetz, Thomas M., Helge J. Ritter, and Klaus J. Schulten. "Three-dimensional neural net for learning visuomotor coordination of a robot arm." IEEE Transactions on Neural Networks 1.1 (1990): 131-136.

* cited by examiner

Lambda = 0

Lambda = 0.9

Small Decreases

Large Decreases

7 3 2
2 5 8
Example Digits  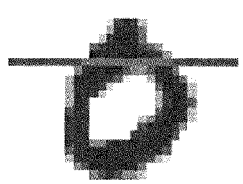 By Row  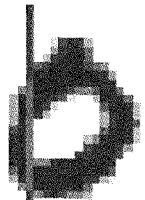 By Column  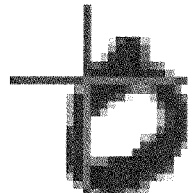 By Row and Column
FIG. 30

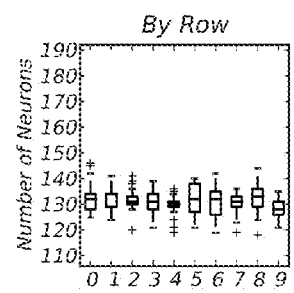
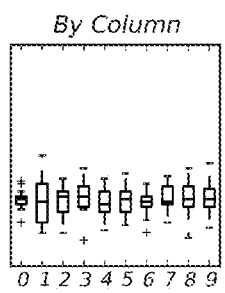
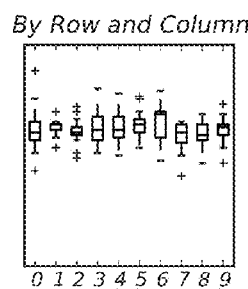
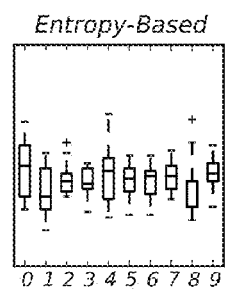
FIG. 33A     FIG. 33B     FIG. 33C     FIG. 33D
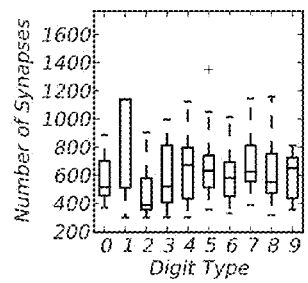
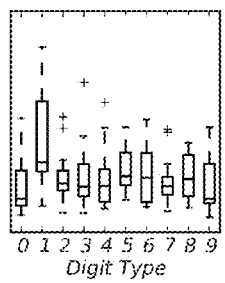
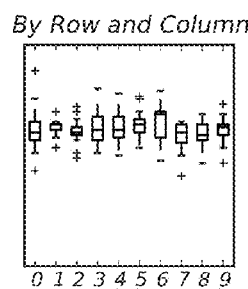
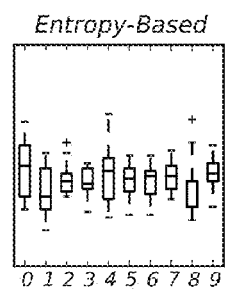
FIG. 33E     FIG. 33F     FIG. 33G     FIG. 33H

METHOD AND APPARATUS FOR CONSTRUCTING A NEUROSCIENCE-INSPIRED ARTIFICIAL NEURAL NETWORK

The present patent application claims the benefit of and right of priority to U.S. Provisional Patent Application Ser. No. 61/891,621, filed Oct. 16, 2013; Ser. No. 61/934,052, filed Jan. 31, 2014; Ser. No. 61/946,179 filed Feb. 28, 2014; Ser. No. 61/951,690 filed Mar. 12, 2014, Ser. No. 62/001,951, filed May 22, 2014, and Ser. No. 62/024,081, filed Jul. 14, 2015, all six U.S. provisional patent applications incorporated by reference herein as to their entire contents and is related by subject matter to U.S. patent application Ser. No. 14/513,297 filed Oct. 14, 2014, entitled "Method and Apparatus for Constructing a Dynamic Adaptive Neural Network Array (DANNA)" of J. Douglas Birdwell, Mark E. Dean and Catherine Schuman, to U.S. patent application Ser. No. 14/513,334 filed Oct. 14, 2014, entitled "Method and Apparatus for Providing Random Selection and Long-Term Potentiation and Depression in an Artificial Network" of J. Douglas Birdwell, Mark E. Dean and Catherine Schuman, to U.S. patent application Ser. No. 14/513,388 filed Oct. 14, 2014, entitled "Method and Apparatus for Constructing, Using and Reusing Components and Structures of an Artificial Neural Network" of J. Douglas Birdwell, Mark E. Dean and Catherine Schuman, to U.S. patent application Ser. No. 14/513,447 filed Oct. 14, 2014, entitled "Method and Apparatus for Providing Real-Time Monitoring of an Artificial Neural Network" of J. Douglas Birdwell, Mark F. Dean and Catherine Schuman, and to U.S. patent application Ser. No. 14/513,497 filed Oct. 14, 2014, entitled "Method and Apparatus for Constructing a Neuroscience-Inspired Artificial Neural Network with Visualization of Neural Pathways" of J. Douglas Bird well, Mark E. Dean, Margaret Drouhard and Catherine Schuman, all five patent applications incorporated by reference as to their entire contents.

TECHNICAL FIELD

The technical field relates to a method and apparatus for constructing a neuroscience-inspired artificial neural network and, in particular, to the application of a conventional von Neumann architecture to support a neuroscience-inspired artificial neural network dynamic architecture for solving problems in the control, anomaly detection and classification arts.

BACKGROUND AND RELATED ARTS

Biological neural networks are known to have many desirable characteristics. For example, they are able to perform complex, nonlinear tasks using large numbers of relatively simple building blocks. Biological neural networks are robust, able to extrapolate information from a specific setting to apply to a more general setting, and adaptable to change. For these reasons and many others, it has been a goal of the machine learning community to produce networks with similar capabilities to biological central nervous systems, brains, and, in particular, to the human brain.

In order to appreciate the neuroscience-inspired artificial neural network of the present invention, a brief introduction to the neural components, by example, of the human brain and the larger components of the human brain itself is provided. Biological neurons are the nerve cells present in the brain. The human brain consists of about $10^{11}$ neurons, each of which operates in parallel with the others. A typical biological neuron is shown in FIG. 1. A process in neuroscience usually refers to a physical feature. The various processes of the neuron are called neurites; henceforth, the term neurite will be used rather than process to avoid confusion with the computer science notion of process. The neuron receives information through neurites called dendrites 110, which also communicate the information to the neuron's cell body 120. The cell body 120 has a nucleus 130. The neurite that transmits information out of the neuron to other targets is called the axon 140 having axon terminals 190. A myelin sheath 160 comprises a Schwann cell 170. Signals between neurons are usually transferred across synapses, although direct connections that allow ion exchange have been observed. Typically, the communication is done chemically via neurotransmitters.

Dendrites 110 are usually shorter than axons 140 and arise from the cell body 120 of the neuron. They generally branch off into dendritic spines, which receive information from axons from other neurons. The dendritic spines are typically where the communication between neurons across synapses and from axons takes place, although communication may also be direct from cell body to cell body, or between dendrites.

Although information is transmitted from an axon 140 to a dendrite 110 in a typical synapse, there are also synapses between two axons, two dendrites, and synapses and from axons in which information travels from dendrite 110 to axon 140. Because of these differences, connections between neurons in the artificial neural networks defined herein will all be referred to only as synapses, with no distinction between dendrites and axons. The synapses in this work are directed in that information travels from one neuron to another, but not in the opposite direction along that synapse.

There are two known ways for synaptic transmission to take place in the brain: electrical transmission and chemical transmission. Electrical transmission occurs when the current generated by one neuron spreads to another neuron on a pathway of low electrical resistance. Electrical synapses are relatively rare in the mammalian brain; evidence suggests that they occur in regions where the activities of neighboring neurons need to be highly synchronized. In chemical transmissions, neurotransmitters are transmitted from one neuron to another.

A neurotransmitter is a chemical substance that is typically synthesized in a neuron and is released at a synapse following depolarization of at least a portion of the neuron's cell membrane (typically near the synapse). The neurotransmitter then binds to receptors at a postsynaptic cell and/or postsynaptic terminal to elicit a response. This response may excite or inhibit the neuron, meaning neurotransmitters play a major role in the way the brain operates. Some of the known neurotransmitters are acetylcholine, glutamate, GABA, glycine, dopamine, norepinephrine, serotonin and histamine.

Neurotransmitters are released according to action potentials in the neuron. An action potential is a fluctuation in the membrane potential of the neuron, which is the voltage difference across the cell membrane caused by differences in ion concentrations between the outside and inside of the neuron. Neurons have a particular membrane potential in which they are at rest. Typically, a neuron is "at rest" when the potential inside the neuron's cell wall is approximately −70 mV compared to the outside of the neuron. When positively charged ions flow out of the cell, the membrane potential becomes more negative, while positive ionic current flowing into the cell changes the membrane potential to a less negative or positive value. Negative ions have an opposite effect. Each neuron has an associated threshold level. If the membrane potential rises above this threshold level, the neuron generates an action potential. The generation of the action potential is called a "firing" of the neuron.

The generation of an action potential relies not only on the threshold of the neuron but also on the recent firing history. Each neuron has an associated refractory period. For a short period of time after a neuron has fired, it is highly unlikely that that neuron will fire again. This period is called the absolute refractory period. For a slightly longer period of time after the absolute refractory period, it is difficult, but more likely, for the neuron to fire again. This period is called the relative refractory period.

In the central nervous system, multiple types of cells provide myelin sheaths 160 along axons 140. Myelin is a fat that provides an insulating layer for the axon 140. The thickness of the myelin sheath 160 controls the propagation delay of signals along the axon 140. Myelin sheaths 160 are separated along the axon by nodes of Ranvier 150. The action potential traveling along the axon is regenerated at each of the nodes of Ranvier. Having described a typical neuron, the parts of the human brain will now be discussed with reference to FIG. 2.

The basal ganglia (corpus striatum) 210 is one of the most important layers of the brain 200 for emotion processing and generation; it is also known as the reptilian brain. The basal ganglia 210 is the portion of the brain that contains innate behavioral knowledge, including motor functions and primal emotions such as fear, anger, and sexuality. It is also responsible for motor integration in the cerebral cortex. The next layer of the brain known as the limbic system or the visceral brain, is where many of the various social emotions are processed. It processes most affective knowledge, generating more sophisticated emotional responses. The limbic system also appears to mediate or control memory processes. Both the amygdala 220 and the hippocampus 230 are part of the limbic system. The hippocampus plays an important role in memory formation in the brain, particularly short term memory. The amygdala 220 is important for learning associations between stimuli and emotional value. For example, the amygdala may associate fear with a stimulus that causes pain.

The neocortex 240 is a structure in the brain that is more evolved in human brains than in other mammal brains. The neocortex 240 is responsible for associating a diversity of sensations and innate ideas, such as a sense of causality and spatial referencing, into perception, concepts and attributions. This is the portion of the brain that contains what we think of as the rational mind and the imagination and the part of the brain that generates ideas. The neocortex 240 in humans is organized in six layers, which are parallel to the surface of the cortex. The neurons in the neocortex are organized in cylindrical columns (cortical columns), which are perpendicular to the cortical surface. Axons 140 that traverse vertically in the neocortex 240 typically form connections to neurons within a column, but among the neurons in different layers. Axons 140 that traverse horizontally in the neocortex 240 allow communication between neurons in different columns.

There are two types of memory in the brain: declarative memory and non-declarative memory. Declarative memory is explicit memory and typically depends on the hippocampus 230 and other areas of the brain. Declarative memory includes episodic memory (memory of events from one's life) and semantic memory (general knowledge of the world). The hippocampus 230 retains context-dependent memories until they are consolidated in neocortical structures, but there is evidence that these memories are stored differently in the two structures. Non-declarative memory, on the other hand, is implicit, procedural memory and depends mostly on the basal ganglia 230 and parts of the cerebral cortex (including the neocortex 240). Non-declarative memory is needed to learn skills, such as swimming. For the most part, it is still unclear precisely how learning and memory work in the human brain. However, it is clear that in order for the brain to learn, the structure of the brain must be somewhat plastic; that is, the structure must be able to adapt. Synaptic plasticity dependent on the activity of the synapses is widely thought to be the mechanism through which learning and memory take place. The Hebb rule comprises the idea that if the action potential from one neuron causes another neuron to fire, then the synapse along which the action potential travels should be strengthened (or when a synapse is not used, a decrease in strength). These decreases take place when a particular synapse repeatedly fails to be involved in the firing of a neuron. This is supported by experiment.

The effects of these increases and decreases of strength in the synapses can be both short-term and long-term. If the effects last a significant period of time, they are called long-term potentiation (LTP) and long-term depression (LTD). Synaptic plasticity is seen as a process that occurs gradually over time, and the rate of the change can be specified by one or more time constant(s).

Now, the development of artificial neural networks (ANNs) will be discussed, for example, in the context of efforts to simulate the wonders of the human brain. Artificial neural networks can be thought of as directed weighted graphs, where the neurons are the nodes and the synapses are the directed edges. Known neural network architectures are typically made up of input neurons, output neurons and so-called "hidden" neurons. The hidden neurons are those that are neither input neurons nor output neurons in such a known network. The structural types include feed-forward neural networks, recurrent neural networks and modular neural networks.

Referring to prior art FIG. 3, there is shown a fully-connected feed-forward neural network comprising input neurons 310-1, 310-2, 310-3, ..., 310-N to the left and output neurons 330-1, 330-2, 330-3, ..., 330-P to the right with hidden neurons 320-1, 320-2, 320-3, ..., 320-M between input and output neurons. It is not shown but one hidden neuron may connect to another hidden neuron. In feed forward neural networks, there is a layer of input neurons, zero or more layers of hidden neurons, and an output layer. Input layers only contain outgoing edges, and the edges of one layer are only connected to the next layer (whether it be a hidden layer or the output layer). Networks may either be fully connected as seen in FIG. 3, in the sense that every neuron in a layer has a directed edge to every neuron in the next layer, or they may only be partially connected, where some of these edges are missing.

Referring now to prior art FIG. 4, there is shown an example of a known recurrent neural network. Recurrent neural networks contain at least one loop, cycle, or feedback path. FIG. 4 shows the input neurons 410-1 to 410-N, output neurons 430 and hidden neurons 420-1, 420-2, ..., 420-M with the same shading as in FIG. 3. Delay elements 440 are indicated with boxes labeled D. A loop in a directed graph is when there is an edge from a node to itself. Cycles in a directed graph occur when there is a path from a node to itself that contains other nodes. Feedback loops and paths typically involve delay elements D 440. Feedback allows for storage to take place in the neurons; it gives the network a sense of memory from one instance to the next. Recurrent neural networks can be divided further into discrete-time and continuous-time neural networks. Charge is applied periodically or after randomly spaced intervals at inputs at moments in time and propagates through the network, producing output no earlier than when the charge is applied. Continuous-time neural networks model behaviors such as spikes in the network at infinitesimally small time steps. These spikes are typically modeled using a differential equation rather than as discrete events and may not have a stable solution, especially for networks that contain loops.

A neural network is modular if the computation performed by the network can be decomposed into two or more subsystems that operate on distinct inputs without communication. The outputs of these modules are then combined to form the outputs of the network. A known modular neural network may be one of a recurrent neural network or a feed-forward neural network or other artificial neural network.

Neurons in neural networks are the information processing units of the network. Neurons usually accumulate, combine, or sum signals they receive from their connections, and an activation function is applied to the result. A neuron in the network is said to fire if the output value is non-zero or is above a threshold (depending upon the reference level). Several different activation functions are commonly used. There may be a threshold function when the charge reaches a threshold value, a piecewise-linear function sometimes called saturation of a neuron or a sigmoid function related to the slope of increase (or decrease) of charge.

Training in a neural network has canonically meant changing the weights of the connections and/or the threshold values. Relatively recently, training has also referred to changes in the architecture of the network. Neural networks with training algorithms that cannot change the architecture of networks may be considered fixed-structure. Similarly, networks with training algorithms that can change the architecture may be considered variable-structure.

There are two main methods of training: gradient-based methods and evolutionary methods. Back-propagation is the most widely used algorithm for training neural networks in a supervised way. The algorithm is supervised because it requires a set of inputs and their corresponding outputs, called a training set. Back-propagation has two distinct phases: a forward pass and a backward pass. In the forward pass, input signals are propagated through the network, to produce an output. This output is compared with the expected output, producing an error. The error signals are then propagated backwards through the network, where the weights of the networks are adjusted in order to minimize the mean-squared error. Back propagation is a gradient-based optimization technique. It makes use of the gradient of an error function, evaluated using a training data set, with respect to the weights in the network. That is, back propagation uses the gradient of an error to determine how the weights in the network should be changed to reduce the error.

One of the known limitations of back propagation and other supervised learning algorithms is that they typically do not scale well. Gradient-based optimization algorithms have several known limitations as well. Because the weights are changed so that the error follows the steepest direction (in the space of weights) of descent, the results of the optimization algorithm depend largely on the initial starting point. If the initial starting point is located near local optima and far away from the global optimum, the back-propagation algorithm will likely converge to one of the local optima. This is a drawback for the back propagation algorithm because complex systems often have many local optima with significantly different (poorer) performance than a global optimum.

Another known type of training of artificial neural networks is Hebbian learning. Hebbian learning is analogous to long-term potentiation (LTP) and long-term depression (LTD) that occurs in the brain. In LTP, if the firing of one neuron occurs before the firing of a receiving neuron, then the synapse between these two is strengthened. That is, in LTP, the possibility of a causal relationship between the two neurons (i.e. that the firing of one directly leads to the firing of another), influences how synaptic changes are made. In LTD, the strength of the synapse is decreased when the firing of one neuron does not lead to the firing of its connected neurons, or when the firing of one neuron occurs while the receiving neuron is in a refractory state or has recently fired. In LTD, the possibility of a non-causal relationship between the two neurons influences how synaptic changes are made. For example, if a receiving neuron fired immediately prior to the firing of a transmitting neuron, it may be appropriate to decrease the strength of the synapse.

There are four characteristics of Hebbian synapses. Modifications to a Hebbian synapse depend heavily on time in that increases are made if neurons are activated at the same time, and decreases are made if two neurons are activated at different times. All information required to determine if a change to a Hebbian synapse should be made is local information. That is, the only information required to know if a synapse should change is the activities of the neurons that are connected by that synapse. Changes in the weight of a Hebbian synapse are determined by the firing patterns of the two neurons connected by the weight. Lastly, an increase in the strength of the synapse is caused by the conjunction of presynaptic and postsynaptic activity. Hebbian learning has been observed in biological neural networks. However, learning in biological systems is significantly more complicated than these four characteristics imply.

So-called evolutionary algorithms are presently surpassing known, more conventional artificial network architectures. The evolution of the structure of the brain and evolution within the brain can be categorized in four forms. First, at the highest level, there is evolution via speciation, and the brain structure in particular, which has occurred over millions of years. This long-term evolution has affected every aspect of the brain, but most notably, it is the level of evolution where the gross structure of the brain has developed. Following typical evolutionary theory, the complex structures from the human brain evolved from simpler structures that underwent three evolutionary mechanisms: mutation, the introduction of new structures or pieces of structures; recombination, the combination or re-use of existing structures in novel ways; and natural selection, the dying off of unsuccessful structures.

The general structure of the brain does not differ greatly from person to person; there are certain parts of the brain that are present in nearly every individual, though as the evolution of species has occurred these structures have become more complex. These are the types of structures that are of concern at the level of long-term evolution.

A shorter term evolution of the brain, what will be referred to in this work as moderate-term evolution, has been recently discovered. This evolution, referred to as epigenesis, also affects the structure of the brain, but at a finer level. Epigenesis is caused by modifications to the structure of proteins that regulate the transcription of genes; these modifications are often caused by the environment, but unlike other environmental effects, these modifications can be inherited by future generations through methylation of DNA. The modifications can lead to changes in the structure of the brain and thus far, have been seen to primarily affect the social and affective aspects of the brain.

The evolution (or perhaps more aptly development and adaptation) that occurs within a single human's brain over the course of a lifetime, from conception through adulthood, will be referred to in this work as short-term evolution. The morphology of the brain is shaped partly through genetics, influenced by both long-term and moderate-term evolution, but also through experience (or by environmental effects). Neurons proliferate and die over the course of an individual's development. One of the factors that affects the formation and survival of neurons in this stage is the way connections are formed, that is, the types of neurons that a particular neuron's axon connects during development. The connections of a neuron affect the way that neuron behaves and operates in the future, and these connections are initially determined during this short-term evolutionary stage. An example of this type of evolution is found in London taxi drivers (where London taxi drivers were found to have enlarged posterior hippocampi over time from their ability to visualize a road map of London).

There is a certain amount of plasticity during development that allows an individual to adapt the different parts of the brain (determined by long-term evolution) to his or her particular role. There are certain portions of the brain, such as the neocortex, in which the local structure (i.e. connection strengths) appears to mostly depend on the environment, rather than genetics.

Another major structural aspect of the brain that is evolved or developed over the course of single person's lifetime is myelination. Myelination affects the efficiency and rapidity of transmissions of signals in the brain. Myelination in humans continues well into the second decade of life.

Finally, very short term evolution (development or learning, in this case) occurs on a day-to-day basis in the brain. This evolution affects synapses; this type of evolution is what is typically referred to as plasticity in the brain. There are four known major types of synaptic plasticity: long term potentiation, long-term depression, sensitization, and axonal sprouting and formation of new synapses. Long-term potentiation and long-term depression were discussed above within the context of Hebb's rule. Long-term potentiation (LTP) is a permanent or semi-permanent change in the way a neuron fires and is caused by repeated activation with stimulation; it is associated with memory in the brain. Long-term depression (LTD) refers to any form of depression in synaptic transmission, such as the lowering of signal transmission efficacy. Long term potentiation (LTP) occurs only when a synapse is active, but long term depression can occur whether a synapse is active or inactive.

Sensitization refers to enhancement of a response as a result of applying a novel stimulus. Finally, axons can sprout, both during initial formation and after transection, in the brain. Axon sprouting occurs most commonly during neonatal development, but it also can occur in adulthood.

Evolutionary algorithms are optimization algorithms that are often used in large, complex state spaces. Biological evolution is a method for searching a huge number of possibilities for solutions, where solutions are the organisms themselves. The biological inspiration of evolutionary algorithms is described in Flake's "The Computational Beauty of Nature" as follows:

Adaptation=Variation+Selection*Heredity.

In evolutionary algorithms, a population of potential solutions is maintained. The members of the population are usually distinct and maintain variety. Evolutionary algorithms are inherently random, and the random influences contribute to the variety in the population. Selection is perhaps the most important component of the formula given above. Selection refers to the concept of "survival of the fittest." For evolutionary algorithms, some concept of fitness must exist, where fitness is typically a function or algorithm mapping members of the population to numerical values. It is worth noting that the fitness function can be based on simulated values, so it may generate different value each time it is applied to a member of the population. The fitness of a member of a population should represent the relative ability of that member of the population to perform a particular task. The most fit members of the population are more likely to be selected to reproduce and express traits that are kept over multiple generations. Members of the population that are the least fit are more likely to be allowed to die off. Heredity is emulated in evolutionary algorithms by producing "offspring" from existing members of a population. The offspring can be produced in a variety of algorithm-specific ways. The typical operations for producing offspring are reproduction, crossover and mutation.

For reproduction, one or more relatively fit members of the population are chosen to reproduce. Members of the population that have a higher fitness level are more likely to have offspring in the next generation of the population. The selection of these members of the population can be done in a variety of ways. One of the ways this is done is using Roulette selection. In Roulette selection, a member of the population is randomly selected, where the probability that a given member of the population is selected is based on that population member's fitness. That is, if a member has a high fitness, it is more likely to be selected. Another selection algorithm is tournament selection. In tournament selection, a fixed percentage of the population is randomly selected. From that smaller group, the member with the highest fitness is selected. The percentage selected from the original population is a parameter of this method. For example, if you select 100 percent of the population to be this parameter, then the most fit member of the population would always be selected. However, if you had a population size of 100 and selected one percent of the population, then the selection would be entirely random (i.e. not based on fitness at all).

In crossover, attributes of two or more members of the population are combined to form a new member of the population. Finally, mutation can occur, in which some attribute of the new member is randomly changed in some way. Different types of mutations can be employed, depending upon the complexity of the representation of each member of the population. Both crossover and mutation have associated rates in an evolutionary algorithm. The crossover rate is the percentage of time in which selected members of the parent population are crossed over or combined to produce members of the child population, whereas the mutation rate is the rate at which members of the parent population are mutated to produce members of the child population. Assuming neither of these rates is 1, there may be some propagation of identical members of the parent population to the child population.

Neuroevolution algorithms use evolutionary algorithms to train neural networks. The first neuroevolution algorithms that were developed only evolved the strength of the connections between the neurons; they did not affect the structure by adding or deleting connections or neurons. They only dealt with one form of evolution described above: very short term evolution.

The training of the connection weights in neural networks is typically formulated as an optimization problem. In particular, some error is minimized, or equivalently, a measure of performance or a goal is maximized. These approaches are equivalent because if f(x) is an error function, then 1/f(x) and −f(x) are suitable candidates for goal functions, and vice versa. The error used can be the mean squared error between the actual output and the expected output in supervised learning or the temporal difference error as used in reinforcement learning. Another example goal function is the length of time of successful operation. The weights of the networks are then trained using algorithms such as back propagation or conjugate gradient. These algorithms rely on gradient-based optimization algorithms using steepest or gradient related descent directions. There are many drawbacks to using these gradient-based optimization algorithms. In particular, gradient-based algorithms rely on the differentiability of error or goal functions, and they are likely to converge to local optima.

Evolutionary algorithms had been applied in the field of optimization to similarly complex problems, as they are less likely to become trapped in non-optimal solutions. It was a natural extension to apply evolutionary algorithms to weight training in neural networks, as this problem can be formulated as an optimization problem through which an error is minimized. Xin Yao reviews (to date) works using evolutionary algorithms (EA) to evolve/train artificial neural networks (ANNs), including using EAs to find weights, structure, learning rules, and input features in his "Evolving Artificial Neural Networks," *Proceedings of the IEEE*, Vol. 97. No. 9, pp. 1423-1447. September 1999. Yao cites results that indicate the combination of an EA and an ANN results in better systems than EAs or ANNs in isolation. Yao presents a thorough overview of algorithms that use evolutionary algorithms to train the weights of neural networks in "Evolving Artificial Neural Network Ensembles," *IEEE Computational Intelligence Magazine*, pp. 31-42, 2008. Yao notes four advantages of evolutionary algorithms to gradient-based algorithms. First, evolutionary algorithms do not depend on gradient information, which may be unavailable or difficult to calculate. Evolutionary algorithms can be applied to any neural network architecture, whereas gradient-based algorithms have to be adapted for different architectures. Evolutionary algorithms are much less sensitive to initial conditions. Evolutionary algorithms always search for global optima, rather than local optima. It is also important to note that evolutionary algorithms typically rely on a fitness function, rather than an error. This fitness function can often be easily translated to reinforcement learning problems, where the fitness function is the reward received. As noted previously, however, goal, or fitness, functions can be used to determine error functions, and vice versa. The most straightforward way to do this is to reverse the sign.

Many known evolutionary algorithms deal with only one form of evolution: very short term evolution. For this type of evolution, the structure of the network is fixed. The structure of the network includes the general architecture (i.e. feed-forward, recurrent, etc.), the number and layout of neurons (i.e. how many neurons should be included in a particular layer), and the number and nature of the connections (i.e. how the neurons should be connected). For these types of algorithms the structure of the neural network is mostly determined via experimentation. That is, a certain structure is tested, and if that structure does not work, more neurons or connections are added manually, increasing the complexity, until the network is able to handle the problem. This requires significant hand-tuning by the experimenter/researcher. Knowledge about the problem can be applied and intuition developed to decide what sort of structure is required by certain problems. For each problem, a new structure needs to be determined, and the selection of this structure relies entirely upon the knowledge of the structure designer. Networks with and without bias parameters and networks with different numbers of hidden neurons perform very differently. Because the structure has such a large effect on the efficacy of the network, an algorithm that learns what structure is needed to solve a particular problem is much more attractive than an algorithm that relies on prior knowledge or hand-tuning to design a structure. Constructive and destructive algorithms are algorithms that attempt to deal with this drawback. Both constructive and destructive algorithms attempt to learn a network structure, rather than relying on the trial and error approach. Constructive algorithms start with very small networks and increase their size by adding neurons and connections as needed for a particular problem. Destructive algorithms such as pruning begin with overly complex networks. Connections and neurons are then deleted to yield a minimal structure. These constructive and destructive algorithms would seem to solve the problem of finding a neural network architecture to use. However, there is a fundamental issue with these algorithms. Constructive and destructive algorithms follow strict sets of rules; for example, a constructive algorithm may only be able to add a single neuron at a time to a hidden layer. These algorithms therefore only explore a strict subset of possible architectures.

There are several drawbacks to using conventional evolutionary algorithms. Although the final overall solution may be more optimal than the solution reached by a gradient-based algorithm, evolutionary algorithms typically take longer to find a solution. Applying evolutionary algorithms to neural networks in particular comes with a variety of issues. Important factors include how to represent the networks in the population, how to measure performance and how to create offspring in a population. Evolutionary algorithms usually work with strings of real or binary numbers. There has to be a performance metric to gauge how "fit" a member of the population is. Creating offspring is usually done through mutation, crossover (recombination) or both.

Representations of a network need to maintain a link to the functionality of the network; otherwise, operations such as crossover will have no meaning. Performance is a key metric and is a problem-specific issue. For example, supervised learning problems have an associated error, which would need to be converted into a fitness value, while reinforcement learning problems have associated rewards, which would also need to be converted to fitness values. The mechanisms of offspring creation are usually closely related to the representation of the networks in populations.

If a network is not performing well enough using just back-propagation (i.e. the error between the expected and produced value has not lowered significantly), simulated annealing can be used. Finally, if it is still not performing well, the architecture can be mutated. Yao referenced above (and Liu) used this approach to attempt to reduce the computational cost of the evolutionary algorithm. They successfully apply their algorithm to several parity tasks.

This approach is similar to the proposed hierarchical evolutionary strategy discussed above, in that different types of evolution (very short term, short term, and moderate term) are tried. In particular, the combination of a genetic algorithm at a higher level and another algorithm, such as simulated annealing, numerical optimization methods such as non-linear programming, gradient, generalized gradient, and/or Newton's method, at a lower level can be used.

Montana and Davis in "Training Feedforward Neural Networks Using Genetic Algorithms," *Machine Learning*, pp. 762-767, 1989 use genetic algorithms to evolve the weights in a feed-forward neural network. They represent their networks as a list of real numbers and use mutation, crossover and gradient operators to create offspring. They successfully apply their algorithm to classification of sonar data, compare to back-propagation and incorporate domain-specific knowledge. However, their application to some real-world problems is hampered by the lack of a training algorithm for finding an optimal set of weights in a relatively short time.

D. B. Fogel et al. in "Evolving Neural Networks," *Biological Cybernetics* 63, pp. 487-493, 1990, use genetic algorithms (GA) to evolve the weights in a feed-forward neural network, but also note that GAs will also work for other models, such as recurrent neural networks. They represent their networks as a list of real numbers and use only mutation to create offspring. They apply their algorithm to exclusive-or and a blending problem and compare to back-propagation, with favorable results.

Xin Yao and Yong Liu introduce an evolutionary system called EPNet for evolving the architecture and weights of feed-forward artificial neural networks in "A New Evolutionary System for Evolving Artificial Neural Networks," *IEEE Transactions on Neural Networks*, 8, pp. 694-713, 1997. Yao and Liu attempt to maintain a behavioral link between parent and child by using node splitting rather than adding a fully connected node to a layer. EPNet also encourages simplicity in the network by always testing to see if a deletion will improve the network before testing an addition. They applied EPNet successfully to parity problems, medical diagnosis problems and time series prediction problems. They found that their networks generalized better than other networks developed or trained using other methods. This is one of the reasons a neuroevolution approach was selected in this work.

Yao and Liu introduce five mutation operations that, again, are chosen in succession to maintain simpler networks if possible. The five mutation operators they introduce (given in the order they are tried) are; hybrid training (train using a modified back propagation algorithm), neuron deletion, connection deletion, connection addition, and neuron addition.

Dario Floreano et al. in "Neuroevolution: from architectures to learning," *Evol. Intel.* 1, pp. 47-62, 2008, apply artificial neural networks to many real-world problems ranging from pattern classification to robot control. A generic architecture shown in their FIG. 1 is similar to that depicted in FIG. 3 wherein the external environment is connected to input neurons and output units impact the external environment. They describe a continuous-time recurrent neural network or CTRNN. These CTRNN's represent a first approximation of the time-dependent processes that occur at the membrane of biological neurons.

Randall D. Beer and J. C. Gallagher in "Evolving Dynamical Neural Networks for Adaptive Behavior." *Adaptive Behavior*, pp. 91-122, 1992, use evolutionary algorithms (EA) to train continuous-time recurrent neural networks (CTRNNs). They use dynamical parameter encoding to encode chromosome representing the network and use both crossover and mutation operators. They apply their CTRNNs to a food-finding task and a locomotion task (with six-legged agents).

A. P. Wieland in "Evolving Neural Network Controllers for Unstable Systems." *Neural Networks*, 2, pp. 667-673, July, 1991, uses a recurrent neural network model that learns weights and connections between neurons. A binary representation is used to represent the network, and mutation, crossover, and inversion operations are used to produce offspring. This method is applied to variations on the pole balancing problem (single pole, double pole, jointed pole, and two-legged walker).

S. Dominic et al. in "Genetic Reinforcement Learning for Neural Networks," *Neural Networks*, 2, pp. 71-76, 1991, compare genetic algorithms to reinforcement learning techniques. They use a feed-forward neural network, and real-valued strings are used to represent the networks. They apply their network and algorithm to the pole balancing problem and compare their results to a reinforcement learning method (Adaptive Critic Heuristic).

K. Stanley and R. Miikkulainen in "Evolving neural networks through augmenting topologies," *Evolutionary Computation*, 10(2):99-127, 2002, introduce Neuroevolution of Augmenting Topologies (NEAT), which has several innovations, including speciation to protect structural innovation, global innovation numbers to do historical tracking of network structure and help avoid the competing conventions problem, and makes use of incremental growth to avoid unneeded complexity in the networks. NEAT is applied to exclusive-or and to two pole balancing (with and without velocities) problems. They demonstrate that NEAT performs better than other neuroevolution methods on these tasks and demonstrate that the improvement in performance is due to those innovations.

K. Stanley, et al. in "Evolving adaptive neural networks with and without adaptive synapses," *Evolutionary Computation*, 2003. *CEC '03. The 2003 Congress on*, 4: 2557-2564, 2003, augment NEAT by including adaption of learning rules (such as local Hebbian learning rules) for each connection as part of the evolution. This allows for adaptation of networks to changes in the environment and is related to the ability to the network to do real-time learning. They apply this version of NEAT to a dangerous foraging example.

Jeff Hawkins et al. in "Sequence memory for prediction, inference and behavior," *Phil. Trans. Royal Soc. B*, pp. 1203-1209, 2009, describe a mechanism for storing sequences of patterns necessary for making predictions, recognizing time-based patterns and generating behavior. They suggest that the ability to store and recall time-based sequences is probably a key attribute of many, if not all, cortical areas. They propose that the neocortex may be modeled as a hierarchy of memory regions, each of which learns and recalls sequences.

Artificial neural networks are known implemented in "hardware" as may be distinguished from more "software" embodiments. For example, Glackin et al. in "A Novel Approach for the Implementation of Large Scale Spiking Neural Networks on FPGA Hardware." *IWANN* 2005, LNCS 3512, pp. 552-563, 2005, implemented a large scale spiking neural network on field programmable gate array (FPGA) hardware. A neuron, synapse, and spike timing dependent plasticity (STDP) blocks are implemented in FPGA logic, and neural network data are held in SRAM that is external to the FPGA device. Synapse weights are determined by spike timing dependent plasticity (STDP).

In 2007, Cassidy et al. in "FPGA Based Silicon Spiking Neural Array," *Biomedical Circuits and Systems Conference* (BIOCAS 2007), pp. 75-78, IEEE, 2007, present a FPGA based array of Leaky-Integrate and Fire (LIF) artificial neurons. Their neurons and synapses were fixed, and each synapse supported a "single" event and a delay function associated with the event. The synapses were able to implement STDP.

In U.S. Pat. No. 7,533,071, entitled "Neural Modeling and Brain-based Devices Using Special Purpose Processor" and issued to Snook on May 12, 2009, discloses a further FPGA hardware embodiment. Snook uses a special purpose processor and FPGAs to model a large number of neural elements. Each core of the FPGA could do presynaptic, postsynaptic, and plasticity calculations in parallel. It could also implement multiple neural elements of the neural model. The network was used to control a robot.

Sharp et al. in "Power-efficient simulation of detailed cortical microcircuits on SpiNNaker," *Journal of Neuroscience Methods*, 201, pp. 110-118, 2012 simulate an anatomically-inspired cortical microcircuit of ten thousand neurons and four million synapses using four SpiNNaker chips and less than two watts. The neuron model was very basic but consumed little power. Each chip consisted of 18 homogeneous processors.

It is known to utilize or implement central pattern generators with artificial neural networks. M. Anthony Lewis et al. in "Control of a robot leg with an adaptive a(nalog) VLSI CPG chip," *Neurocomputing*, 38-40, 2001, pp. 1409-1421, constructed an adaptive central pattern generator (CPG) in an analog VLSI chip, and uses the chip to control a running robot leg. A pacemaker neuron is used to control the firing of two motor neurons. Sensors are excited and inhibited the pacemaker, allowing the robot to adapt to changing conditions.

Thereafter, M. Anthony Lewis et al. in "CPG Design Using Inhibitory Networks," *Proc. of the 2005 IEEE International Conference on Robotics and Automation*, (ICRA 2005), pp. 3682-3687, 2005, implemented CPGs that are designed and optimized manually. A four-neuron, mutual inhibitory network forms the basic coordinating pattern for locomotion. This network then inhibited an eight-neuron network used to drive patterned movement.

It is also known to utilize analog circuitry for the construction of artificial neural networks. Simon Friedmann et al. in "Reward-based learning under hardware constraints—using a RISC processor embedded in a neuromorphic substrate," *Frontiers in Neuroscience*, 7, p. 160, 2013 proposed and analyzed in simulations a flexible method of implementing spike time dependent plasticity (STDP) in a single layer network on a wafer-scale, accelerated neuromorphic hardware system. Flexibility was achieved by embedding a general-purpose processor dedicated to plasticity into the wafer. It was possible to flexibly switch between synaptic learning rules or use different ones in parallel for different synapses.

U.S. Pat. No. 8,311,965 entitled "Area Efficient Neuromorphic Circuits Using Field Effect Transistors and Variable Resistance Material" issued to Breitwisch et al., Nov. 13, 2012, provides details for analog neuromorphic circuits using field effect transistors. Manually programmable resistances are implemented using phase change material.

U.S. Published Patent App. No. 2012/0109863 entitled "Canonical Spiking Neuron Network for Spatiotemporal Associative Memory," on May 3, 2012, to Esser et al, presents a layered neural net of electronic neurons configured to detect the presence of a spatiotemporal pattern in a real-time data stream, and extract the spatiotemporal pattern. The plurality of electronic neurons stored the spatiotemporal pattern using learning rules (STDP). Upon being presented with a version of the spatiotemporal pattern, they retrieved the stored spatiotemporal pattern.

U.S. Pat. No. 8,600,919 entitled "Circuits and Methods Representative of Spike Timing Dependent Plasticity of Neurons," to Poon et al., Dec. 3, 2012, describes a circuit and a method that could emulate STDP in a way that closely replicated biochemical processes, that could emulate all of the different types of STDP, and that could provide a relationship between the Bienenstock-Cooper-Munro rule and STDP.

U.S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass implements STDP using a simple analog circuit.

U.S. Pat. No. 8,510,239 entitled "Compact Cognitive Synaptic Computing Circuits with Crossbar Arrays Spatially in a Staggered Pattern" issued to Dharmendra S. Modha, Aug. 13, 2013, implements STDP using electronic neurons interconnected in a compact crossbar array network. Neurons could be implemented to include a "leak" function. The invention could be realized in an entirely hardware form, an entirely software form, or a hybrid software/hardware form.

U.S. Published Patent Application No. 2012/0036099 entitled "Methods and Systems for Reward-Modulated Spike-Timing-Dependent Plasticity" on Feb. 9, 2012, to Venkatraman et al, describes an area-efficient implementation of reward-modulated STDP. Three separate memories with entries for each synapse were used. The first two memories stored current and updated synapse weights, and the third was used to determine if the weight needed to be updated.

U.S. Pat. No. 8,433,665 entitled "Methods and Systems for Three-Memristor Synapse with STDP and Dopamine Signaling" issued to Tang et al., Apr. 30, 2013, proposes implementation of a three-memristor synapse where an adjustment of synaptic strength is based on Spike-Timing-Dependent Plasticity (STDP) with dopamine signaling. One memristor could be utilized for long-term potentiation (LTP), another for long-term depression (LTD), and the third as a synaptic connection between a pair of neurons with a variable strength.

U.S. Pat. No. 8,515,885 entitled "Neuromorphic and Synaptronic Spiking Neural Network with Synaptic Weights Learned Using Simulation" issued to Modha, Aug. 20, 2013, used computer simulation to determine synaptic weights which were loaded onto chips. Simulation was abstract and could be done using spike-timing dependent plasticity (STDP) or reinforcement learning. External learning allowed for small, efficient neuromorphic hardware systems.

U.S. Published Patent App. No. 2013/0073497 entitled "Neuromorphic Event-Driven Neural Computer Architecture in a Scalable Neural Network" on Mar. 21, 2013, to Filipp Akopyan et al, presents a spike event driven network where axons were connected to neurons by a synapse array. It uses a scheduler to deliver spike events to axons. Each neuron maintains a STDP variable that encodes the time of the most recent fire. It is used to implement LTP/LTD.

B. V. Benjamin et al. in "Neurogrid: A mixed-analog-digital multichip system for large-scale neural simulations." *Proceedings of the IEEE*, 102, pp. 699-716, 2014 created Neurogrid, an entirely clock-less system with sixteen mixedanalog-digital chips that simulate a million neurons with billions of synaptic connections in real time using sixteen Neurocores integrated on a board that consumed three watts. STDP was possible, but at a high cost to area, time, and energy efficiency.

Giacomo Indiveri et al. in "Neuromorphic silicon neuron circuits." *Frontiers in Neuroscience*, 5, 2011 describe "the most common building blocks and techniques used to implement" silicon neuron circuits and "compare the different design methodologies used for each silicon neuron design described, and demonstrate their features with experimental results, measured from a wide range of fabricated VLSI chips."

Cassidy et al. in "Cognitive Computing Building Block: A Versatile and Efficient Digital Neuron Model for Neurosynaptic Cores," *IBM Research*, 2013, presented TrueNorth, a scalable neurosynaptic computer architecture, which used leaky integrate-and-fire neurons. The input, the state, and the output were implemented with configurable and reproducible stochasticity. The invention has four leak modes that bias the internal state dynamics, deterministic and stochastic thresholds, and six reset modes for rich finite-state behavior.

Preiss et al. in "Compass: A scalable simulator for an architecture for cognitive computing." *Proceedings of the International Conference on High Performance Computing, Networking, Storage and Analysis*, p. 54. IEEE Computer Society Press, 2012 presented Compass, a multi-threaded, parallel functional simulator of the TrueNorth architecture. It successfully simulates $10^9$ neurons and $10^{12}$ synapses at 388 times slower than real time. It is event driven, not clock driven.

WO Patent App. 2004/027704 published Apr. 1, 2004, entitled "Spiking Neural Network Device." by Dario claims a device which stores a genotypic representation of a spiking neural network. Evolutionary algorithms are used to tailor networks to be used in control systems.

Gomez et. al. in "Efficient Non-linear Control Through Neuroevolution," *Machine Learning: ECML* 2006, LNCS 4212, pp. 654-662, 2006, introduce CoSyNE, a neuroevolution method that evolves recurrent neural networks at the weight-level. Networks are represented as a vector of real-valued weights, children networks are created using crossover and mutation, and networks are co-evolved by permuting subpopulations to allow for an increase in diversity. CoSyNE is compared with a large number of reinforcement learning and neuroevolution methods on the one and two pole balancing task. In their follow-up "Accelerated Neural Evolution through Cooperatively Coevolved Synapses," *J. Mach. Learn. Res.*, 9: pp. 937-965, 2008, Gomez et al. discuss CoSyNE in detail, as well as compare it with several reinforcement learning and neuroevolution methods. This work presents results for sixteen methods in total (including CoSyNE) on one pole and two pole balancing tasks, with and without velocities provided as input. The results demonstrated that neuroevolution methods perform better than reinforcement learning methods, and that CoSyNE performed the best of the neuroevolution methods tested.

Notwithstanding the advances in evolutionary artificial network architectures and algorithms, there remains a need for an improved neuroscience-inspired network architecture which overcomes the problems exhibited by known architectures.

SUMMARY OF THE PREFERRED EMBODIMENTS

In accordance with an embodiment of a method and apparatus for constructing a neuroscience-inspired artificial neural network that overcomes the deficiencies of the prior art, the embodiment exhibits five characteristics which differentiate over the prior art. Firstly, it is desirable that a neural network structure evolve over time. Evolution over time means that the learning algorithms of the prior art may not evolve in accordance with data (events) received at input neurons compared with the evolution achieved in accordance with the present invention and the present learning algorithms disclosed herein. The events may comprise spikes, the events (spikes) defined by a time and optionally a weight. Secondly, it is desirable that neural networks may be embedded into a geometric space. This characteristic suggests that the present invention seeks confinement, for example, to a geometric space in a similar manner that it is believed that the human brain and its sensory inputs and outputs are confined to a geometric space. Thirdly, it is desirable that neural networks comprise dynamic elements and operate on one of a continuous and a discrete time scale (the discrete time scale to accommodate digital implementations). By dynamic elements is intended the opposite of static elements such as dynamic neurons and dynamic synapses. Also, the concept of continuous time scale means an intention to differentiate from a discrete time scale or one only capable of one input at a time. Clearly, it is desirable if an artificial neural network is able two receive two inputs at the same time, that is, all inputs are continuously occurring and the network is continuously learning and making decisions with the expectation that the artificial neural network will adapt to its environment. Fourthly, it is desirable if useful substructures in neural network structures can be recognized and reused. That is, for example, the present invention is capable of identifying in a visualization those structures that are acting in response to a given input or continuous series of inputs. Then, theoretically, these same structures that have been identified may be reused to respond to a similar set of inputs. Fifthly, it is desirable if special-purpose emotion-related substructures and neurotransmitters can be incorporated into artificial neural networks. As suggested above, emotions such as fear or anger have been artificially simulated in the prior art individually but not collectively as to the collection of many emotion-related substructures.

An artificial neural network according to an embodiment of the present invention initially comprising a three dimensional structure in space comprises input neurons, hidden neurons and output neurons connected by synapses. Synapses in embodiments of the invention encompass the concepts of axons and dendrites. In other words, "synapse" is used to describe connections between neurons. Input neurons receive stimulus (data) from the environment. Output neurons cause a result in the environment. Hidden neurons are connected by synapses to other neurons and are located in a two dimensional or a three dimensional space with input neurons and output neurons. A neural pathway may comprise, for example, an input neuron, a synapse and a destination neuron. Desirably, at least one affective system is coupled to the artificial neural network for regulating at least one parameter associated with a neuron or a synapse and, preferably, may adjust that same parameter for each impacted like element in the network, neuron or synapse. In particular, a demonstrated affective system changes the thresholds of neurons in the network, which is analogous to a neurotransmitter in the brain making neurons more or less likely to fire. Consequently, a neuroscience-inspired artificial neural network architecture may comprise, for example, three such networks, coupled in simulated three dimensional space, comprises a neuroscience-inspired dynamic architecture (NIDA) comprising at least one computational network and, for example, first and second affective networks which may provide a simulation of LTP and LTD. This embodiment may be simulated on a well-known von Newman computer processing system so as to comprise a special purpose processing system for solving problems in control (a pole balancing problem by way of example), anomaly detection (data arrival rates at a node in a data network by way of example) and classification (recognition of handwritten numbers by way of example).

Moreover, simple neuron and synapse elements have been constructed in "hardware" to build two dimensional and three dimensional artificial networks for performing the same control, anomaly detection and classification problems. One circuit element may comprise either a neuron or a synapse (selectively). That is, a circuit element as described may be a neuron or a synapse but not both at the same time. These simple circuit elements may utilize the same parameters as those of the simulated networks. The simple circuit elements may be constructed into dynamic adaptive neural network arrays (DANNA's) having multiple levels of interconnections among neurons and synapses. The Xilinx Vivado™ Design Suite has been utilized to construct such a neuron/synapse and resulting DANNA of Xilinx Virtex-7 FPGA's. Both the simulated and hardware embodiments are continuously evolving over time under the influence, for example, of the affective networks and learning.

These and other embodiments and the control, anomaly detection and classification problem solutions will be discussed in some detail in the Detailed Description section and are introduced in the Brief Description of the Drawings section which follows.

BRIEF DESCRIPTION OF THE DRAWINGS

Embodiments of a method and apparatus for predicting object properties will be discussed in the context of the following drawings wherein:

FIG. 4, of PLOS 2013.

FIGS. 14A and 14B adapted from published color version, FIG. 6, of PLOS 2013.

FIG. 30 shows example hand-written digits from the MNIST handwritten database and scanning of numerals by row, by column and by row and column.

FIG. 33A-33D show network size information for the networks produced measured in number of neurons (by row, by column, by row and column and entropy-based); and FIGS. 33E-H show network size information for the networks produced measured in number of synapses by digit type.

Having provided a brief description and summary of aspects of the present invention, a detailed description of preferred embodiments follows.

DETAILED DESCRIPTION OF PREFERRED EMBODIMENTS

Figure 1:
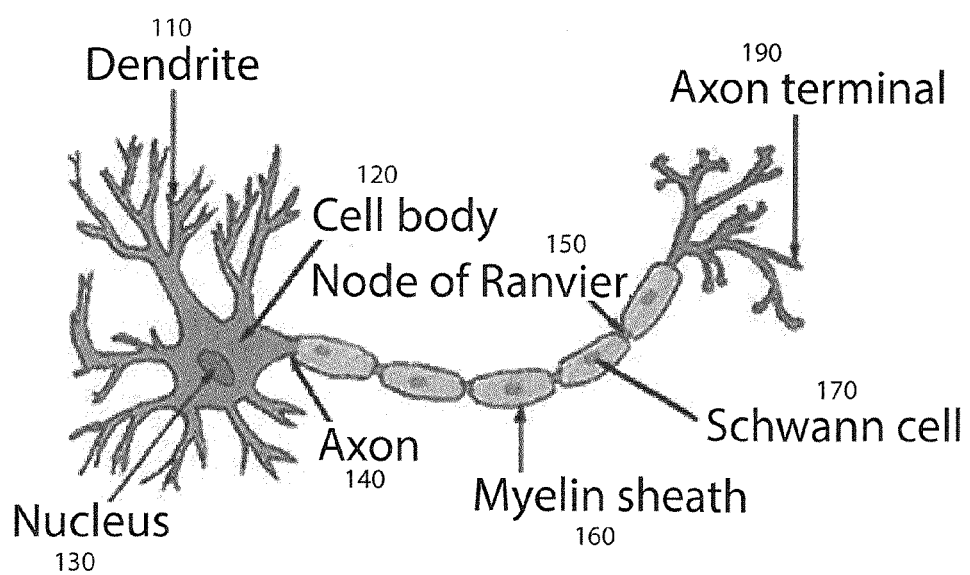
FIG. 1 is a prior art diagram showing selected features of a typical neuron and its components.
Figure 2:
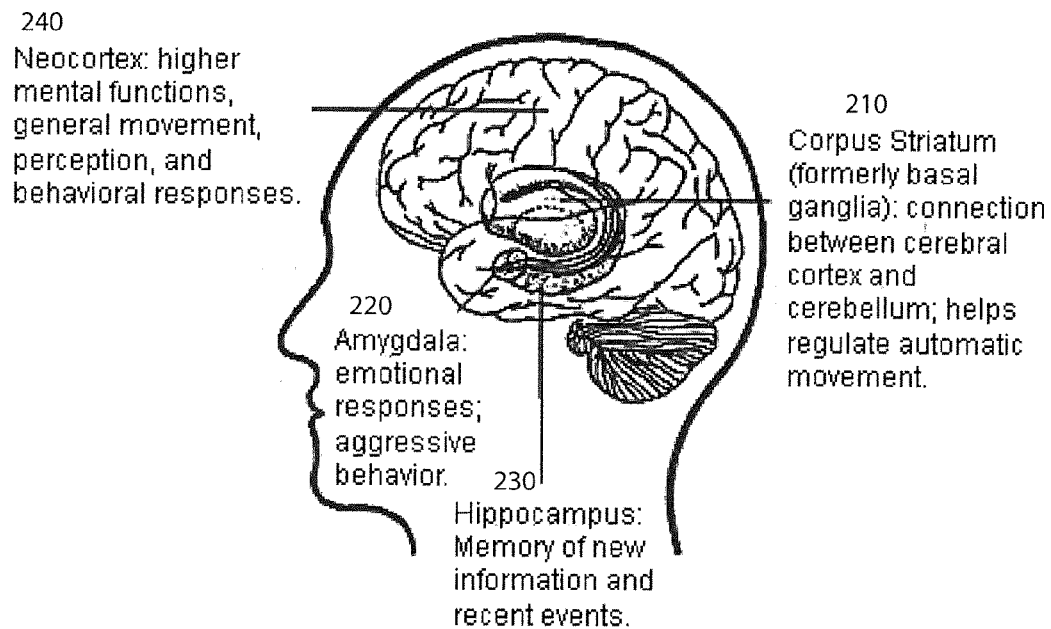
FIG. 2 is a prior art diagram of the human brain and some of its components.
Figure 3:
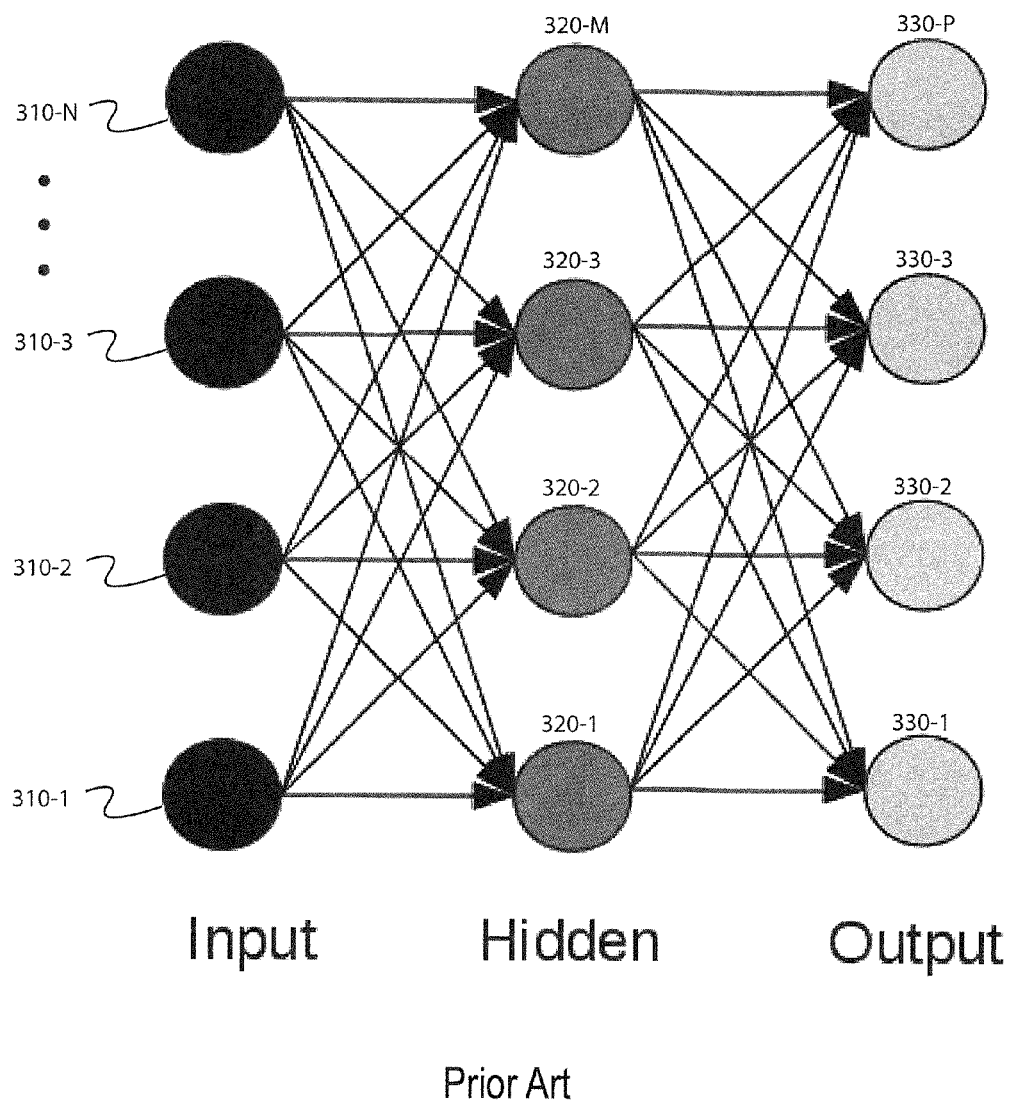
FIG. 3 is a prior art representation of a fully-connected feed-forward neural network showing input neurons, hidden neurons and output neurons.
Figure 4:
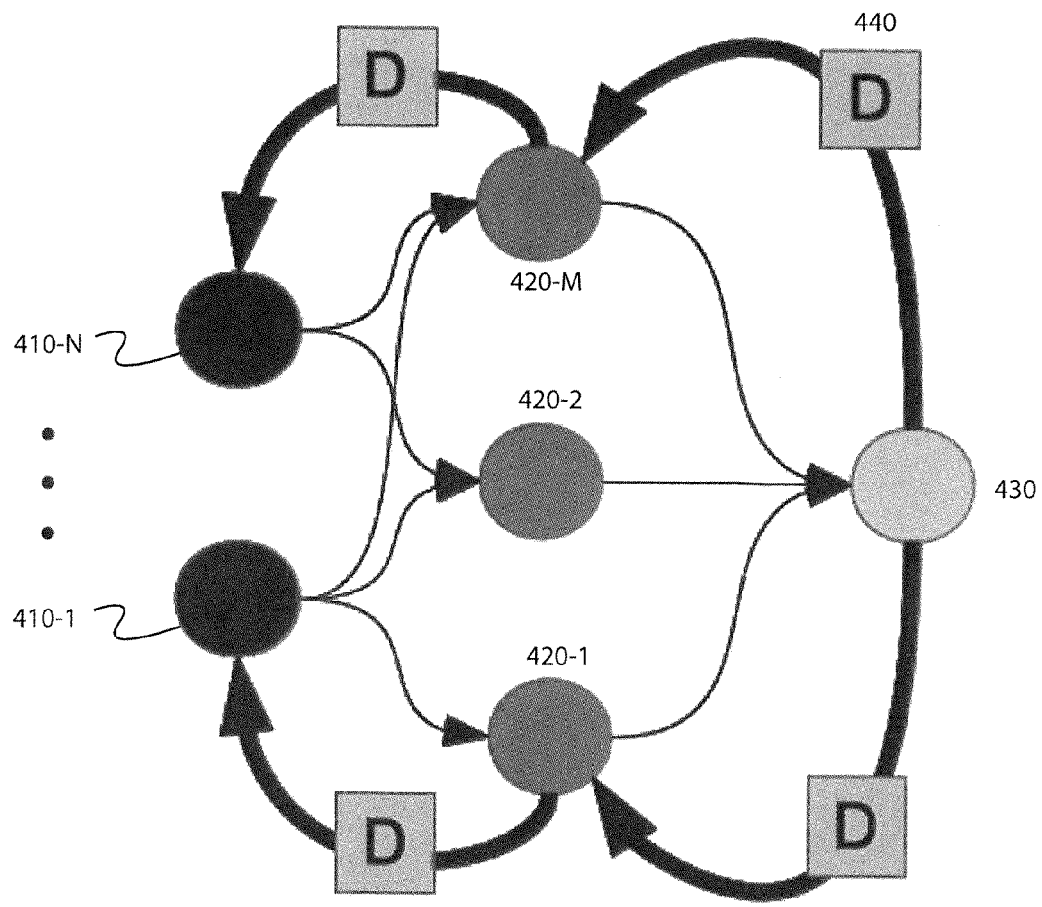
FIG. 4 is a prior art representation of a recurrent neural network with input, hidden and output neurons, the representation having delay elements labeled D.

Embodiments of a method and apparatus for constructing a neuroscience-inspired artificial neural network (NIDA) will be described with reference to FIGS. 1-50. A convention followed in this description and in the drawings is that the first digits of a reference numeral for an element represent the drawing number of that element in which it first appears and the second two digits represent the element. Similar two digit reference numerals are used in many cases to represent similar elements. For example, dendrite 110 first appears in FIG. 1 wherein the 100 series of elements represent FIG. 1 and the two digit 10 represents a dendrite. One embodiment of a NIDA comprises a computational network and zero, one or more affective systems. A dynamic artificial neural network array (DANNA) will also be briefly described which may be used in combination with, and/or as an alternative to a NIDA or other ANN known in the art.

The design of the artificial neural networks described herein draws inspiration both from biological neural networks and from traditional artificial neural networks from machine learning. It is important to note that a goal is not to directly simulate a biological network, and the simulations described herein are not intended to represent what occurs in the brain. A model of a neuron may be extremely simplified compared to an accurate model of a biological neuron. Even with the relatively simple neural implementation used herein, complex behavior may be generated by trading off complexity of the neuron for complexity in the network.

Figure 8A:
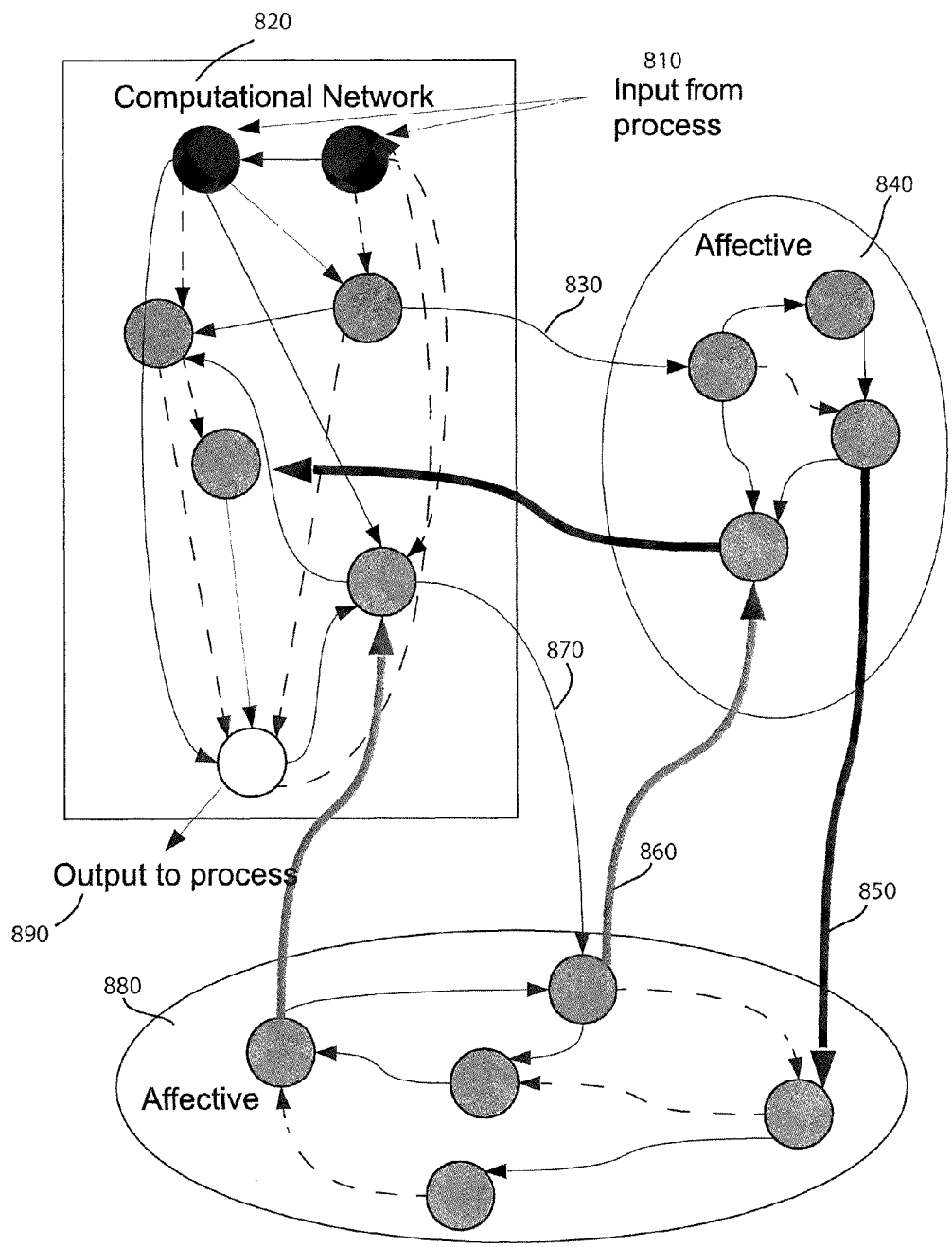
FIG. 8A shows coupled, simulated neuroscience-inspired neural networks comprising a computational network and at least one affective network (two affective networks shown)

In one implementation, each neuron is located at a point in three-dimensional space. Referring briefly to FIG. 8A, neurons can be input neurons, output neurons, both types, or neither type, depending on the requirements of the network. For example, an input from a process 810 is input to computational network 820 having two input neurons shown by way of example. Each neuron has an associated threshold and refractory period. In certain simplified implementations, both of these values are fixed for the network (i.e., every neuron in the network has the same threshold and refractory period). Neurons are connected to other neurons via synapses. These synapses are directed, so each neuron has a set of synapses to other neurons and a set of synapses from other neurons. The primary actions of a neuron are changes in charge and in firing. Charge is received by a destination neuron from its synapse(s) when an event occurs in a source neuron. The charge on a destination neuron is accumulated until that neuron's threshold is reached and then the destination neuron fires, unless it is in a refractory period.

When the threshold is reached, if the neuron is not in its refractory period, the neuron fires, and the neuron's charge is reset to zero (or neutral, as the charge may also be negative). If the neuron is within its refractory period, then, the neuron maintains its charge but does not fire. Thus, a neuron can accumulate charge during its refractory period, but it cannot fire during this period. As soon as a neuron fires, it enters its refractory period. One function of the refractory period is to place an upper limit on firing rate or frequency. This model of a neuron is inspired by the Hodgkin-Huxley model. In the present model discussed, the charge values and threshold values of the neurons may be bounded between −1 and +1.

Neuron thresholds and refractory periods, and synaptic propagation delays all introduce dynamic behaviors in the present network. Unlike most proposed ANN architectures, but similar to natural neural processes, these dynamic effects are distributed throughout the present network and are directly influenced in the generated ANN's by the evolutionary optimization methods used to construct and adapt the ANN's for specific purposes.

Synapses in the implementation discussed herein are defined by the neurons they connect. Specifically, each synapse goes from one neuron to another neuron. Each synapse has a distance between two neurons and a weight (or strength) of the synaptic connection. The distance between the two neurons affects how long it takes for charge to travel along the connecting synapse and the weight of the synaptic connection determines how much charge arrives at the second neuron after the first neuron fires. Alternatively, a time delay may be used instead of a distance. In this case, the positions of neurons are optional.

Figure 49:
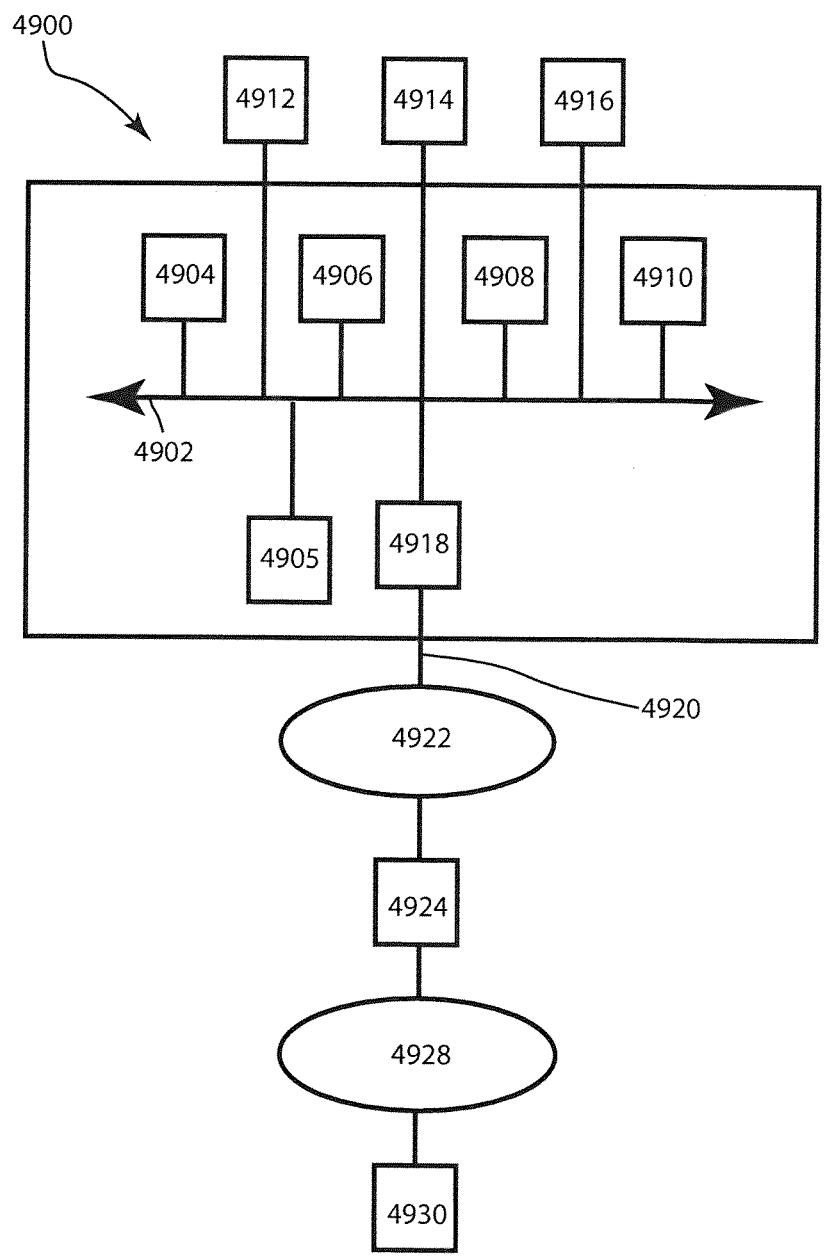
FIG. 49 provides an overall block diagram of a special purpose computer system for implementing a neuroscience-inspired dynamic architecture (NIDA) or fir controlling a DANNA, substructures thereof or combinations thereof for one of a control, anomaly detection and classification application.
Figure 50:
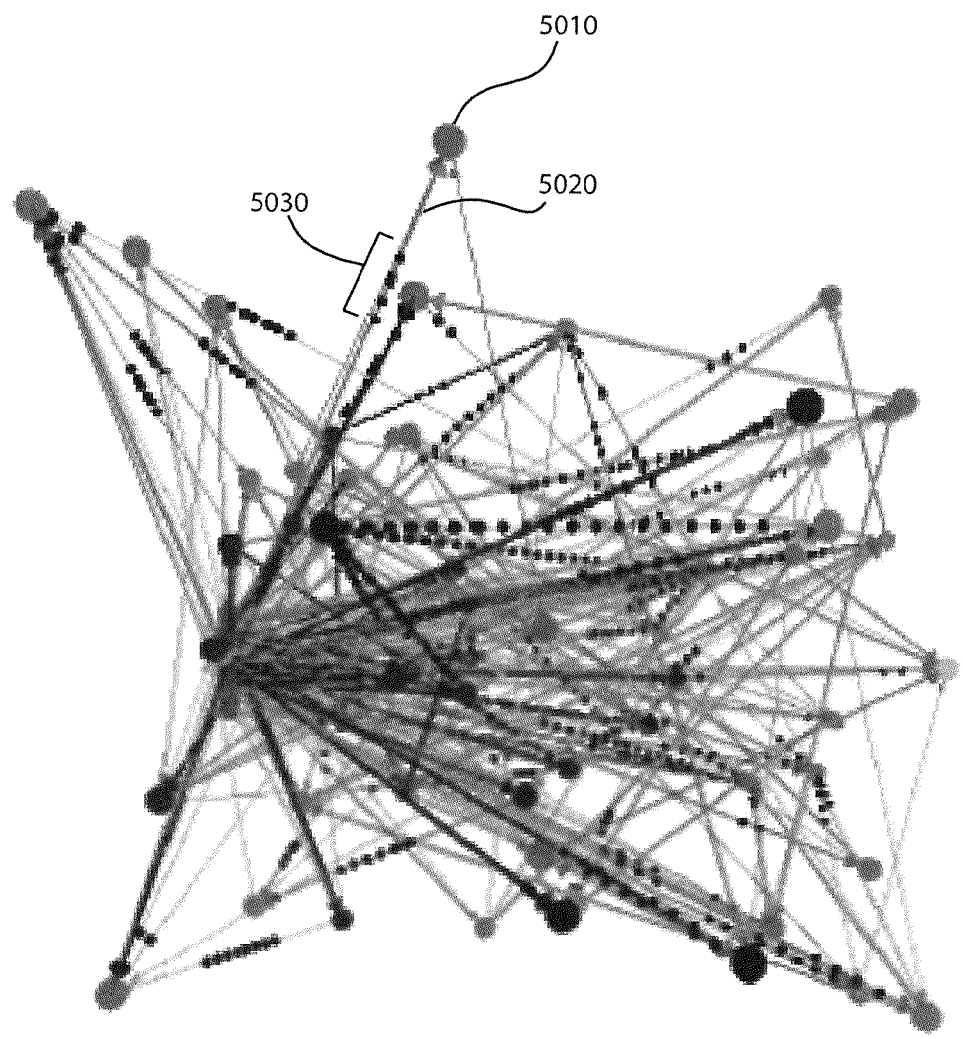
FIG. 50 provides a visualization of an artificial neural network for implementing a time delay in preference to a biological distance from a cell body to an axon terminal (or time delay of a synapse as used in the present embodiment).

By way of example, an artificial neural network implemented using the method and apparatus described herein is shown in FIG. 50, visualized using the method and apparatus described in U.S. patent application Ser. No. 14/513, 497 filed Oct. 14, 2014, entitled "Method and Apparatus for Constructing a Neuroscience-Inspired Artificial Neural Network with Visualization of Neural Pathways" of J. Douglas Birdwell, Mark E. Dean, Margaret Drouhard and Catherine Schuman, and incorporated by reference as to its entire contents (hereinafter, "visualization tool patent application"). Neurons are represented in FIG. 50 visually as spheres 5010, and synapses are represented visually as lines 5020 with cones or arrows indicating direction of event flows from synaptic inputs to synaptic outputs. One or more events represented by small spheres or icons 5030 progress along the lines that represent synapses as they traverse a distance or progress through a delay associated with the synapse. These events are output after a time, specified by the delay, (which may be computed using a distance and a propagation velocity) has passed following the time of each event's input into the synapse at the synapse's output and being presented to the input of the element to which the output is connected, which is typically a neuron but may be a synapse. The delay operation of a synapse may be implemented, for example, by a delay line, which may be digital, electronic, analog, or optical and may be a circuit or device such as a shift register, a queue, a linked list, or a first in/first out (FIFO) buffer. Whenever possible and practical, analog components may be used, for example, to reduce power consumption in a NIDA or a DANNA or support processor system such as is shown and discussed herein in connection with FIG. 49 and in the use of affective and learning systems. Multiple events may be represented in, reside within, contained in, or may traverse a synapse at the same time, for example, represented as binary values or numbers in a FIFO, shift register, or other type of buffer or memory, and are produced at the output of the synapse in the same order in which they are received. In one preferred hardware implementation, as disclosed in U.S. patent application Ser. No. 14/513,297 filed Oct. 14, 2014, entitled "Method and Apparatus for Constructing a Dynamic Adaptive Neural Network Array (DANNA)" of J. Douglas Birdwell, Mark E. Dean and Catherine Schuman and incorporated by reference herein as to its entire contents (hereinafter, "DANNA patent application"), a weight associated with a synapse is produced by the synapse and provided to an input of a neuron or synapse connected to the outputting synapse when the outputting synapse emits an event. In this case, it is preferred that the weight value being provided is the current weight value, accounting for any long-term potentiation (LTP) or long-term depression (LTD) activity up until the time the weight is output. Alternate implementations may associate a current weight value with an event that is input to the synapse, causing that weight value to be output after a time has passed as specified by the delay value associated with the synapse, or may associate no weight value or a fixed weight value with an output event generated by a synapse. The second case, for example, is preferred when the output of the synapse is connected to the input of another synapse. Similar functionalities can be provided in software implementations of NIDAs.

As is the case in biological neurons, synapses may be inhibitory (negative), in which case the firing of neuron at one end of the synapse results in the decrease of charge at the neuron on the other end, or they may be excitatory (positive), in which case the firing of the neuron at one end results in the increase of charge at the neuron on the other end. One network model discussed herein does not include the concept of myelination (fat growth which decreases delay); if two synapses are each of length d, then, it takes the same amount of time for charge to travel from one end of each synapse to the other. A second network model may simulate myelination using a propagation velocity parameter associated with each synapse, or selected synapses.

Two actions associated with synapses are processes similar to long-term potentiation (LTP) and long-term depression (LTD). LTP and LTD occur in biological brains. It is speculated that they play a major role in learning. If charge traveling along a synapse from neuron A to neuron B causing neuron B to fire, then, the weight of that synapse increases. In one implementation discussed herein, LTD occurs at that synapse if charge is received by neuron B during its refractory period. LTP increases the weight of the synaptic connection by a fixed value (specified for the entire network or a class of synapses), and LTD decreases the weight of the synaptic connection by the same fixed value. Synapses may have a refractory period associated with LTP and LTD, which prevents changes to the weights from occurring too rapidly.

It is important to note that, for many purposes, LTP and LTD could have been omitted altogether. However, a goal of the present work is to use an affective system to control or to modulate the behavior of a neural network that is learning to perform a certain task. Learning for such networks causes not only the synapse weight values to change, but also the structure of the network to change. To demonstrate that an affective system can, in fact, control a learning network's behavior, some form of learning is included in the network. In a simple pole balancing example discussed herein, learning is more complex because the structure of the network also changes over time. Anomaly detection and classification will be discussed herein after control applications such as solving the pole balancing problem.

The networks used for pole balancing are defined on a grid in three-dimensional space. Maximum x, y, and z (called $M_x$, $M_y$, $M_z$) magnitudes are defined below by way of example, as well as the granularity $\delta>0$ of the grid. Neurons may be located at coordinates in the grid, (x, y, z), where $-M_x \leq x \leq +M_x$, $-M_y \leq x \leq +M_y$, and $-M_z \leq z \leq +M_z$, and the values of x, y, and z may be integral multiples of the granularity $\delta$. We may alternatively define the maximum and minimum x, y and z values in the network to form alternative grid shapes in three dimensional space. The granularity parameter specifies how close two neurons in the grid can be. Other approaches may be used in two or three dimension space (or over time, or another fourth dimension).

Simulations may take place at the network level and are discrete-event simulations. Networks may have associated event queues, in which different event types are specified to occur at some time in the simulation. A unit of simulation time is the amount of time it takes for charge to travel one unit in space. For example, if two neurons are connected and are located one unit apart (i.e. a neuron at (0,0,0) and a neuron at (0,0,1)) then one unit of simulation time is the amount of time required for charge to travel from one of the neurons to the other.

Five example event types are defined: addition of charge to a neuron, firing a neuron, adjustment of thresholds, an input pulse event, and a change in the desired firing rate. The addition of charge to a neuron and the firing of a neuron are internal events, which are caused by other events within the network. Input pulse events are events in which the network interacts with its environment. The adjustment of a threshold or event is an interaction of the network with the simulated affective system (or systems). The change in the desired firing rate event is an interaction between the environment and the simulated affective system. Output events, in which the network gives information to the environment, can be defined for applications, such as the pole balancing application of a control category of applications discussed in the results section.

The adjustment of thresholds event type preferably applies a network-wide change to the threshold of every neuron in the network but may apply the change to only selected increased (decreased) thresholds. The amount to change the threshold is determined by the affective system. The current firing rate of the network and the desired firing rate of the network are inputs to the affective system. The output of the affective system is the amount to change the thresholds by in the network. Firing rates may conform to the environment or external process of a NIDA/DANNA and the selection of components in the design of computational, affective, learning and evolutionary optimization systems may incorporate goals of speed and conservation of power through the appropriate selection of analog and digital components and to reduce lengths of signal lines.

An affective system 840, 880 (FIG. 8A) may be used and receive an input 830 (or 870 with affective system 880) and provide an output to computational network 820 as well as provide an input 850 and receive an output 860 from a second affective system 880 which may also provide an output to computational network 820 (which in turn provides an output to a process 890). An affective system may be determined by the following equations, which could be replaced by a second neural, or discrete event, network. $f_t$ is the firing rate of the network, measured over a certain window, at time t. This is the input provided to the affective system from the network, $d_t$ is the desired firing rate at time t. This desired firing rate is provided by the environment and can be changed by a desired firing rate event. The error at time t, $e_t$, is calculated:

$$e_t = f_t - d_t \tag{1}$$

There may be no affective system, one affective system or two (or more) affective systems 840, 880: for example, a simple affective system 840 with two parameters and a slightly more complex affective system 880 with three parameters. The simple affective system may be used in examples below, unless otherwise noted. Both affective systems have the parameter w>0, which is the window size of the system and specifies how often the error is recalculated. In the simple affective system, the change in the threshold at time t is calculated:

$$\Delta \tau_t = \alpha e_t \tag{2}$$

The parameter $\alpha$ is a weighting term, and the change in the threshold at each time step is proportional to the firing rate error. $\Delta \tau_t$ is the amount that every threshold (or each selected threshold) in the network is changed at time t. This result is passed back to the computational network, and the change is applied to all of the neurons in the network (or the selected subset); if all, since all of the neurons have the same initial threshold value of 0.5, all neurons in the network maintain the same threshold value throughout the simulation (except in the pole balancing task). The threshold is bounded to be in the interval [−1, +1], and equation (2) has no effect if it would cause either bound to be violated.

In the more complex affective system, for example, affective system, a second parameter, $\lambda$, is added. A geometrically averaged error at time t, $E_t$ is calculated:

$$E_t = \lambda E_{t-w} + (1-\lambda) e_t \tag{3}$$

The parameter $\lambda$ of the second affective system may be a decay rate. It defines how much error at times 0 through t−1 will affect the change in the threshold at time t. With this second affective system 880, the change in the threshold at time t is calculated:

$$\Delta \tau_t = \alpha E_t \tag{4}$$

where, again, α is a weighting term. In both cases, the result Δτ is passed back to the network, and the change is applied to all of the neurons in the network (or the selected subset). Note that the first and second systems are equivalent if λ=0. The same boundary logic applies as with equation (2).

A goal is to demonstrate that a simple affective system interacting with an artificial neural network can have a noticeable effect and can stabilize the average firing rate at desired levels. To illustrate this approach, an exemplary network (except for those networks trained to complete the pole balancing task) may have 1000 neurons and 10,000 synapses, where $M_x=M_y=M_z=100$. This is a relatively large artificial neural network, but compared to the human brain, this is a very small network. It is important to note, however, that we are not attempting to model a biological neural system with our artificial neural networks; our artificial neural networks are merely motivated by biology. The tasks these artificial networks are applied to are specific and well-defined. As such, they can be thought of as analogs to the small portions of the neocortex that implement specific functionalities. Networks with different numbers of neurons and synapses yield similar results, though they are not shown in this work.

The initial neuron placements in the network are random, and the distribution of the synapses is random, but with a higher likelihood of connectivity between spatially close neurons than neurons that are farther apart. In this network structure, there are 200 possible x-coordinate values, 200 possible y coordinate values and 200 possible z coordinate values, resulting in $8\times10^6$ possible locations for neurons in this exemplary network. A specific instance or realization of an exemplary network may have neurons at 1000 of these locations, randomly selected according to a uniform distribution, except no two neurons are allowed to occupy the same location.

A typical network may have a single input neuron that receives information from the environment. The control, for example, pole balancing network may have many input neurons. The "environment" in a setup consists of two things: pulses sent to the input neuron at, for example, exponentially-distributed random intervals, with a mean firing rate of 0.1 firings per unit time, and an input to the affective system that sets the current desired firing rate, in this example, for the aggregate of all neurons in the network. This input plays the role of a persistent external excitation used to initiate and promote firing events in the network. This is an extremely simple environment; more complex tasks have richer environments that provide meaningful information to the network and receive signals produced by the network (see the pole balancing example below). The affective system may monitor the behavior of the network and applies the threshold changes to the network every w (the window size) units of simulation time. For the tests described in this example and by way of example, w=10.

All neurons in the network may have a refractory period of one, which means that there is an upper limit on the firing rate of the network; since each neuron can fire at most once in a single simulated time step, the maximum firing rate of the network per time step is 1000. This assumes that the network is fully connected, which is not a requirement placed on the random initialization of the networks. There may be neurons that have no incoming synapses or neurons with no outgoing synapses, which would further limit the maximum firing rate of the network, and the network is not necessarily connected.

In preliminary experiments, the parameters of the affective system are set to be α=0.001 and w=10. The long term potentiation/long term depression refractory periods are set to be 10, and the weights are adjusted up (for LTP) and down (for LTD) by 0.001. The parameters used in the pole balancing task are slightly different and are described in the Table 1.

TABLE 1

Network and Affective System Parameters

| Parameter | Value |
| --- | --- |
| $M_x$ | 100 |
| $M_y$ | 100 |
| $M_z$ | 100 |
| Network granularity δ | 1 |
| Λ | 0.001 |
| λ | 0 |
| LTP/LTD refractory | 100 steps of simulated time |
| Amount LTP/LTD adjusted | 0.001 |
| Window size w | 20 |

Results

A first goal is to demonstrate that, even with two very simple controlling affective systems, the network's firing rate can be adjusted and stabilized. The environment provides the single firing rate (for example, a value between 50 and 950) to the affective system at the beginning of the simulation. The simulation may be allowed to run for 10,000 simulated units of time, where the input pulses are randomly applied as described above, and the affective system(s) update(s) the threshold of the network every ten simulated time units (w=10).

Figure 9A:
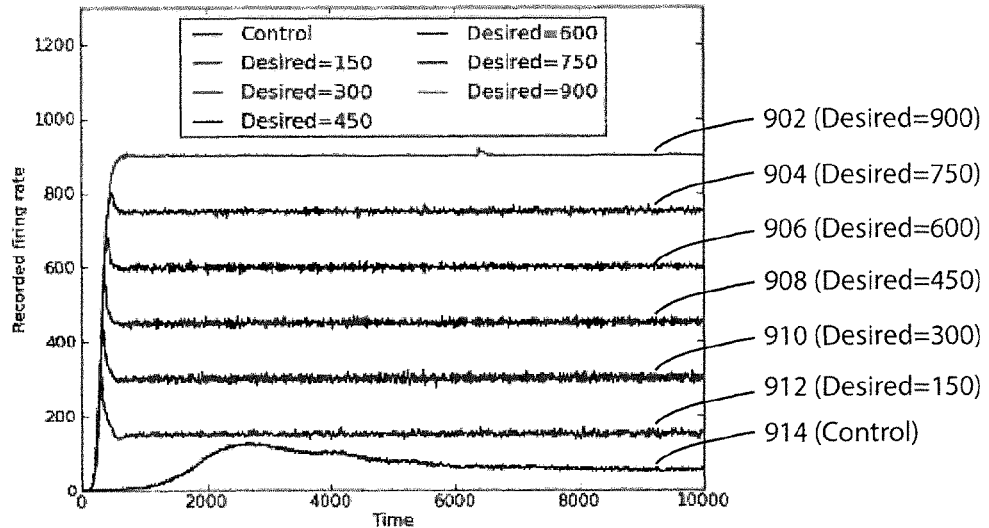
FIG. 9A shows simulation results for a control firing rate and desired firing rates at a range from 150 to 900 and Lambda=0.
Figure 9B:
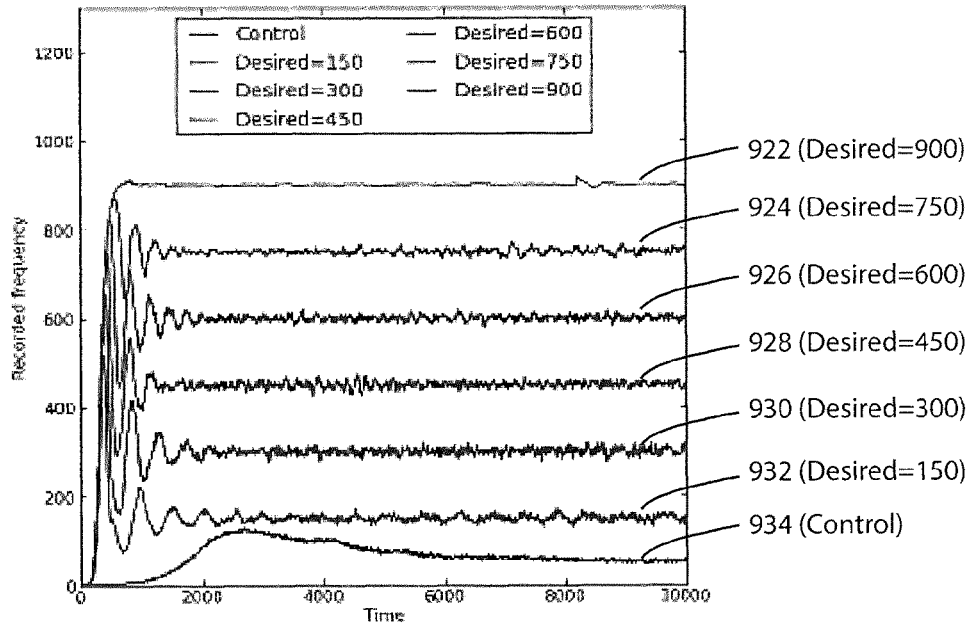
FIG. 9B shows similar simulation results with Lambda=0.9 adapted from published color version, FIG. 1, of C. D. Schuman and J. D. Birdwell, "Dynamic Artificial Neural Networks with Affective Systems," *PLOS ONE*, vol. 8, is. 11, pp. 1-16, 2013 (hereinafter, PLOS 2013).

The same tests may be run for 100 random network structures (each with 1000 neurons and 10,000 synapses). An interesting result is that similar results were seen in each case. FIGS. 9A and 9B shows simulation results for both the simple system (λ=0) and the more complex system (λ=0.9), where α=0.001, for one representative random network structure with 1000 neurons and 10,000 synapses. FIG. 9A (λ=0) and 9B (λ=0.9) show the results for a range of desired firing rates (for example, 150 to 900 in increments of 150). A control trace is also shown, demonstrating how the network behaves with the same set of input pulses, but without an associated affective system.

An overall block diagram of a special purpose computer processing system 4900 will now be described with reference to FIG. 49. FIG. 49 illustrates an overall system block diagram of a special purpose processor architecture and environment 4900 that may be used according to an illustrative embodiment of a NIDA and/or for controlling a DANNA, combination thereof or combination of substructures thereof for performing at least one of a control, detection and classification program application. The processor may comprise but not be limited to comprising a computer or an intelligent device such as a smart telephone, personal computer, server, client, or other processing device. The special purpose processor features a neural event data collection and identification software application for receiving data from one or more various input devices (electrodes, camera, scanner, keyboard, touchscreen, analog to digital converters, modulators and other known input devices) and includes but is not limited to including a communications interface or interfaces, a program controlled computer and/or a computer bus and output devices such as human body implants, radio frequency data transmitters, computer displays, and other output devices known in the art.

Comparison of one or more neural network's performance against a desired performance or the behavior of a device or process may be done manually or automatically and may include learning in a learning environment prior to application, using special purpose or customized hardware or a separate computer or processor, or, according to a computer-implemented algorithm on a computer system 4900 according to FIG. 49. At least one input device receives a neural event or spike that may, for example, comprise an analog to digital converter or a modulator such as a modulator using pulse width modulation or another modulation method known in the art for encoding varying signals or sampled signal values as discrete or digital values or events, and, as appropriate, a neural event simulator or hardware device. Methods of a first embodiment and subsequent embodiments of a system 4900 may be utilized in connection with computer readable media which may be provided for temporary or permanent storage in a personal computer, an intelligent communications device or other computer or computer system 4900 comprising one or more parallel processors known in the art. Two or more computer systems 4900 may be employed to operate neural networks and implement interfaces between neural network simulations and their environments or operating neural networks in real time in a cooperative manner in order to address large-scale applications in the control, detection and classification arts. In this case, the two or more computer systems 4900 may communicate using communications devices within or attached to each computer system 4900 such as a network adapter, a radio transceiver, a cellular telephone or a device that interfaces to a packet-switched network or a telephone line. For real-time applications of control, detection and classification, computation speed is important, and communication and external processor delays may be preferably avoided.

FIG. 49 is a block schematic diagram that illustrates a computer system 4900 upon at least one embodiment of a NIDA, a DANNA, a substructure thereof or combination of any of these with other functioning neural networks known in the art. Computer system 4900 may include a bus 4902 or other communication mechanism for communicating information, and at least one device 4904 such as an input device that may be an analog to digital converter, at least one electrode, a modulator or an event data receiver coupled with the bus 4902 for receiving, processing and forwarding collected event data information for local use or remote transmission to a remote server. Other devices 4904 may comprise an are not limited to a camera, a GPS system, a scanner, an event simulator, an environmental data sensor, real-time of day and date stamping, interfaces to mammalian (human or otherwise) tissues including neural tissues or cells, muscular tissues or neuromuscular biological systems, robotic systems, location and movement sensing of a simulated human body, reporting devices and other known devices, for example, of a typical personal computer and/or medical devices for collecting data. Further such devices may comprise a computer, a graphics processor, a FPGA or another digital device having a configuration or program and simulating the behavior of a physical system such as a mechanical linkage, an engine, a compressor, a motor, a power generation system or a biological organism.

Computer system 4900 also includes a main memory 4906, such as a random access memory ("RAM") or other dynamic storage device, coupled to bus 4902 for storing information and instructions to be executed by controller processor 4905. Main memory 4906 also may be used for storing temporary variables, parameters or other intermediate information during execution of instructions to be executed by processor 4905 such as a neural network event data collection, image and identification software application or human identification software application. Memory may also be used as a communications medium or device to effect the transfer of information between computer system 4900 or its components and substructures such as another computer system 4900, a computer peripheral (for example, a keyboard, touchscreen, printer or display) or another type or category of processor such as devices within a supercomputer or implemented using a FPGA, a graphics processor or other device configured to operate as a neural network. Computer system 4900 may further include a read only memory ("ROM") 4908 or other static storage device coupled to bus 4902 for storing static information and instructions for processor 4905. A storage device 4910, such as a magnetic disk, optical disk, solid-state memory, or the like, may be provided and coupled to bus 4902 for storing neural event information, neuron and neural network image or visualization data and computer command data and instructions. Such stored information may optionally be modified by the execution of a stored program on a processor 4905 in computer system 4900 or located in another system or device. For example, such stored information may be accessible to other computer processors, devices or peripherals via a direct memory access (DMA) protocol and hardware or by using a communications channel. A storage device or any device coupled to the bus 4902 may be removable using a coupling mechanism such as a universal serial bus (USB) or other hardware specific to the type of storage hardware, such as a CompactFlash, SD or microSD card reader or port (or the port may be local such as a wireless LAN). A removable storage device may be utilized to transfer information to or from computer system/intelligent device 4900. Information may also be transferred using a computer network or other communications network. Any of memories 4906, 4908, 4910 may retain program instructions according to any embodiment of data collection software and analysis hypothetically related to a simulated or real neural network, for collecting measurement data from, for example, a chemical, electrical, environmental, energy, vehicle system or transportation system or infrastructure. Measurement data may be collected in the form of events, as in, for example, events that correspond to the transmission of packets of data in a communications or communication network or through a communications device such as a network switch or amplifier.

Computer system 4900 may optionally be coupled via bus 4902 to a display 4912, such as a cathode ray tube ("CRT"), liquid crystal display ("LCD"), plasma display, television, small intelligent mobile telephone display or the like, for displaying information about the neural network and its modification from program execution or command instructions from the neural team or predetermined command instructions to a trained computer user. Display 4912 may provide a virtual keyboard for data input, a real keyboard (touchscreen), a joystick, a mouse and selector, a neural network reader or a one or two dimensional bar code reader via a camera or a touch screen. Display 4912 may provide a screen image comprising a whole or portion of a neural network configuration, optionally including at least one input neuron, an output neuron, neurons connected between input and output neurons by synapses and a visual representation of the structure of the neural network, for example, by displaying icons representing neurons and lines or arcs, with or without arrows or other designations indicating directions and coloring or shading or dash/dotted lines indicating activities or portions of the neural network. The screen image in one embodiment may be split to display multiple views, including, for example, a display of a neural network configuration or status and a visual camera image section for showing the environment of the control, detection or classification application. There may be a section of the image providing an ordered command set selectable for different possible neural stimulation events, showing a causality path, tracing a neural pathway from a particular input neuron and a display of information about an external or monitored process.

Alternatively, displayable information may be delivered to or collected from a computer user or another computer system or computer program using a communication interface 4918 or removable storage device. Communications interface 4918 can function as an interface between computer system 4900 and additional devices for collection of information, such as a neural stimulator for simulated senses, one or more affective systems, a neural probe for receiving electrical or magnetic signals corresponding to neural events in living tissue. The analog to digital converter, modulator or other devices 4904 as are well-known in the field in addition to a neural network event input device. Devices 4904 can include a digital to analog converter or a demodulator or a relay or other device capable of responding to events generated by a neural network during its simulation or real-time activity to affect an output of information to another device or system.

Communication interface 4918 can enable communication using wires, wirelessly (e.g. Bluetooth or WiFi), optical fiber, infrared light-emitting diode and photo reception, carrier wave, electromagnetic waveform or other technologies known in the art. There may be more than one communication interface 4918 (for example, satellite and land-based RF). An input device 4914, which may include a physical or virtual keyboard including alphanumeric and other keys, may be coupled to bus 4902 for communicating information and command selections to processor 4905 and for storage in memory. An optional type of user input device is cursor control 4916, such as a mouse, trackball, stylus, or cursor direction keys, for example, as may be found on some personal data assistants (PDA's) for communicating direction information and command selections to processor 4905 and for controlling cursor movement or the display on display 4912. The input device typically has two degrees of freedom in two axes, a first axis (e.g., x) and a second axis (e.g., y), that allows the device to specify positions in a plane. This input device may be combined with a display device such as a LCD with a touch screen, commonly found on mobile telephones or other telecommunications or presentation devices such as the Apple iPad or a computer tablet using the Android operating system. Alternatively, information and command selections may be communicated to processor 4905 using a communication interface 4918. Optionally, separate communication interfaces (for example, a WLAN) may be used to deliver information to a computer user or another computer system 4900 or computer program, and to communicate information and command selections to processor 4905.

The invention is related to the use of computer system 4900 for local and remote and automated neural network support with respect to a particular neural event or collection of sequential events. Such neural event data may be read into main memory 4906 from another computer-readable medium, such as storage device 4910 or via a keyboard. Execution of the sequences of instructions contained in main memory 4906 causes processor 4905 to perform the process steps described herein. In alternative embodiments, hard-wired circuitry may be used in place of or in combination with software instructions to implement the invention. For example, a field-programmable gate array (FPGA), VLSI or application-specific integrated circuit (ASIC) may be used. Such a device can, for example, implement associative memory to aid in indexing, search, and retrieval of neural network information or substructure or component information stored in memory or a database or library thereof to, for example, identify an event and provide a response. Thus, embodiments of the invention are not limited to any specific combination of hardware circuitry, computer systems 4900 and software. For example, one processor 4905 may be a control processor and optionally implement an evolutionary optimization algorithm and another processor 4905 may implement one or more neural networks (NIDA's or substructures thereof or related neural networks such as a DANNA) and include interfaces to and form a process, device or neural network for one of a control, anomaly detection and classification application.

The term "computer-readable medium" as used herein refers to any medium that participates in providing instructions to processor 4905 for execution or for storing information in a form that can be accessed by a processor. Such a medium may take many forms, including but not limited to, non-volatile media, volatile media, and transmission media. Non-volatile media includes, for example, optical or magnetic disks, solid state memories, and the like, such as storage device 4910. Volatile media includes dynamic memory, such as main memory 4906. Such a medium is non-transitory. i.e., it is intended to store data and computer instructions and does not output data to transmission media unless requested. Transmission media includes coaxial cables, copper wire and fiber optics and antennae. Transmission media can also take the form of acoustic or light waves, such as those generated during satellite and land-based radio wave and telecommunications data communications.

Common forms of computer-readable media include, for example, a floppy disk, a flexible disk, hard disk, magnetic tape, or any other magnetic medium, a CD-ROM, any other optical medium, solid-state memory, punch cards, paper tape, any other physical medium with patterns of holes, a RAM, a PROM, and EPROM, a FLASH-EPROM, any other memory chip or cartridge, a carrier wave, or any other medium from which a computer, controller or processor can read. Various forms of computer readable media may be involved in outputting one or more sequences of one or more instructions to processor 4905 for execution.

Computer system 4900 may include one or more communication interfaces 4918 coupled to bus 4902. Communication interface 4918 may provide a two-way data communication coupling to a network link 4920 that may be preferably connected, for example, to a local area hospital network, a manufacturing site network or a chemical or energy process measurement network 4922 for one of control, anomaly detection or classification. The network 4922 may be used to affect the control of or take other automated actions within the hospital, manufacturing site network, chemical or energy process or other systems, sites or processes with similar networked communications infrastructure. For example, communication interface 4918 may be an integrated services digital network ("ISDN") or digital subscriber line (DSL) card or a modem to provide a data communication connection to a corresponding type of telephone line or wireless link. Preferably, communications transmitted over such a link are encrypted or otherwise protected according to known encryption schemes and/or watermarking algorithms to uniquely identify a source, for example, of a neural network event capture device or camera or scanner or neural network imager or graph or other input source. As another example, communication interface 4918 may be a network card (e.g., an Ethernet card) to provide a data communication connection to a compatible local area network ("LAN") or wide area network ("WAN"), such as the Internet or a private network. Wireless links may also be implemented in an example of running neural event simulation algorithms for improving an artificial neural network via an intelligent telecommunication device using, for example, WiFi, Bluetooth, or third generation (3G) or fourth generation (4G) wireless technologies such as WiMax or LTE. In any such implementation, communication interface 4918 sends and receives electrical, electromagnetic or optical signals that carry digital data streams representing various types of information between an artificial or real neural network and a neural event data collection device (such as an analog to digital converter). For example, a neural event may require a data communication connection to an information database comprising, for example, an artificial neural network for performing control, anomaly detection or classification, substructure thereof, component or a real neural network of millions of neurons. Portions of the computations associated with the collection and identification of neural event data and improvement of the artificial neural network through learning, the use of affective systems and evolutionary optimization as described herein may be distributed across multiple computer systems 4900 which may communicate using one or more communication interfaces 4918.

Network link 4920 typically provides data communication through one or more networks to other data devices. For example, network link 4920 may provide a connection through local network 4922 to a host computer 4924 or hospital server or manufacturing site, chemical or energy process or other systems, sites or processes or to data equipment operated by an Internet Service Provider or private network service provider ("ISP"). Such a service provider may operate in a "cloud" computing environment such that it is a web accessible service for, for example, an artificial neural network. The "cloud" may provide a NIDA for one of control, anomaly detection or classification or a component such as a visualization tool. An ISP in turn provides data communication services through a packet data communication network such as the worldwide network commonly referred to as the "Internet" 4928, an extranet, an intranet or other private or public network. An example of a private network is a secure data network used for transmission of information, commands and data. Local network 4922 and Internet 4928 both use electrical, electromagnetic or optical signals that carry digital data streams. The signals through the various networks and the signals on network link 4920 and through communication interface 4918, which carry the digital data to and from computer system 4900, are exemplary forms of carrier waves transporting the information.

Computer system 4900 can send messages, commands and receive messages, commands and data, including program code, through the network(s), network link 4920 and communication interface 4918. In the Internet example, a server 4930 might transmit a requested code for an application program through Internet 4928, host computer 4924, local network 4022 and communication interface 4918 to a local intelligent device and apparatus.

Server 4930 may have associated clients, not shown, for assessment, analysis, artificial neural network control, and retrieval of stored simulated or real neural events and networks or substructures or components.

The received code may be executed by processor 4905 as it is received, and/or stored in storage device 4910, or other tangible computer-readable medium (e.g., non-volatile storage) for later execution. In this manner, computer system 4900 may obtain application code and/or data in the form of an intangible computer-readable medium such as via a carrier wave, modulated data signal, or other propagated signal. Special purpose hardware or hardware combined with a computer processor and memory may be configures and used to assess the performance of the neural network or the computer system 4900. Device 4930 may comprise an identical or very similar range of components as system 4900 located at a remote site. For example, display screen 4912 of a remote site or local intelligent device 4900 may be a screen split into four (or more) or comprise four (or more) different screens or components. A similar screen may be associated with device 4930 not shown (device 4920 may have keyboard entry, a camera, a scanner, a neural probe, an analog to digital converter, a modulator, a memory of various types and the like connected by a bus). The screen 4912 on either system 4900 or device 4930 may show views from input device 4904, a section showing commands displayed at either end and views and data inputs from other data collection devices coupled to a console of system 4900 which may be remotely operable by neural network operators.

Computer system 4900 can be configured using the methods of this invention to provide services across a network or via a so-called cloud of servers to personnel or automated systems having client computers or intelligent telecommunications devices capable of connection to a network or other communication interface. These services can also be provided to other software, located in either computer system 4900, the cloud or a separate computer system such as a remote server or a cloud service connected by a network, network link, or communication interface to computer system 4900. The services can be protected using methods of authentication and/or encryption that are known in the fields of computer science and computer security in order to ensure data are neither compromised nor disclosed and to trace all accesses to the data. The computer system 4900 and other associated information storage and communication components can be protected using devices and methods that are known in the fields of computer science and computer security, such as with firewalls, physical access controls, power conditioning equipment, and backup or redundant power sources. The protection devices and methods, embodied as hardware, software or a combination of hardware and software, may be incorporated in computer system 4900 or exist as separate components typically connected by a network or other communications hardware. The information stored by computer system 4900 and computer-readable media can be further protected using backup or redundant information storage systems, such as those that are well-known in the art. Examples include tape storage systems and RAID storage arrays.

Figure 10:
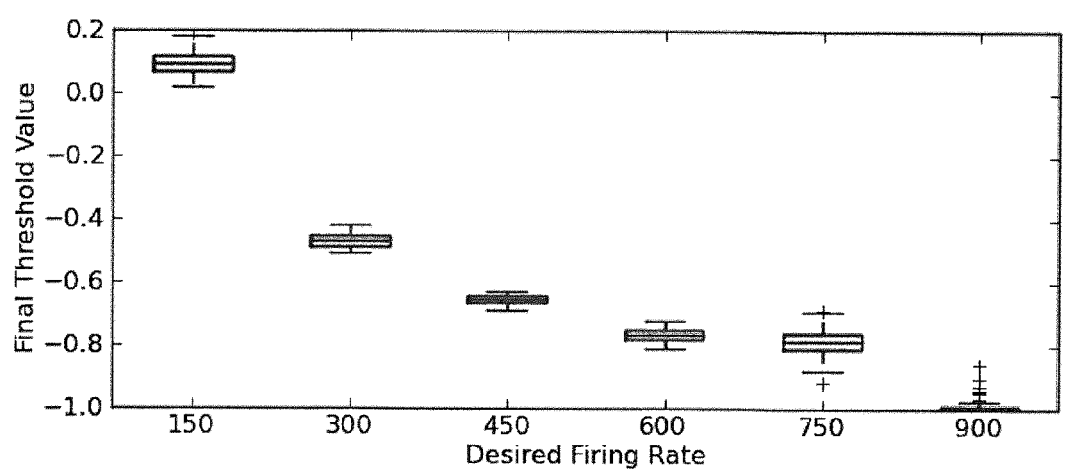
FIG. 10 shows box and whisker plots for the final threshold value versus desired firing rate.

FIG. 10 shows a box and whisker plot of the final threshold values after simulation has occurred, for the range of desired firing rates. The box and whisker plot shows these threshold values over the 100 random network structures. The resulting values of the thresholds are almost identical for both $\lambda=0$ and $\lambda=0.9$, so only the results for $\lambda=0.9$ are shown. As expected, the resulting value of the threshold decreases as the desired firing rate increases. This is because neurons with low threshold values are more likely to fire than neurons with high threshold values. It is also important to note that when the neurons fire, their charge may be set to neutral (0). This does not automatically force neurons with negative thresholds to tire. The neuron must receive some charge before it may tire again, and it must be outside of its refractory period to fire again.

As is evident from the graph of FIG. 10, a simple affective system 840 may successfully bring the firing rate close to the desired firing rate and may maintain firing activity near the desired firing rate. However, there is oscillation around the desired firing rate in most cases, more so than is seen in the control case. The system with $\lambda=0.9$ has more oscillation around the desired firing rate before it settles to the desired firing rate. In many cases this is undesirable behavior. However, as will be seen in later sections, for different values of $\alpha$, the complex system where $\lambda=0.9$ may be required in order for the system to stabilize.

A second experiment seeks to demonstrate that not only can the controlling affective system adjust the network firing rate to a particular level, but it can readjust the network firing rate level as needed over the course of simulation.

This experiment is important because the affective system is not the only regulatory system at work in our network architecture. LTP and LTD are also affecting the behavior of the network. Specifically, LTP and LTD are adjusting the weights in the network, and this adjustment is based on firing in the network. There is no guarantee that the new weight distribution will allow for the affective system to adjust the firing level. This experiment determines whether the affective system can continue to adjust the firing level despite the changes made by LTP and LTD.

In this experiment, the network continues to receive input pulses at exponentially distributed random intervals with a mean of 10, but the desired firing rate of the network is changed partway through the simulation, via a change in desired firing rate event sent by the environment and received by the affective system. In this section, results are shown for one network structure. Similar results occur for different network structures.

Figure 11A:
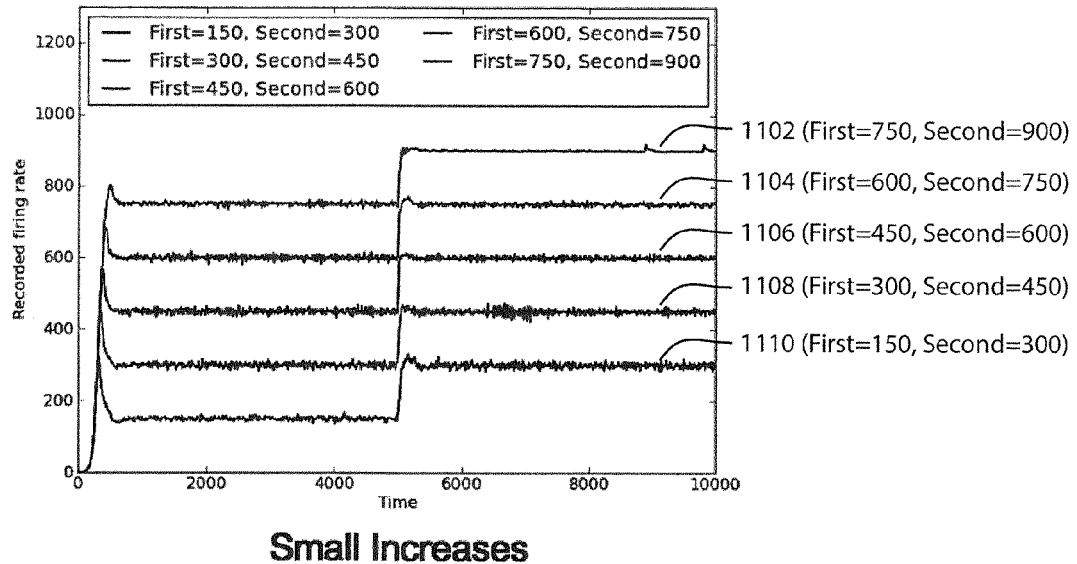
FIG. 11A shows simulation results for small increases versus recorded firing rates (for example, from 150 to 300.
Figure 11B:
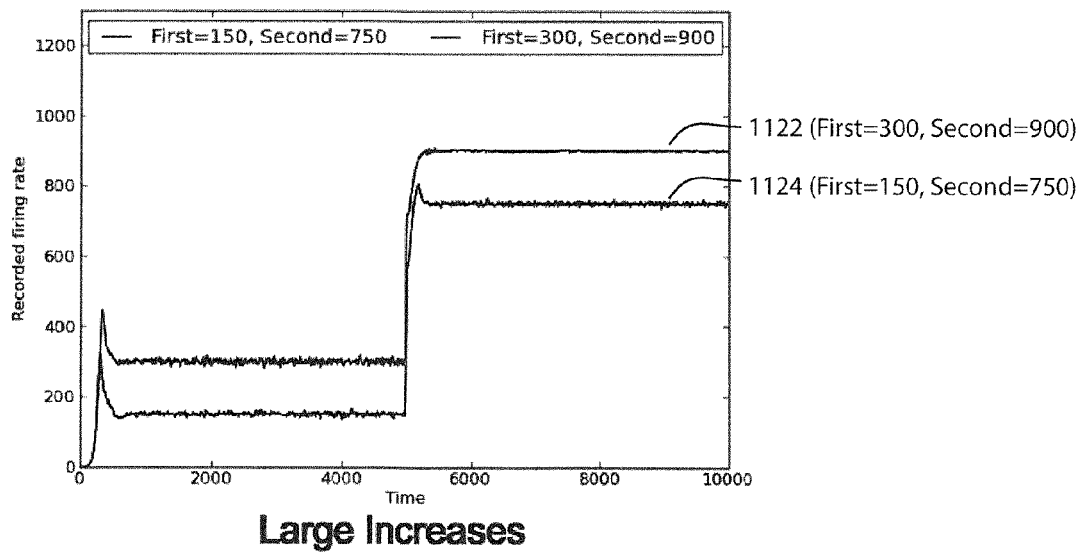
FIG. 11B shows simulation results for large increases versus recorded firing rates (for example, from 150 to 750) adapted from published color version, FIG. 3, of PLOS 2013.

Referring now to FIG. 11A (small increases) and FIG. 11B (large increases), there are shown the simulation results for the simple system ($\lambda=0$) for cases where the desired firing rate of the system increases partway through the simulation. Two different sizes of increases are shown (small increases of 150 and large increases of 600). For small increases, the first and second firing rates are 750 and 900 (1102), 600 and 750 (1104), 450 and 600 (1106), 300 and 450 (1108), and 150 and 300 (1110). For large increases, the first and second firing rates are 300 and 900 (1122) and 150 and 750 (1124). For both types of increases, the affective system is able to adjust the thresholds to reach the first firing rate, and then readjust the thresholds to achieve the new firing rate, within a relatively short time period.

Figure 12A:
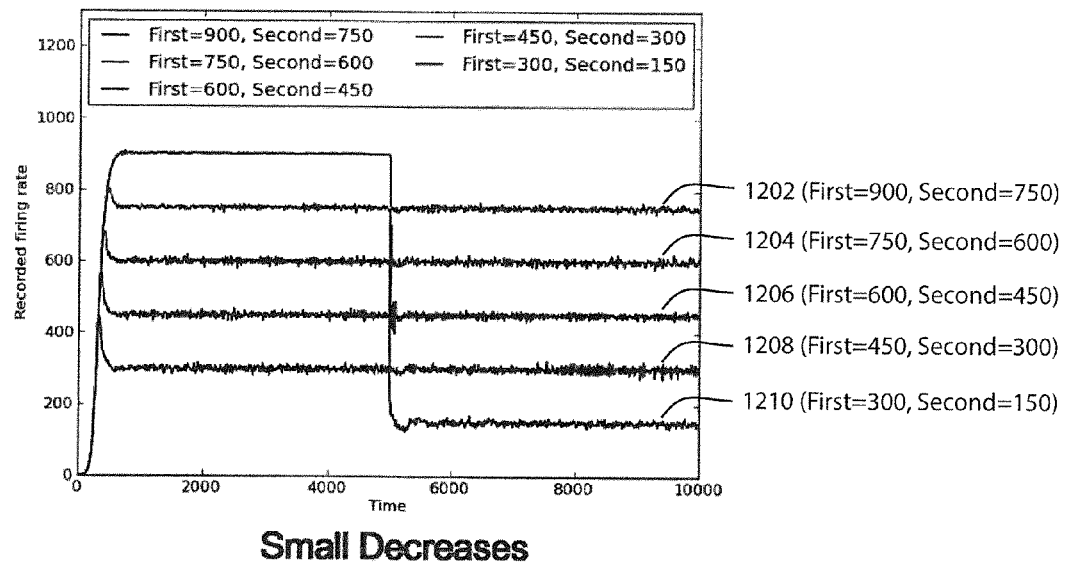
FIG. 12A shows simulation results for small decreases versus recorded firing rates (for example, from 300 to 150)
Figure 12B:
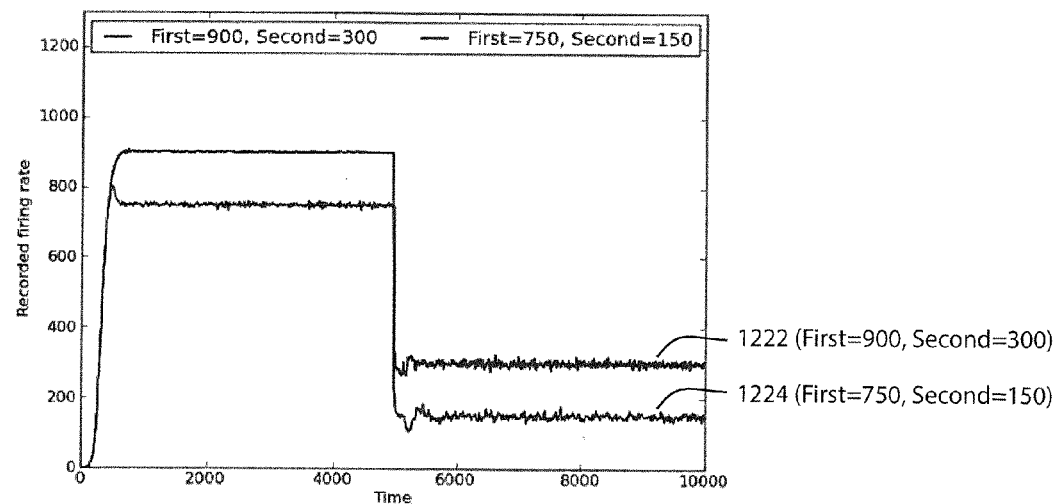
FIG. 12B shows simulation results for large decreases versus recorded firing rates (for example, from 750 to 150) adapted from published color version.

FIG. 12A (small decreases) and FIG. 12B (large decreases) show the simulation results for the simple system ($\lambda=0$) for cases where the desired firing rate of the system decreases partway through the simulation. Two different sizes of decreases are shown (small decreases of 150 and large decreases of 600). For small decreases, the first and second firing rates are 900 and 750 (1202), 750 and 600 (1204). 600 and 450 (1206), 450 and 300 (1208), and 300 and 150 (1210). For large decreases, the first and second firing rates are 900 and 300) (1222) and 750 and 150 (1224). Again, for both types of decreases, the affective system is able to adjust the thresholds so that the network can achieve the original desired firing rate, and, then, the affective system may readjust the thresholds to achieve the new firing rate. For all changes, there is a period of overcorrection of the affective subsystem; that is, for increases, the affective system adjusts the thresholds such that the firing rate usually may go higher than the desired firing rate (similarly for decreases). However, for smaller changes in the desired firing rate, there is less of an overcorrection by the affective system than there is for the higher firing rate. This is easily attributable to the design of the affective system; a larger change corresponds to a larger error, and thus a larger correction to the threshold value.

For the more complex affective system ($\lambda=0.9$), the results are similar, except, as in the single desired firing rate case, when adapting to a new desired firing rate, there is initially more oscillation around the desired firing rate. Also, for these systems, large decreases can cause unstable behavior (that is, the affective system cannot tune the thresholds to achieve the new desired firing rate).

Figure 13:
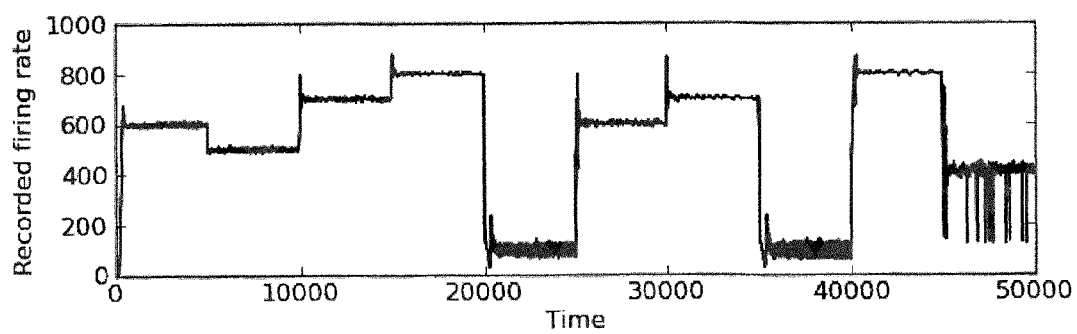
FIG. 13 shows simulation results for many changes in the recorded firing rate over time.

FIG. 13 shows a simulation over 50,000 simulated time units in which the desired firing rate was adjusted several times for $\lambda=0$. It demonstrates that the network can adjust to multiple firing rates over the course of simulation. However, there are some issues with instability when adjusting to later firing rates. These issues are related to LTP and LTD and are addressed in a later section.

One embodiment of an affective system has three parameters: $\alpha$ (a step-size parameter), $\lambda$ (a decay rate), and w (the window size). For the experiments described herein, the window size w=10. This value of 10 was chosen because it averages out variations in firing rate in a small time period, but it also allows the affective system to update the thresholds frequently. Different window sizes may be applied in other affective system embodiments.

Settling time may be defined as the time required for the network to achieve a desired firing rate and remain within 50 units of that desired firing rate. In the experiments discussed above, the results vary for two extreme values of $\lambda$ (0 and 0.9). In particular, it was discovered that for larger values of $\lambda$, it takes longer for the network to settle at the desired firing rate, and there is more oscillation around the desired firing rate before the network settles. This behavior, however, is not consistent across a variety of desired firing rates; for instance, there is less oscillation at higher firing rates than there is for lower firing rates.

Also, thus far, results have only been presented for a single value of $\alpha$ ($\alpha=0.001$). This value of $\alpha$ was chosen because the absolute maximum firing rate of the network may be set to 1000, which means that the error between the desired firing rate and the current value of the network is at most (in the extreme case) 1000. When $\alpha=0.001$ and $\lambda=0$, this bounds the change in thresholds to a magnitude of one. However, a variety of values of $\alpha$, from 0.00025 to 0.005 in increments of 0.00025 were tried.

Figure 14A:
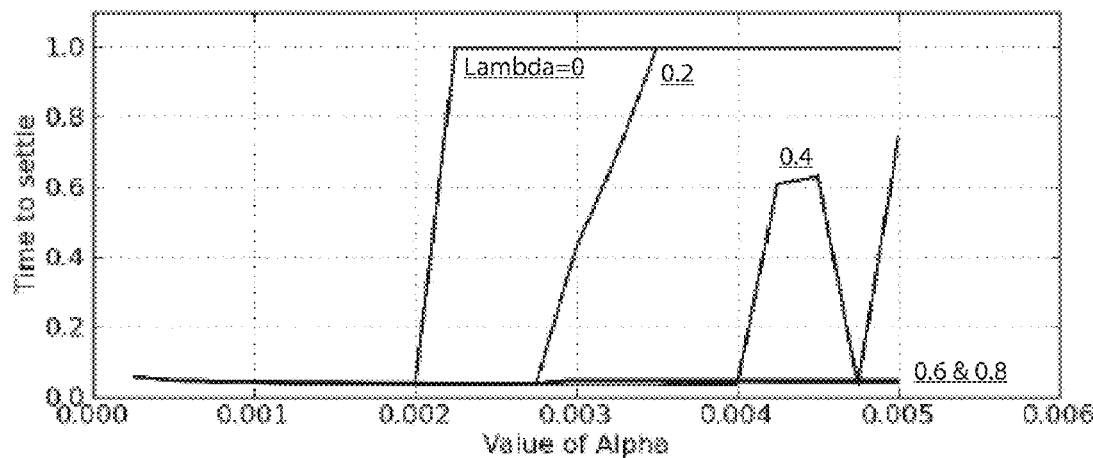
FIG. 14A shows the effect of α and λ on time to settle in one graph and FIG. 14B shows the effect of α and λ on percent overshoot in another graph.
Figure 14B:
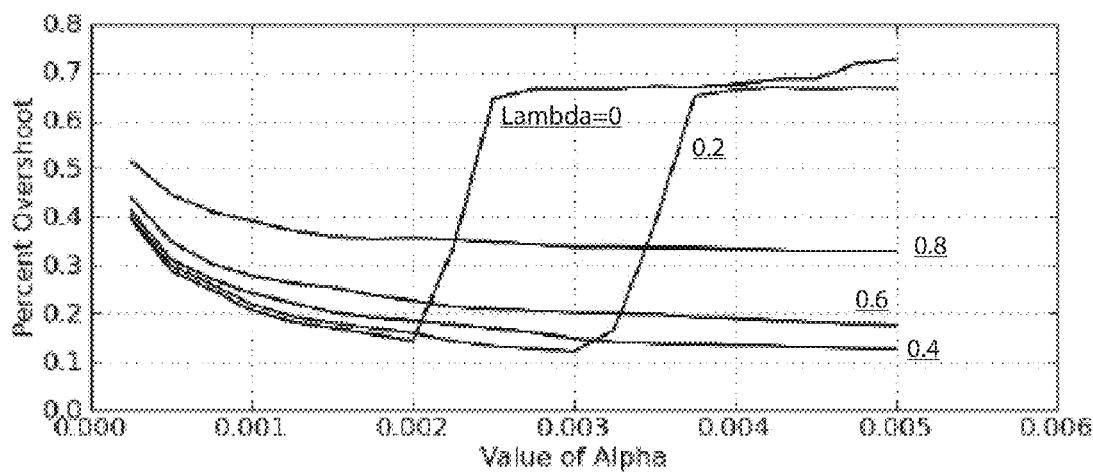

FIG. 14A and FIG. 14B show how the different values of $\alpha$ affect the percent overshoot (FIG. 14B) of the firing rate (how high above the desired firing rate the recorded firing rate is, displayed as percent of the desired firing rate) and the time to settle (FIG. 14A) (how long it takes the affective system to adjust the thresholds to achieve the desired firing rate).

Figure 15:
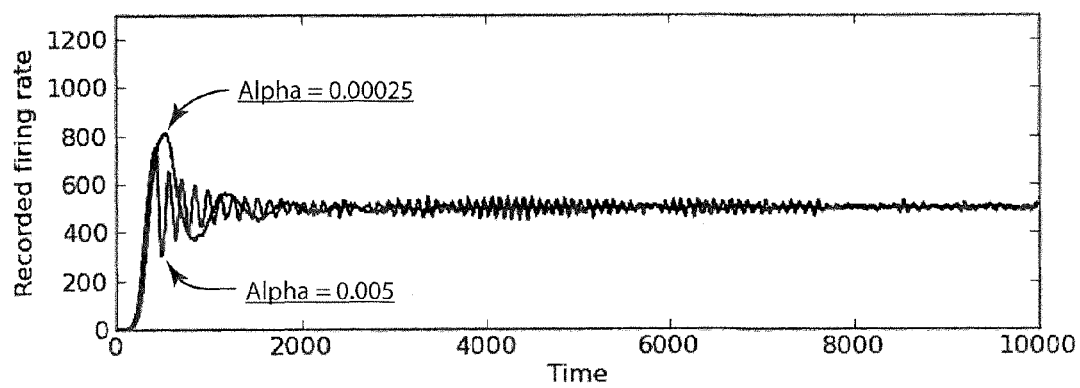
FIG. 15 show simulation results for two extreme values of a over time (Alpha=0.005 and Alpha=0.00025) adapted from published color version, FIG. 7, of PLOS 2013.

Instability in FIGS. 14A and 14B corresponds to a time to settle of 10,000; in other words, settling is not achieved. Referring briefly to FIG. 15, for higher values of $\alpha$, (such as 0.005 versus 0.00025) a high value of $\lambda$ may be required to achieve stability. However, the percent overshoot increases as $\lambda$ increases (except in the cases of instability). If $\lambda$ is positive, then α also affects the period of oscillation of the measured firing rate, prior to settling.

Higher values of α (such as 0.005) correspond to shorter periods of oscillations, as is shown in FIG. 15. It is important to note that FIGS. 14A, 14B and 15 show the results for one network and one desired firing rate. Although the general conclusions still hold, the specific values of α where instability becomes an issue differs for different networks.

Over the course of each simulation, the network topology is fixed; that is, the placement of neurons and synapses in the network is constant. However, the weights of the synapses change during the simulation due to the processes of LTP and LTD. Initially, for each network, the weights of the synapses are uniformly distributed between −1, and +1. In the following figures, we compute a histogram of the network weights across 20 bins. For a weight value of W, each bin is of the form a≤W<a+0.1, for a=−1, 0.9, ..., 0.8, except for the last bin, which is 0.9≤W≤1.

Figure 16:
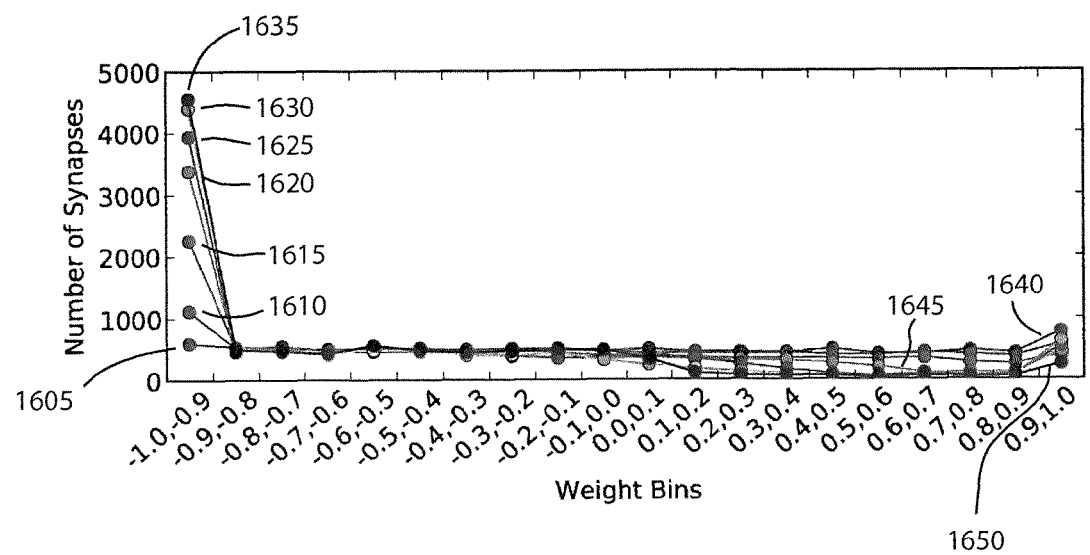
FIG. 16 show histograms for the final synapse weights in the network at simulation completion adapted from published color version, FIG. 8, of PLOS 2013.

FIG. 16 shows the histogram of the final weight values in the network, after the simulation is completed. The desired firing rates used are 950 (1635), 800 (1630), 650 (1625), 500 (1620), 350 (1615), 200 (1610) and 50 (1605). This figure shows that, in general, most weights fall into either the −1.0≤W<−0.9 bin, with more weights falling into this bin as the desired firing rate increases. In all other bins up to the 0.9≤W≤1, there are relatively few weights (1645), and for smaller values of the desired firing rate, there is an increase in weights in the 0.9≤W≤1 bin (1640, 1650). This figure, along with FIG. 10, indicates that, to achieve a higher firing rate, the threshold needs to be decreased, but the weights on the synapses also need to decrease, making most synapses in the network inhibitory synapses. These tests were run using 100 different randomly selected network structures.

Figure 17:
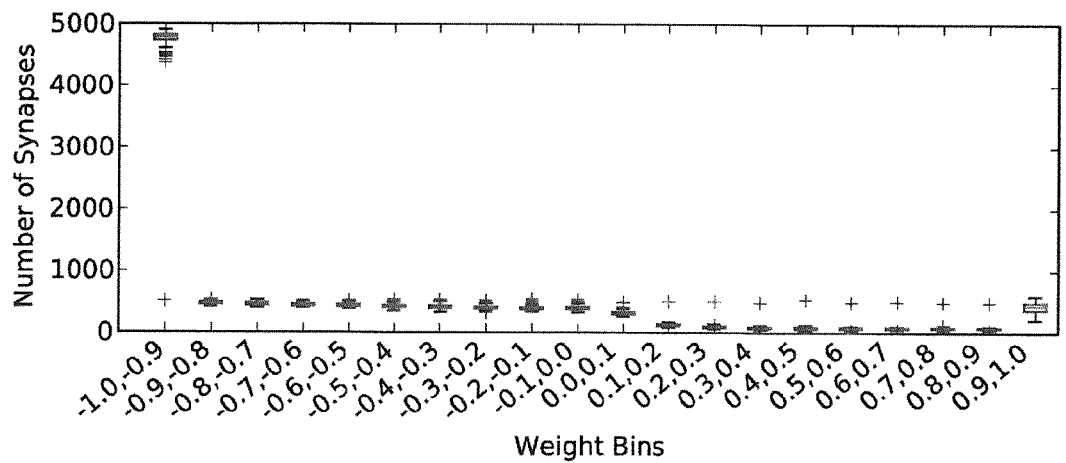
FIG. 17 shows box and whisker plots for the final synapse weights of 100 networks at simulation completion.

FIG. 17 shows a box and whisker plot of the histograms of the weights in the final network structures for one desired firing rate (firing rate of 900). This figure shows that the results are consistent across these different network structures.

As noted during the discussion of simulation methods above, for the purposes of these simulations, LTP and LTD are not required. The affective system can tune the desired firing rate in the networks without these processes. However, since LTP and LTD are expected to play an important role in day-to-day learning in the biological brain, it is prudent to include them in simulations of networks. The exclusion of LTP and LTD can lead to improved stability characteristics. Also, higher LTP and LTD refractory periods can result in lower instability.

Figure 18A:
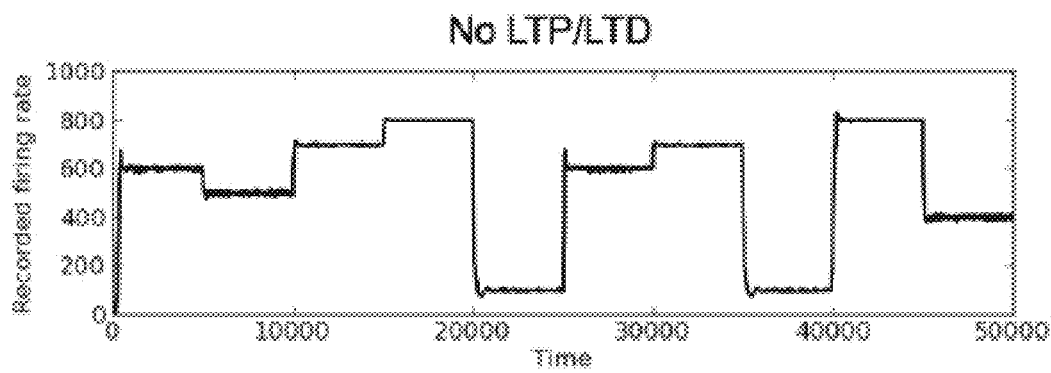
FIG. 18A shows simulation results for using no LTP/LTD) parameters.
Figure 18B:
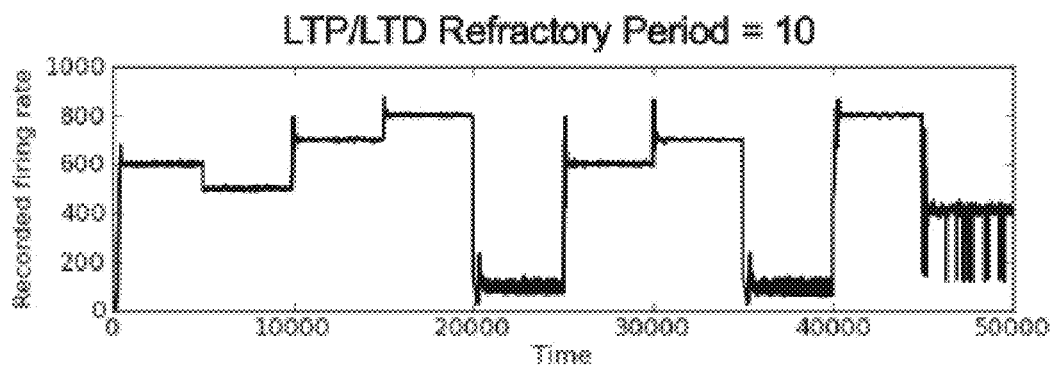
FIG. 18B shows simulation results for an LTP/LTD refractory period of ten.
Figure 18C:
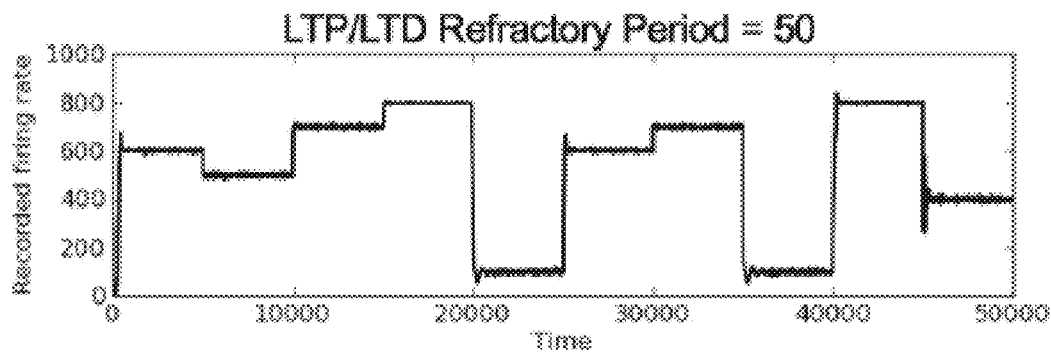
FIG. 18C shows simulation results for an LTP/LTD refractory period of fifty.

FIG. 18A (No LTP/LTD), FIG. 18B (LTP/LTD refractory period of 10) and FIG. 18C (LTP/LTD refractory period of 50) show the simulation results for a network with no LTP/LTD (18A), with LTP/LTD refractory period at 10 simulated time steps (FIG. 18B), and with LTP/LTD refractory period of 50 simulated time steps (FIG. 18C). As noted, the network without LTP/LTD was able to achieve its desired firing rates easily (FIG. 18A); however, the network with a higher LTP/LTD refractory period of 50 time periods (FIG. 18C) had similar results. This indicates that for these networks, learning (that is, any process that affects the structure of the network) should occur on a slower time scale than the affective system controller process.

Figure 19A:
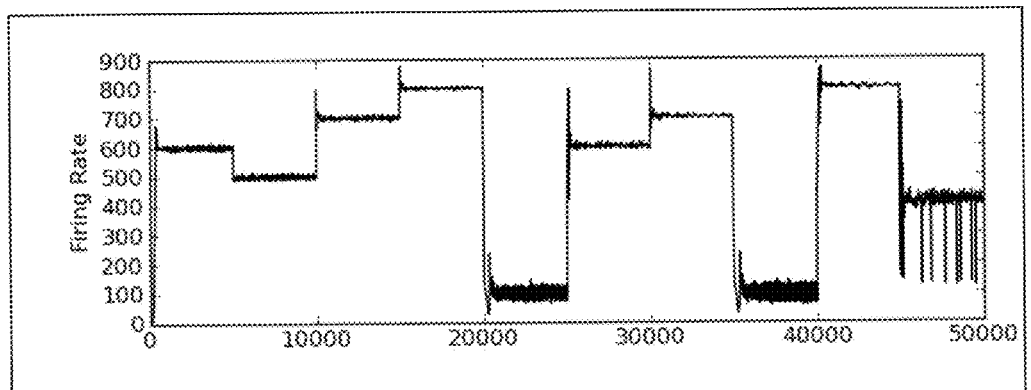
FIG. 19A shows a graph of firing rate versus simulation time and FIG. 19N is a color map redrawn in gray scale showing the changes in synapse weights over a single simulation adapted from published color version, FIG. 11, of PLOS 2013.
Figure 19B:
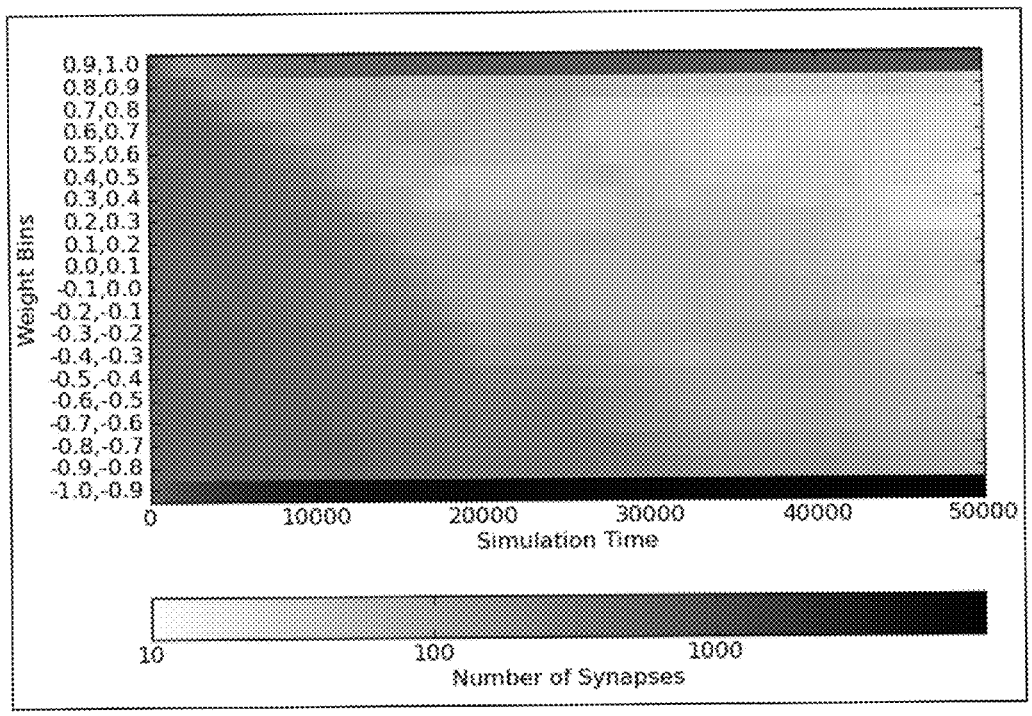

FIG. 19A and FIG. 19B show how the weights change over the course of the simulation for one network structure and one desired firing rate. FIG. 19A shows how the firing rate of the network changed, while FIG. 19B shows how the weights changed over the course of simulation. Similar results are obtained for different firing rates, but the rate at which the weights change is different for each desired firing rate. As expected by the results in FIG. 16, the end result is that most weights fall into the −1.0≤W<−0.9 bin. As the simulation continues, more and more weights in the network fall into this bin. However, there is also an increase in the weights that fall into 0.9≤W≤1 bin. This indicates that most weights in the network become either nearly fully inhibitory or excitatory. Thus, different desired firing rates appear to affect the synapse weights. For low firing rates (such as from 20,000-25,000 or 35,000-40,000), the weight values of the synapses stay mostly constant. Again, this is consistent with the results of FIG. 16.

Figure 20A:
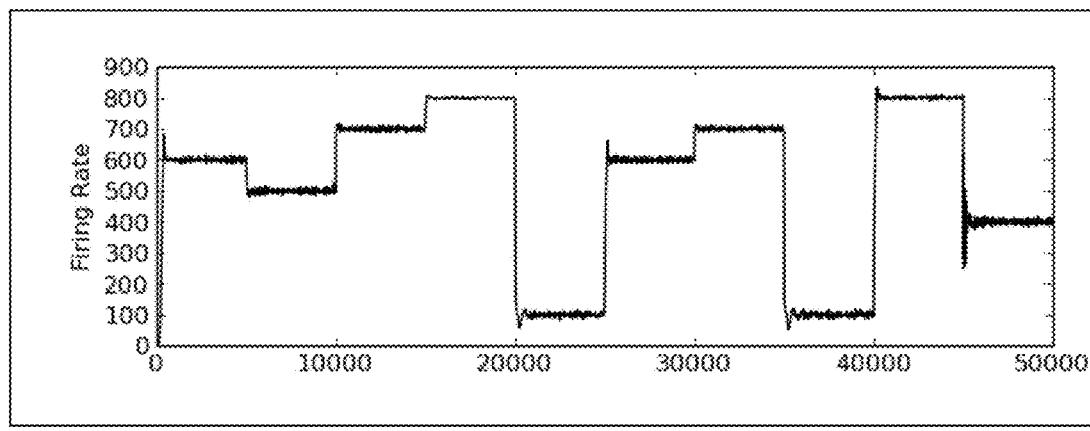
FIG. 20A shows a further graph of firing rate versus simulation time (with less overshoot and FIG. 20B is a related color map redrawn in gray scale showing the changes in synapse weights over a single simulation adapted from published color version, FIG. 12, of PLOS 2013.
Figure 20B:
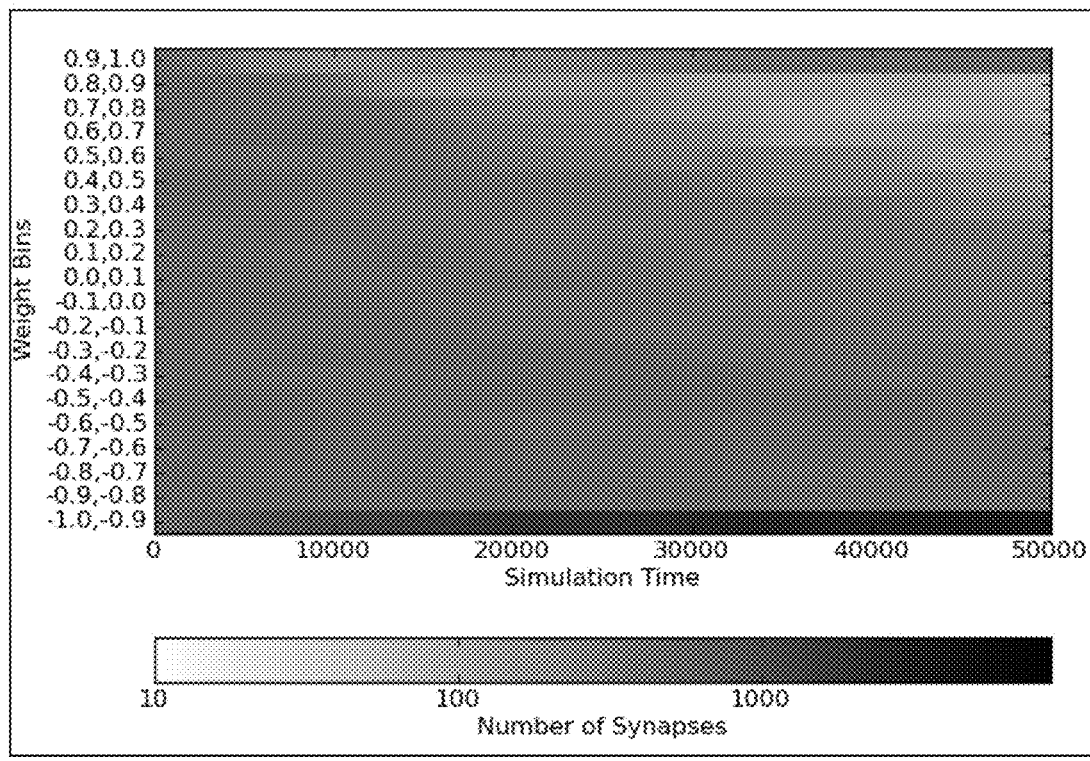
Figure 21:
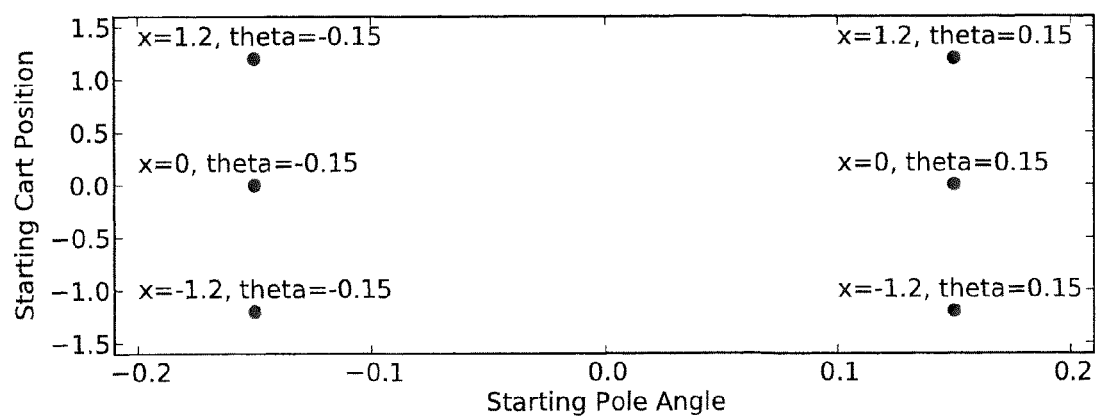
FIG. 21 shows six different starting conditions for fitness function—starting cart position versus starting pole angle in the pole balancing problem example of a control application of the present invention.

FIG. 20A and FIG. 20I show how the weights changed over the course of the simulation when the LTP/LTD refractory period is set to 50 instead of 10. FIG. 20A shows how the firing rate of the network changed, while FIG. 20B shows how the weights changed over the course of simulation. As expected, the weight values change much more slowly; however, the same basic trends occur.

The Pole Balancing Problem as an Example of Control

Figure 5:
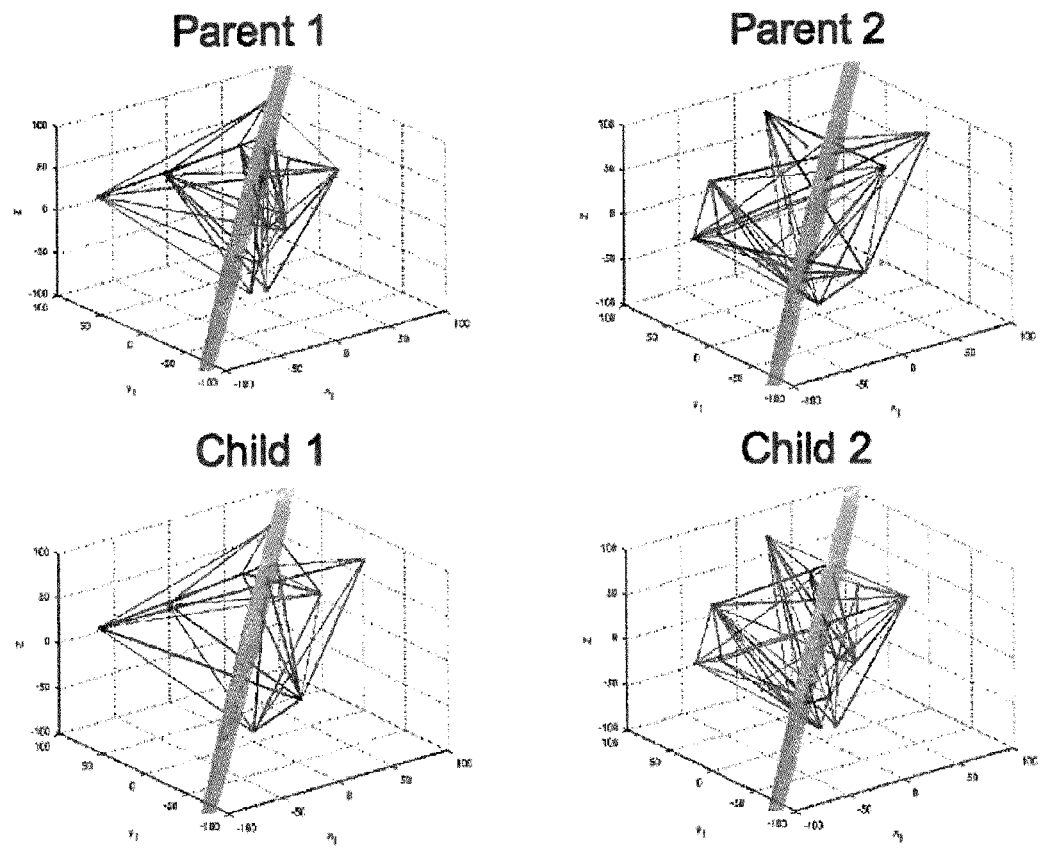
FIG. 5 is a pictorial representation of crossover with three dimensional representations of Parent 1, Parent 2 with crossover to Child 1 and Child 2.
Figure 6:
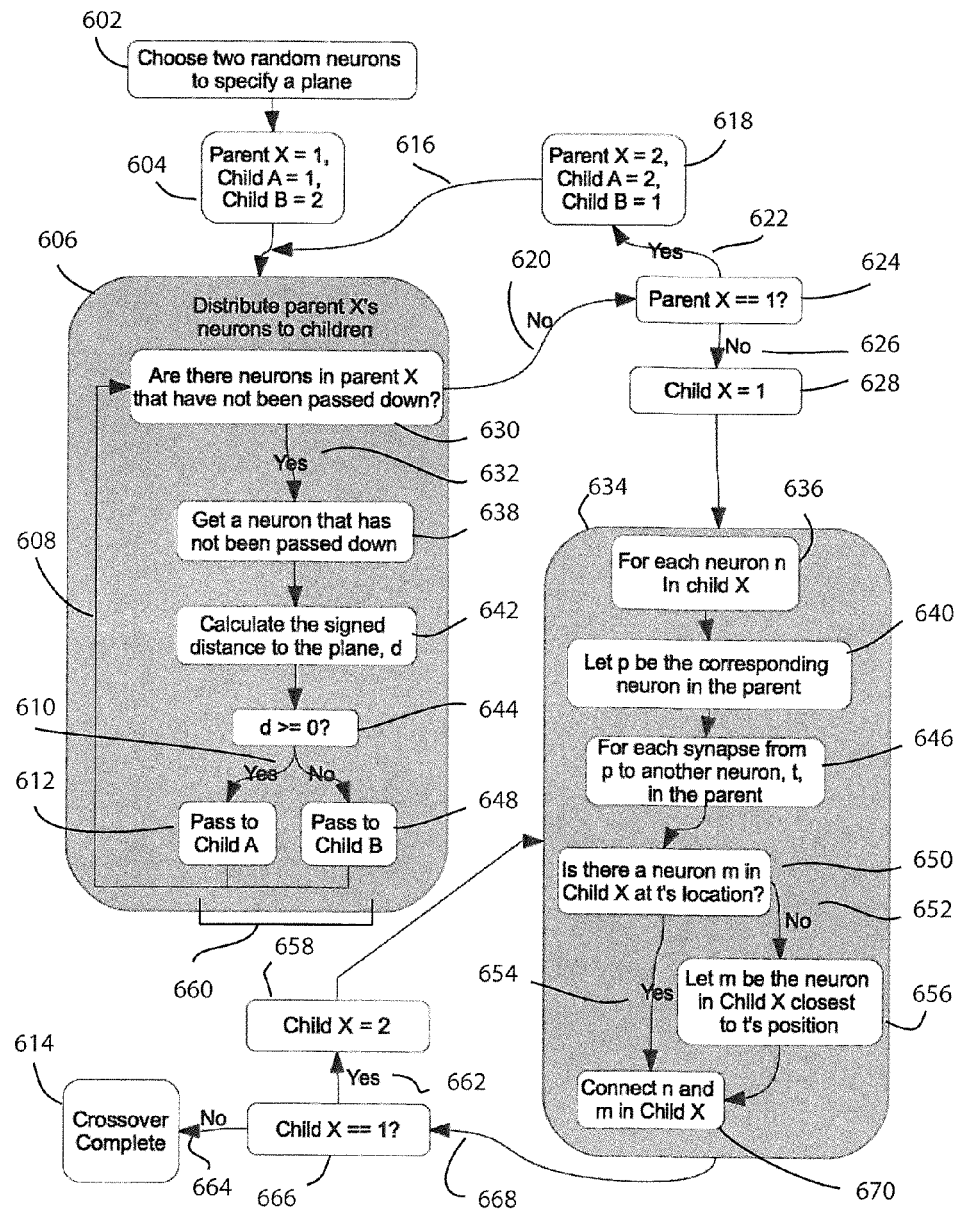
FIG. 6 is a flowchart showing a process of crossover, which is related to Parent 1, Parent 2, Child 1 and Child 2 crossover FIG. 5.
Figure 8B:
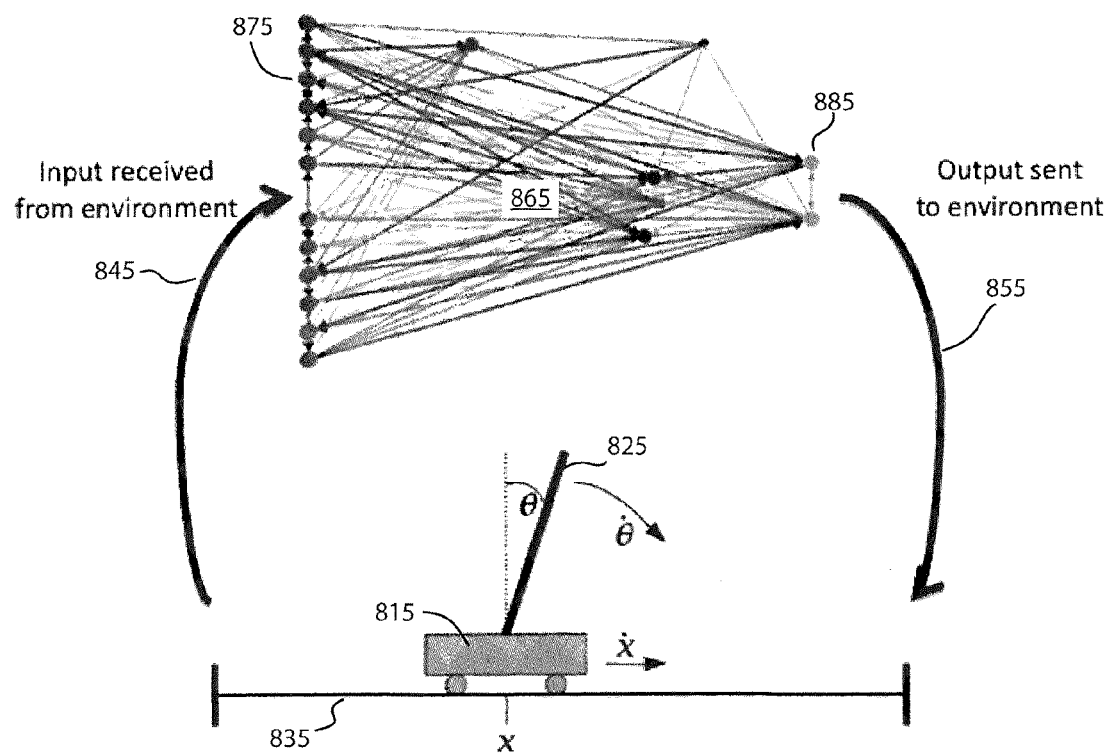
FIG. 8B shows a pictorial diagram of a pole-balancing problem environment also showing its providing an input to a NIDA and resulting artificial neural network and outputting a result to, for example, move the cart for balancing the pole of the pictorial diagram.

A pole balancing problem is now studied as an example of a use of an evolutionary algorithm in control problem solution. An introduction to the pole balancing problem is shown in FIG. 8B and this figure will be discussed further herein along with results having applied a neuro-science-inspired dynamic architecture (NIDA) to its solution utilizing an evolutionary algorithm. An evolutionary algorithm may be preferably used as a training algorithm for each of control, anomaly detection and classification networks. Pole balancing is an example of control. A fitness function is defined for each application, and parents may be selected using tournament selection. Networks are represented and manipulated directly in this implementation. Both crossover and mutation operations are applied with some probability to the parents selected. An example of crossover is shown in FIG. 5 and a corresponding flowchart in FIG. 6. Referring briefly to FIG. 5, Parents 1 and 2 may each be represented by an artificial neural network. These parents may produce offspring, in this example, Child 1 and Child 2, which each share in the artificial neural networks of the parents under the principles of crossover. Details about the crossover and mutation operations as they apply to our network structures without affected systems are discussed with reference to FIG. 6.

At 602, there is a choice made of two random neurons to specify a plane (for example, a point and a second vector defining a direction orthogonal to the plane; (see lines representing a plane in each of the networks of FIG. 5). At 604, let parent X be 1, child A be 1 and child B be 2. Process 606 distributes parent X's neurons to children. Step 630 asks are there neurons in parent X that have not been passed down. If Yes, at 632, a neuron is identified that has not been passed down at 638; otherwise, if No at 620, Parent X is set to =1 at 624. From 638, the signed distance to the plane, d, is calculated at 642. Based on d's calculation at 642, the neuron is sent to one of the two children, child A or child B in 660. If d is greater than or equal to 0 at 644, and so Yes at 610, then, the neuron passes to child A at 612, and if No to child B at 648 and the path 608 from one of 612 or 648 of 660 returns to 630 for determining more neurons of parent X not passed down to children.

From 624, if Yes at 622, the parent X=2, Child A=2 and Child B=1 at 618 and by arrow 616, the process returns to process 606 to distribute parent X's neurons to children. On the other hand, if the answer is No at 626, then Child X=1 at 628 and, at 636, process 634 begins with respect to child X. For each neuron in child X, at 640, let p be the corresponding neuron in the parent. At 646, for each synapse from p to another neuron, t, in the parent, at 650, is there a neuron m in Child X at t's location at 650? If Yes at 654, then, connect n and m in Child X at 670. If No at 652, let m be the neuron in Child X closest to t's position at 656 and connect n and m in Child X at 670. From 670, 668 leads to 666 which asks is Child X=1 and if not at 664, the crossover is complete at 614. If Child X is 1 and Yes is returned at 662, the Child X is set to 2 at 658, and the process for child X 634 begins again at 636.

Both crossover and mutation operations are altered slightly to compensate for the inclusion of the simple affective systems. In particular, the desired firing rate is included as part of the training. An example of a training algorithm is described by way of example with reference to FIG. 7A.

Figure 7A:
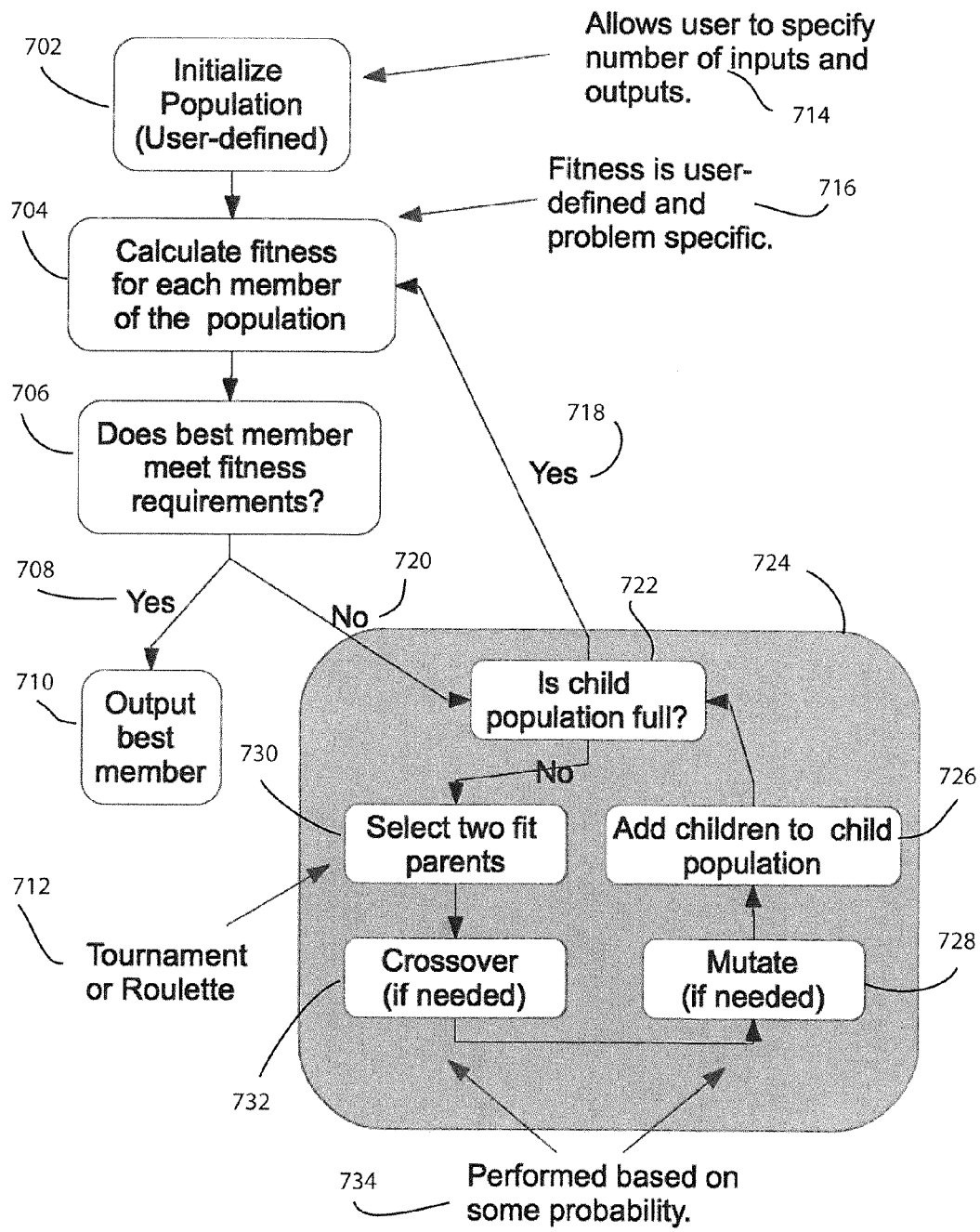
FIG. 7A is a flowchart showing a training method flow chart using tournament or roulette processes.
Figure 7B:
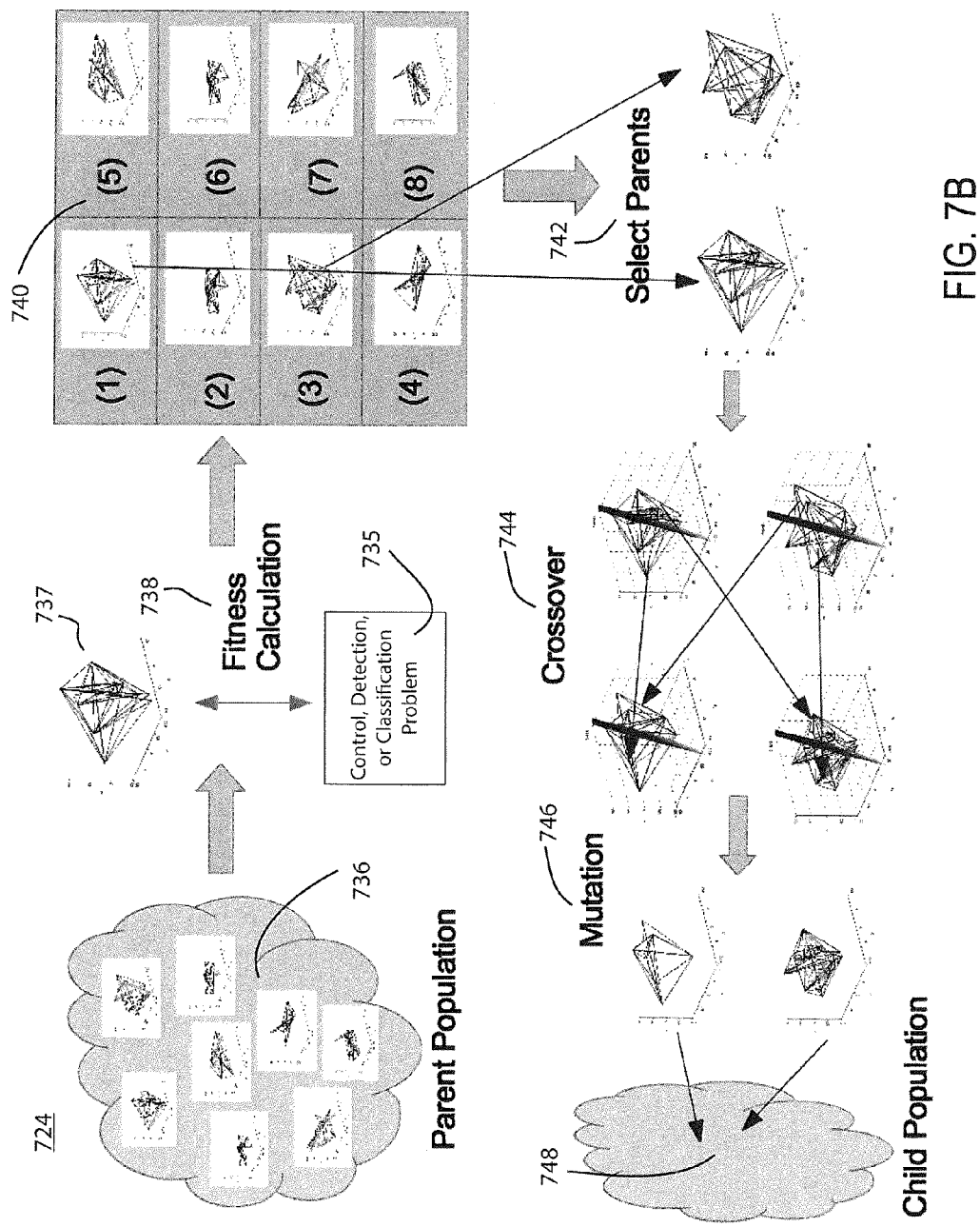
FIG. 7B is a pictorial flowchart of process 724 of FIG. 7A showing the filling of a child population in more detail.

Referring to FIG. 7A, there is provided a flowchart of an exemplary training algorithm utilizing tournament or roulette processes 712. At 714, the training permits a user to specify a number of inputs and a number of outputs. This leads to 702 where a user may define and initialize a population. Then, at 716, a user may define fitness and a specific problem. Steps 702 and 716 lead to calculating fitness for each member of the initialized population at 704. At 706, does the best member meet the fitness requirements? If Yes at 708, the best member is output at 710. If No at 720, the crossover/mutation process 724 begins by asking at 722, is the child population full? If Yes at 718, there is a return to fitness calculation 704. If No, then, two fit parents are selected at 730 and a roulette or tournament selection begins at 712 and is input to 730 for the selection process. After parents are selected, a crossover is performed at 732 if needed. Also, a mutation is performed at 728 if needed. At 734, crossover 732 and/or mutation 728 are performed based on some probability at 734. At 726, children are added to the child population at 726 and the crossover/mutation process 724 begins again at 722 asking if the child population is full which continues until the answer is Yes at 718. FIG. 7B provides a blow-up of the crossover/mutation process 724 of FIG. 7A.

Referring now to FIG. 7B, a parent population 736 is input in crossover/mutation process 724. A fitness calculation 738 for one of control, anomaly detection, classification or other application 735 of a NIDA/DANNA is applied to the parent population resulting in a plurality of networks 737, for example, networks 740 (networks 1-8) which may be eight in number. Of these, selected parents 742 result (for example, 1 and 3). Crossover 744 is applied such that no child is a clone of a parent. The two selected parents 742 result in two different children with crossover 744. After crossover 744, mutation 746 is applied and a resulting child population 748 thus results.

In the crossover operation 744, the average desired firing rate of the selected parents is taken to be the desired firing rate in both children produced. A new mutation 746 that sets the desired firing rate to a randomly selected value between zero and the number of neurons in the network is added to the mutation operation. The parameters of the evolutionary algorithm are given in the Table 2. Mutation Types and Rates are provided in Table 3.

TABLE 2

Evolutionary Algorithm Parameters

| Parameter | Value |
|---|---|
| Population size | 500 |
| Mutation rate | 0.9 |

TABLE 2-continued

Evolutionary Algorithm Parameters

| Parameter | Value |
|---|---|
| Crossover rate | 0.9 |
| Tournament size | 20 |

TABLE 3

Mutation Types and Rates

| Mutation Type | Mutation Rate |
|---|---|
| Change sign of the weight of a randomly selected (RS) synapse | .267 |
| Randomly change the weight of a RS synaspse | .267 |
| Add a synapse between two RS neurons that are not already connected | .133 |
| Delete a RS selected synapse | .133 |
| Add a neuron at a RS position | .027 |
| Delete a RS neuron | .013 |
| Change the threshold of a RS neuron | .027 |
| Change the desired firing rate to a RS value between 0 and the number of neurons | .133 |

The parameters of the affective system are chosen for this application based on the results from previously discussed simulations. Those parameters are also given in the Table 1 represented above.

The pole balancing application is a widely used benchmark problem in both the machine learning and control engineering fields and is introduced by way of FIG. 8A. In this version of the pole balancing problem, a cart 815 is assumed to be on a track 835 so that it can move in only one dimension; that is, the cart 815 can only be moved left or right. The track 835 is assumed to be finite in that the cart 815 must be kept between two points on the track 835. Attached to the cart 815 is a pole 825. The pole 825 is initially in some upright position. The goal of the pole balancing problem is to apply forces to the cart 815 in order to keep the pole 825 balanced and to keep the cart 815 between the two endpoints of the track 835. In this work, we are using the bang-bang version of the problem, where there are only three possible actions: apply a force of −10 N, apply a force of 10 N, and apply no force at all to the cart 815. The pole balancing problem is discussed in detail in the literature and the equations and parameters used are included in Table 4 below.

TABLE 4

Pole Balancing Parameters

| Parameter | Value |
|---|---|
| Cart's mass ($m_c$) | 1 kg |
| Pole's mass ($m_p$) | 0.1 kg |
| Cart length | 1 m |
| Length of pole (l) | 1 m |
| Track length | 5.8 m |
| $\tau$ | 0.02 sec |

The state of the pole balancing problem is described by four variables:

x=the position of the center of the cart on the track in meters.
$\dot{x}$=the velocity of the cart in meters/second.
θ=the angle of the pole from vertical in radians.
$\dot{\theta}$=the angular velocity of the pole in radians/second.
x=the position of the center of the cart on the track in meters.

Referring to FIG. 8A, the specific parameters/variables are shown with respect to cart 815 moving in a linear manner in one of two directions and where an object is to have a pole 825 be balanced on the cart 815. In this work, a force is applied to cart 815 and the state will be updated every 0.02 seconds. The range of values for each state parameter is continuous. There are multiple ways to encode input 845 at input neurons 875 of the network 865 and decode output of output neurons 885 from the network 865 to the environment 855. The output values for this problem are fairly straightforward, since there are three possible actions (apply a force of −10 N, apply a force of 10 N, and apply no force at all to the cart 815). In both examples, this is encoded using two output neurons 885. One corresponds to −10 N and the other corresponds to 10 N. The output neuron that fires the most is the chosen action. If neither of the output neurons fires in the desired window, then no force is applied.

One option for encoding continuous valued input is to discretize the possible input space by splitting the space into ranges of values and having one input correspond to each range. To accomplish this, each of the four state space variables was split into three ranges, which are defined in Table 5. Table 5 is reproduced below. There is a corresponding input neuron for each of these ranges. When the state space is updated (or set initially), the range that each value belongs to is calculated, resulting in four ranges. Then, a pulse is applied to each of the four neurons. The network 865 is then simulated for 200 units of simulated network time. At the end of these 200 time steps, the number of firings in that window for both output neurons is measured, and the action that corresponds to the output neuron that fired the most is applied. The state of the system (x, $\dot{x}$, θ, $\dot{\theta}$) is then updated based on the force applied, and the process is repeated until a failure state is reached (the cart hits the end of the track or the pole falls) or the pole is kept up and the cart is kept between the tracks for some predefined time period.

TABLE 5

Input Encoding Ranges

| Parameter | Ranges for Encoding |
|---|---|
| x | (−∞, −0.8], (−0.8, 0.8], (0.8, ∞) |
| $\dot{x}$ | (−∞, −0.66], (−0.66, 0.66], (0.66, ∞) |
| θ | (−∞, −0.0697], (−0.0697, 0.0697], [0.0697, ∞) |
| $\dot{\theta}$ | (∞, −0.667], (−0.667, 0.667], (0.667, ∞) |

For this problem, networks that are able to balance the pole longer should be maintained. That is, a straightforward fitness function for this problem is the amount of time the network can balance the pole. However, we would like for the system to be able to balance the pole from a variety of starting conditions (i.e. the pole in a various positions and the cart in various positions). The simplest possible fitness function would be to start in one state, measure how long the network is able to keep the pole balanced, and return that time as the fitness. However, this does not measure the network's ability to generalize. That is, a network that performs well starting from one state may perform poorly when starting from another state. To overcome this, initial state values may be used for each fitness test, and an average over their balancing times should be taken.

The evolutionary algorithm is trained until some predefined performance is achieved. We define a network as fully-trained in the pole balancing problem if that network can keep the pole balanced and the cart between the endpoints for 300 seconds for each of the six test cases shown in FIG. 21, where the linear and angular velocities are zero.

Using this measure of performance, sixteen networks were evolved that satisfy the performance requirement. As part of training, the desired firing level was also found. We also obtained networks using the same random seeds (and thus the same initial populations) as the networks with the affective systems, and trained them without affective systems. Using these sixteen random seeds, only twelve of the networks converged in 100 epochs (whereas the average convergence time in epochs for networks with affective systems was 33.88). Since the other four did not converge in 100 epochs, they are not included in the results given below.

Figure 22A:
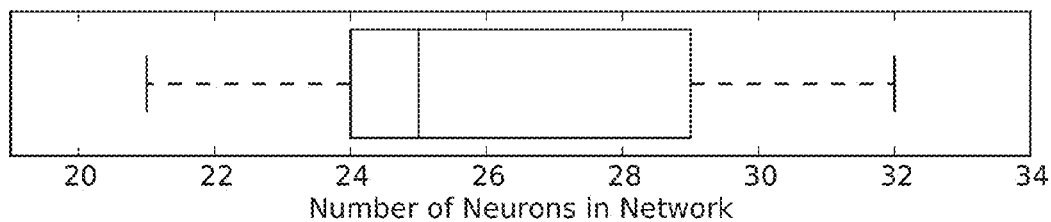
FIG. 22A shows box and whicker plots for the pole balancing problem summarizing the number of neurons that may be used in an exemplary artificial neural network (ANN)
Figure 22B:
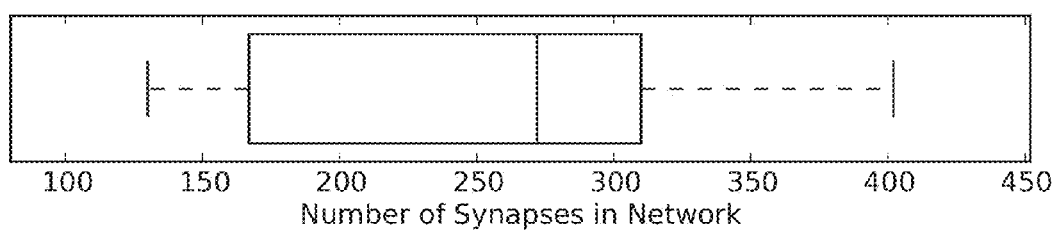
FIG. 22B, the number of synapses in an exemplary ANN.
Figure 22C:
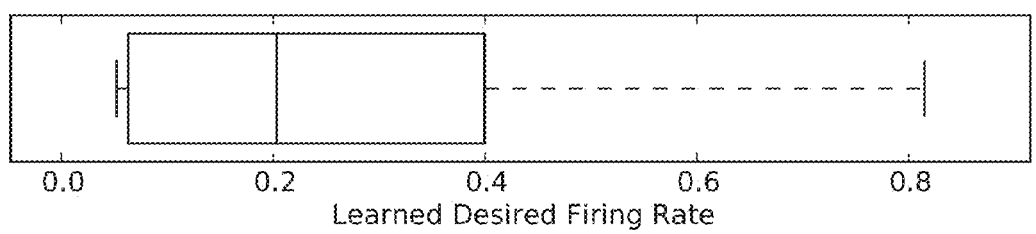
FIG. 22C shows the learned desired firing rate, FIGS. 22A, 22B and 22C general showing the complexity of the networks.

Referring now to FIGS. 22A, 22B and 22C, box plots showing the sizes of the networks trained with affective systems (in terms of neurons (FIG. 22A) and synapses (FIG. 22B)), as well as the resulting desired firing rates (FIG. 22C) for those networks are shown. The average number of neurons in a network trained with an affective system is 24.83, while the average number of neurons in a network trained without an affective system is 25.25. Similarly, the average number of synapses in a network trained with an affective system is 223, while it is 239.25 in a network trained without an affective system. We do not view these differences as representative because of the small sample size. However, we expect the networks with affective systems to be smaller than networks without affective systems, because of the extra level of complexity in operation that the affective systems add.

The resulting networks were tested to determine how well they generalized their solutions to the pole balancing task. To determine this, 10 random starting conditions were chosen from each of the following sets of ranges: x∈[$x_0$, $x_0$+0.2), θ∈[$θ_0$, $θ_0$+0.05), where $x_0$ started as −2.0 and continued to 1.8 in increment of 0.2, and θ started at −0.15 and continued to 0.1 in increments of 0.05, resulting in a total of 1260 total test runs. On the contour plots, the points shown are the averages of the ten random starting conditions in x∈[$x_0$, $x_0$+0.2), θ∈[$θ_0$, $θ_0$+0.05).

Figure 23:
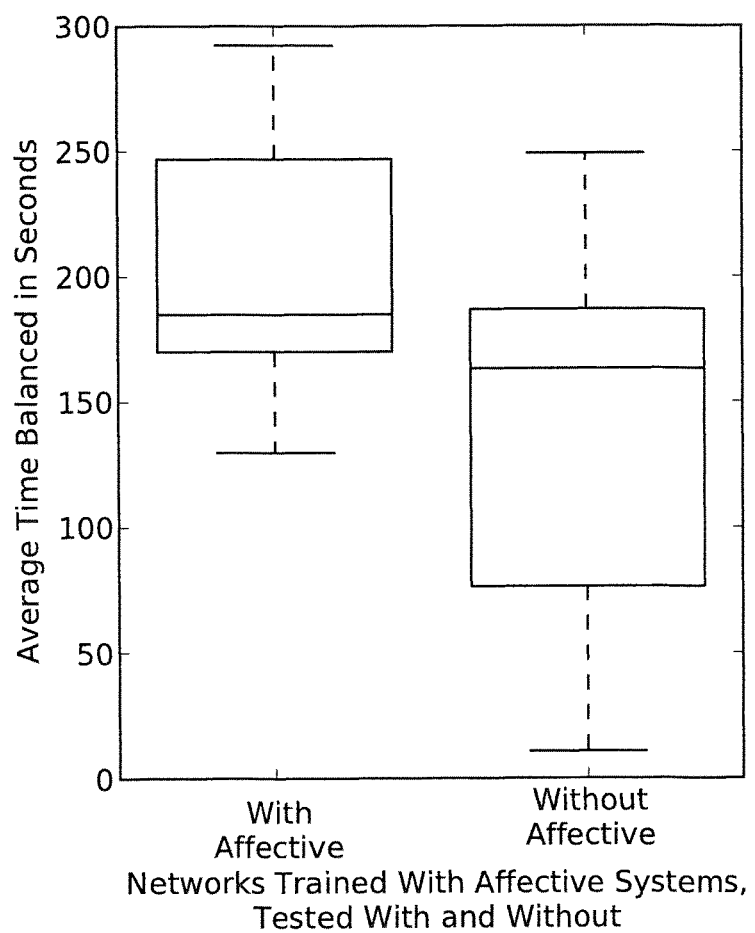
FIG. 23 shows box and whicker plots showing the results for networks tested with and without affective systems in average time a network according to an embodiment of the present invention successfully balances a pole in seconds.

This test was run on three different network types: the networks trained with the affective systems; the same networks trained with the affective system, but not including the affective system; and networks trained without the affective system. FIG. 23 shows the results when the sixteen networks that were trained with the affective system underwent the generalization tests with and without the affective system operating during the tests. As can be seen in this figure, the operation of the affective system has an effect on the performance of the system. In particular, the networks with the affective system generalized their solutions better than the networks without affective systems. This is to be expected, because the networks were trained to operate with the affective system. However, we saw two types of networks emerge in that group of sixteen: one group in which the affective system was vital for good performance and one group in which the affective system was non-vital. The affective system was absolutely required for more than half of the sixteen networks in order to have good performance.

It is likely that the inclusion of the affective system in training but not in operation helped find better thresholds.

Figure 24:
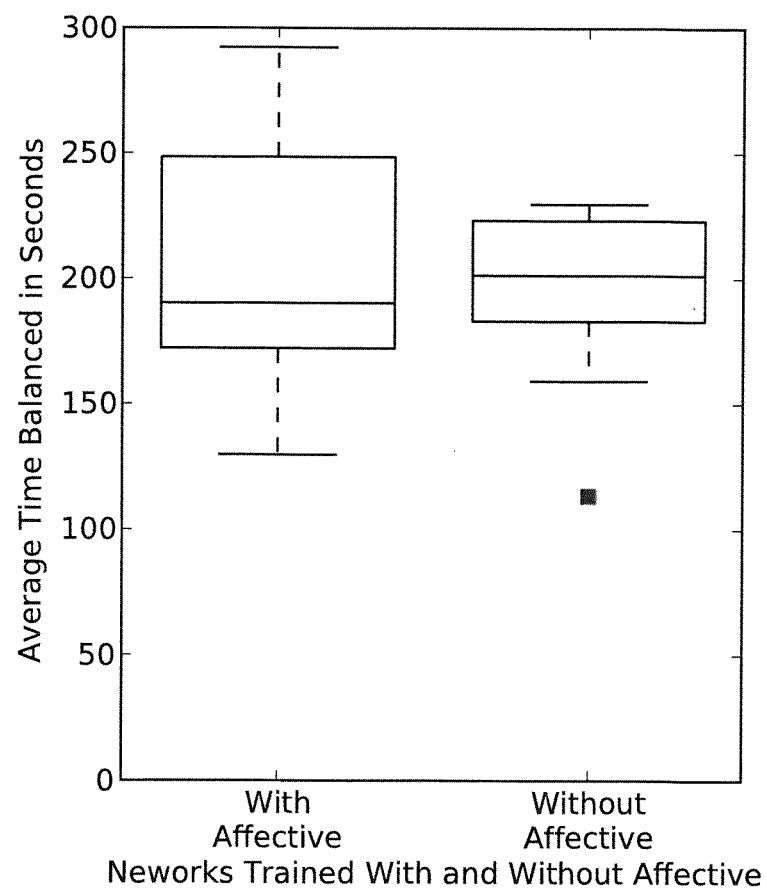
FIG. 24 shows box and whicker plots showing the results for networks trained with and without affective systems with improved performance.

FIG. 24 shows the results of the twelve networks trained without affective systems (of the 16 that satisfied the criterion for completion of training), when compared with the same seeded twelve networks trained with affective systems. Again, it appears as though the networks trained with the affective systems perform better than those trained without affective systems. However, the difference is relatively small, especially when considering the small sample size. Also, only 75 percent of the training tasks completed without the affective system, whereas 100 percent of the training tasks that incorporated the affective subsystems completed.

Figure 25:
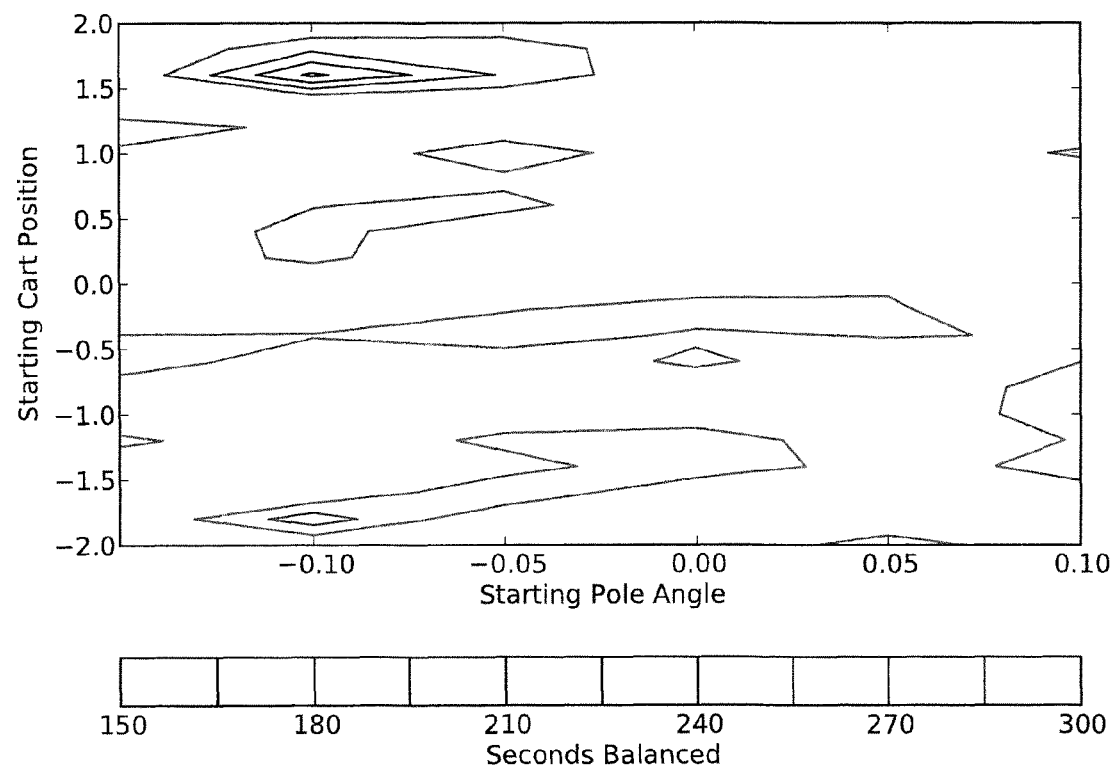
FIG. 25 shows a plot showing the generalization results on a network with an affective system—starting pole angle versus cart position and seconds to being balanced adapted from published color version, FIG. 17, of PLOS 2013.
Figure 26:
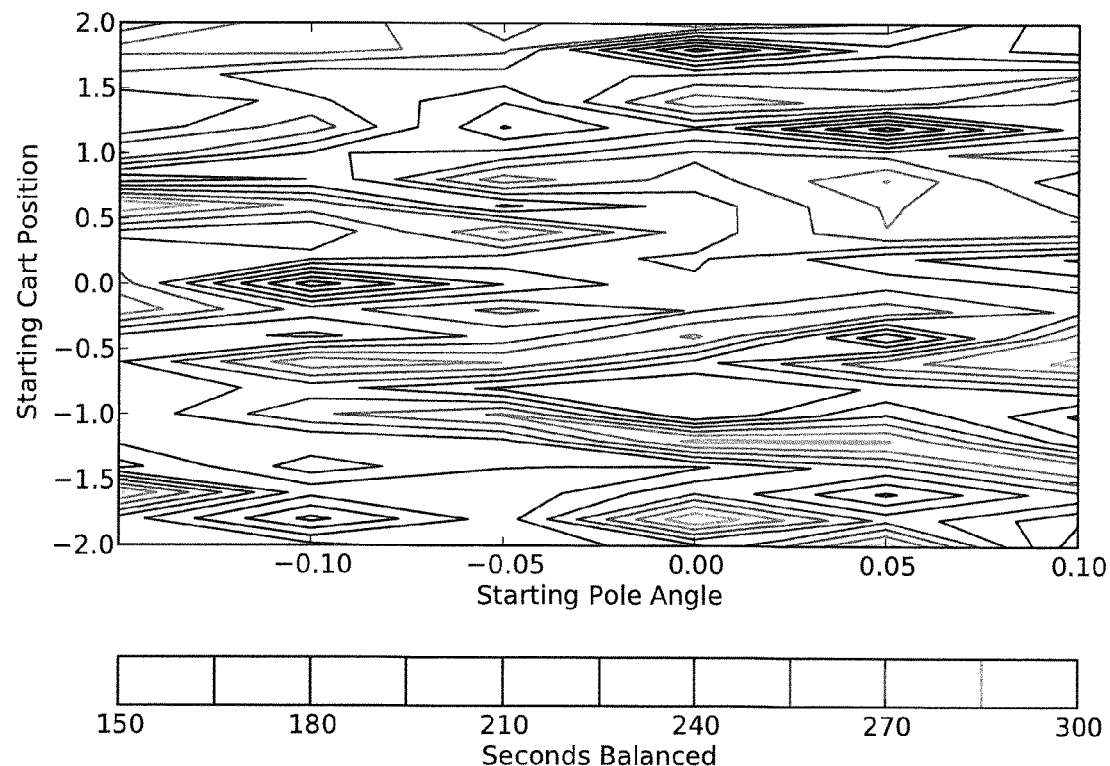
FIG. 26 shows a plot showing the generalization results on a network tested without an affective system—starting pole angle versus starting cart position versus seconds to being balanced adapted from published color version, FIG. 18, of PLOS 2013.
Figure 27:
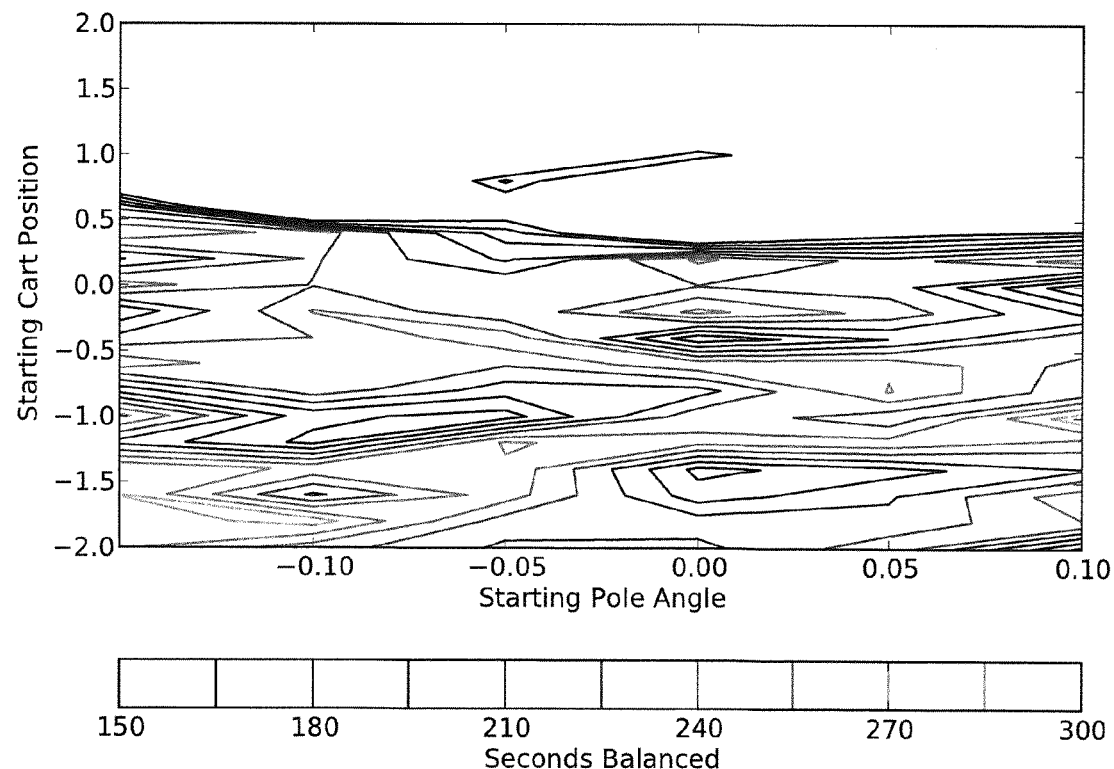
FIG. 27 shows a plot showing the generalization results on a network trained without an affective system—starting pole angle versus starting cart position versus seconds to being balanced adapted from published color version, FIG. 19, of PLOS 2013.

FIGS. 25, 26, and 27 show, respectively, the results for one network that was trained with the affective system and tested with the affective system, the same network tested without the affective system, and a network that was trained without the affective system, but started with the same initial evolutionary algorithm population. Each point on the contour map is the average of the ten runs that correspond to that range. For this example, the network with the affective system performed very well on the generalization test. The network trained with the affective system but tested without it performed second best; however, it is clear that the affective system was vital for the good performance of this network. Finally, the network trained without the affective system performed worst. In this case, the inclusion of the affective system in training vastly improved the generalization performance of the network. In general, the results given here are heartening. Though many more tests are required to form a conclusive statement about the effectiveness of networks with affective systems trained to complete tasks, we certainly believe that it is worth exploring further.

Anomaly Detection—Data Network Example

The problem of interest relates to an anomaly detection problem in general and, in particular, to an application in cyber security, which is the observation of packet arrivals at a node in a packet-switched communication network and detection of changes in the statistics of the arrival rate. These statistics are typically not known a priori and would require estimation in a conventional detection scheme and assumptions about the underlying process that governs the statistics. It is realistic to assume the statistics are piecewise constant but unknown, with a distribution on a finite interval of real-valued arrival rates, with jump discontinuities. The distribution of time intervals between jumps is typically not known. This corresponds to a mix of software applications that each generate network traffic at a more or less constant rate that is destined for a monitored network address. Some applications may be malware, in which case an objective is detection of the start and end of packet streams produced by the mal ware.

This scenario can be modeled as an observation of a discrete event process that can be characterized by its arrival times $\{t_k|t_0=0, t_{k+1}>t_k, k \in I^+\}$. This process can be represented as a discrete time real-valued random process $\{x_k=t_k-t_{k-1}|k \in I^+-\{0\}\}$, where the $x_k$ are in $R^+$ and $x_k \neq 0$. The $x_k$ are the time intervals between event arrivals and, with the additional knowledge of the time of the first event, $t_0$, fully characterize the discrete event process. Discrete events in the present invention (control, detection or classification applications) may propagate together through a synapse. A well-known statistical detection problem assumes that $x_k$ is a random process sampled from one of two known distributions, characterized by probability spaces $(\Omega_i, \Lambda_i, P_i)$, for $i=0,1$. Optimal detectors are known that minimize a linear combination of (i) the probability of detection $p_0$, (ii) the false alarm probability $p_1$, and (iii) the expected time of detection (decision) $E\{T\}$. The optimal algorithm processes received events sequentially, and after each receipt decides (i) not to make a decision until additional information is received, or (ii) that the inputs correspond to process 0 or 1. In the second case, the algorithm outputs the determined process type and stops. A slightly more challenging problem assumes that $x_k$ is a random process whose statistics can change from sample time to sample time between the two probability spaces. In both cases, the problem is well-defined in the field and has an optimal solution when the parameters of both distributions are completely specified (Poor and Hadjiliadis (2009); see pp. 102-129). There are also algorithms for this problem when the second distribution has some unknown parameters (Li et al., 2009).

In our setup, the NIDA network to be designed may have one input node and one output node. The network receives a pulse each time a packet arrives. Firing of the output node corresponds to a change in behavior. We may allow for a window of 100 time steps after the change in behavior. We may also define a threshold value, $\tau$, that determines how many output firings constitute a detection. If the mean arrival rate changes at time t, then $\tau$ firings of the output neuron at any point between t and t+100 is considered a true positive. If the output node fires $\tau$ times in a 100 time step window at any other time than 100 time steps following a change in mean arrival rate, it is categorized as a false alarm. For training, $\tau=1$ is used, and the fitness of the network is a function of the number of correct detections and false alarms.

The training algorithm was run, by way of example, for 10,000 epochs. The results shown below were produced by two networks, $N_+$ (65 neurons and 187 synapses) and $N_-$ (47 neurons and 148 synapses), that were able to detect, respectively, increases (+) and a decreases (−) in the mean arrival rate. We ran three types of tests: tests with large changes in the mean arrival rate (changes of at least 0.38), medium changes in the mean arrival rate (changes of at least 0.2) and small changes in the mean arrival rate (changes of at least 0.1). We estimated the probability of detection ($P_d$) of increases (decreases), the probability of false alarms ($P_{fa}$) for increases (decreases), and the probability of missed detection ($P_m$) of increases (decreases) by the frequency of detection and missed detection events over 100 test runs for both $N_+$ and $N_-$. All runs (training and evaluation) utilized independently generated random input event sequences.

The results are shown in Table 6. A Table 6 of estimated probability detection ($P_d$), probability of false alarm ($P_{fa}$), and probability of missed detection ($P_m$) of increases and decreases for $N_+$ and $N_-$, respectively, for three different test types (large, medium, and small changes in mean arrival rate) is provided below:

TABLE 6

| Network | Large | | | Medium | | | Small | | |
|---|---|---|---|---|---|---|---|---|---|
| | $P_d$ | $P_{fa}$ | $P_m$ | $P_d$ | $P_{fa}$ | $P_m$ | $P_d$ | $P_{fa}$ | $P_m$ |
| $N_+$ | 0.90 | 0.05 | 0.02 | 0.82 | 0.18 | 0.08 | 0.78 | 0.22 | 0.35 |
| $N_-$ | 0.87 | 0.13 | 0.01 | 0.87 | 0.13 | 0.14 | 0.78 | 0.22 | 0.45 |

Figure 34:
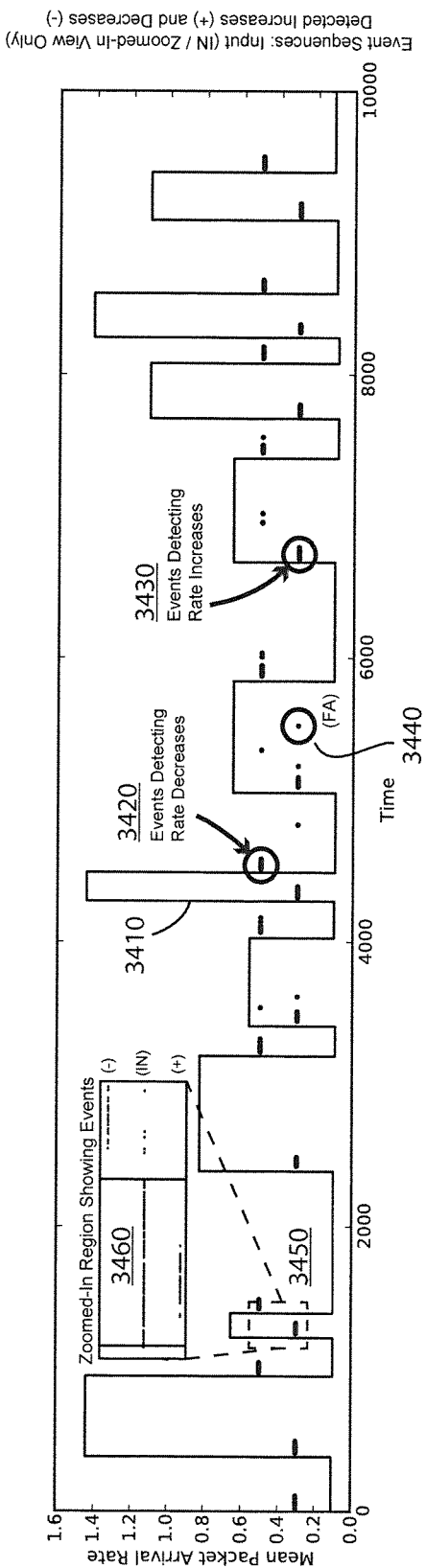
FIG. 34 shows a graph of time passage versus mean packet arrival rate in a data network having a mean packet arrival rate as the vertical axis and solid curve, with a section 3450 studied in detail and showing event sequences: Input (IN), detected increases (4+) and decreases (−) (Zoomed-in View 3460 only).

FIG. 34 shows the changes in mean arrival rate of one example test run (solid curve), as well as when $N_+$ 3430 and $N_-$ 3420 fired in that test run. Region 3450 is shown in greater detail as zoomed-in region 3460 and shown in larger detail in FIG. 35. An increase in arrival rate such as at 3410 leads to events detecting rate increase. Detection of another rate increase is shown as events 3430. Events detecting a decrease in arrival rate are shown at 3420. False alarms 3440 are possible.

Figure 35:
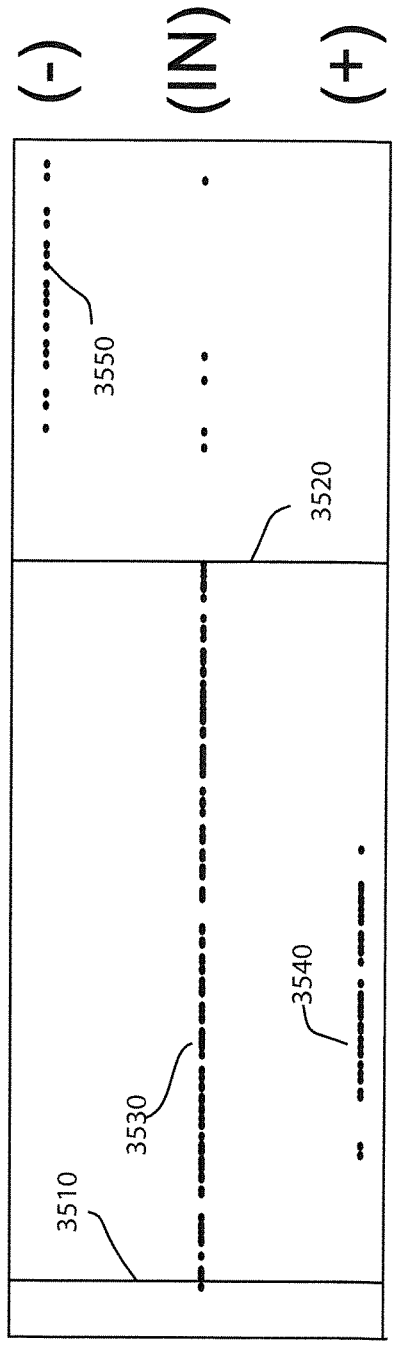
FIG. 35 shows zoomed-in region 3460 showing specific events with inputs 3530 (IN) and increases (+) 3540 and decreases (−) 3550, where the times of increase 3510 and decrease 3520 in average arrival rate are shown.

Referring to FIG. 35, vertical line 3510 indicates an increase in average event arrival rate. 3520 represents the subsequent detection events (+). The arriving events are shown at 3530, 3520 is a vertical line indicating a decrease in average arrival rate while 3550 are the subsequent detection events (−).

NIDA networks performed well when detecting large changes in the mean arrival rate, but the performance decreased as the size of the change in the arrival rate decreased. This is expected and consistent with the behavior of optimal detectors for problems where they are known. Performance tends to decrease as the region of overlap increases between the probability functions of the event observables conditioned upon the hypotheses.

A simple fitness function was used: the difference between the numbers of correct detections and false alarms. The fitness function favored networks that could detect any change in mean activity rate, but all of our training examples produced networks that detected either positive or negative changes, but not both. Other fitness functions or more extensive training may produce similar or improved results. The NIDA networks that were produced had many recurrent connections, as would be expected for this type of problem.

The performance characteristics of the ANN can be compared against the performance of an optimal detector for a simplified problem where the solution is known. We consider a classic example where the input event process has a constant mean arrival rate $\lambda$ that is one of two values $\{\lambda_0, \lambda_1\}$ and is observed over a time interval $\Delta T$. We assume $\lambda_1 > \lambda_0$. The optimal probabilities of detection and error, suitably defined, can be computed without regard to the observed sequence of events in this case.

The number of received events n is a Poisson random variable with distribution $$p(n) = \frac{(\lambda \Delta T)^n}{n!} e^{-\lambda \Delta T}$$

where $\lambda \Delta T$ is the mean number of observed events in the time interval. The problem is to decide which of two hypotheses is correct: $\{H_0: \lambda = \lambda_0\}$ or $\{H_1: \lambda = \lambda_1\}$.

Assuming the a priori probability of hypothesis $H_0$ is 0.5 and the costs assigned to correct (detection) and incorrect (false alarm or failure to detect) identification of the true hypothesis are equal, the optimal decision rule is (H. L. Van Trees (1968); see pp. 23-46), given an observed number of events n in the time interval, and defining the function $$f(\lambda_0, \lambda_1) = \frac{(\lambda_1 - \lambda_0)\Delta T}{\ln \lambda_1 - \ln \lambda_0},$$

$$h = \begin{cases} H_1 & \text{if } n > f(\lambda_0, \lambda_1) \\ H_0 & \text{if } n < f(\lambda_0, \lambda_1) \end{cases}$$

with no (or random) choice in the case of equality. The probability of detection (correct classification) is the sum of the probabilities that $H_0$ is true and the number of observed events is less than $f(\lambda_0, \lambda_1)$, and that $H_1$ is true and the number of observed events in greater than $f(\lambda_0, \lambda_1)$ (assuming the function's value is not an integer):

$$p_d = \sum_{\substack{k \geq 0 \\ k < f(\lambda_0, \lambda_1)}} \frac{(\lambda_0 \Delta T)^n}{n!} e^{-\lambda_1 \Delta T} + \sum_{k > f(\lambda_0, \lambda_1)} \frac{(\lambda_1 \Delta T)^n}{n!} e^{-\lambda_1 \Delta T}.$$

The probability of error is expressed similarly:

$$p_e = \sum_{\substack{k \geq 0 \\ k < f(\lambda_0, \lambda_1)}} \frac{(\lambda_1 \Delta T)^n}{n!} e^{-\lambda_1 \Delta T} + \sum_{k > f(\lambda_0, \lambda_1)} \frac{(\lambda_0 \Delta T)^n}{n!} e^{-\lambda_1 \Delta T}.$$

This classic detector is predicated upon the assumptions that either hypothesis $H_0$ or $H_1$ is valid for the duration of the time interval, that a priori statistics are known, and that costs can be assigned. When one of the hypotheses is not valid for the entire interval, as is the case for the application of interest, the mathematics become more challenging. One approach is the assumption of a Markov process that generates the arrival statistic as a function of time, and the methods of quickest detection, discussed previously, can be applied in some cases.

Figure 28A:
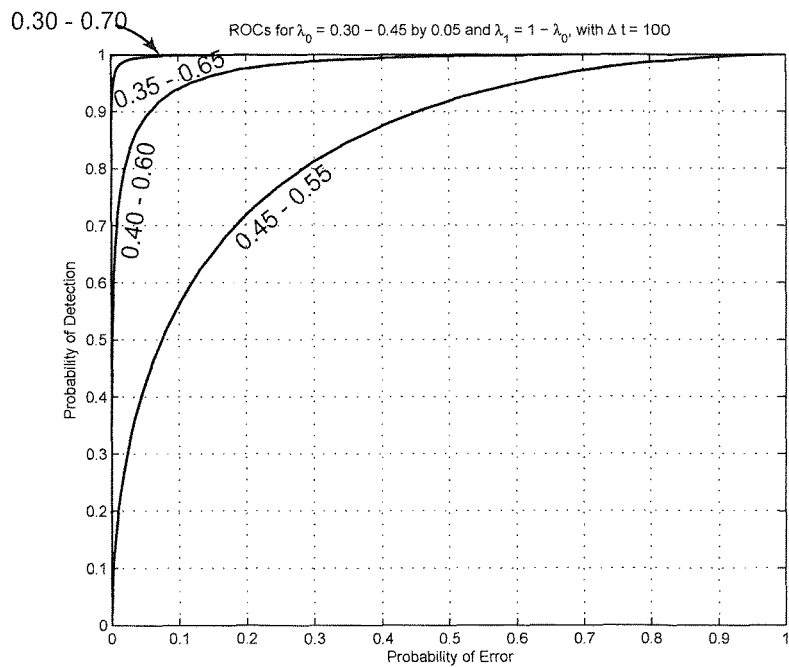
FIG. 28A shows simulation results in the firm of ROC curves for probability of error versus probability of detection and FIG. 28B shows probability of error versus probability of detection graphs for ranges of $(\lambda_0, \lambda_1)$ of (0.20, 0.80), (0.30, 0.70) and (0.40, 0.60).
Figure 28B:
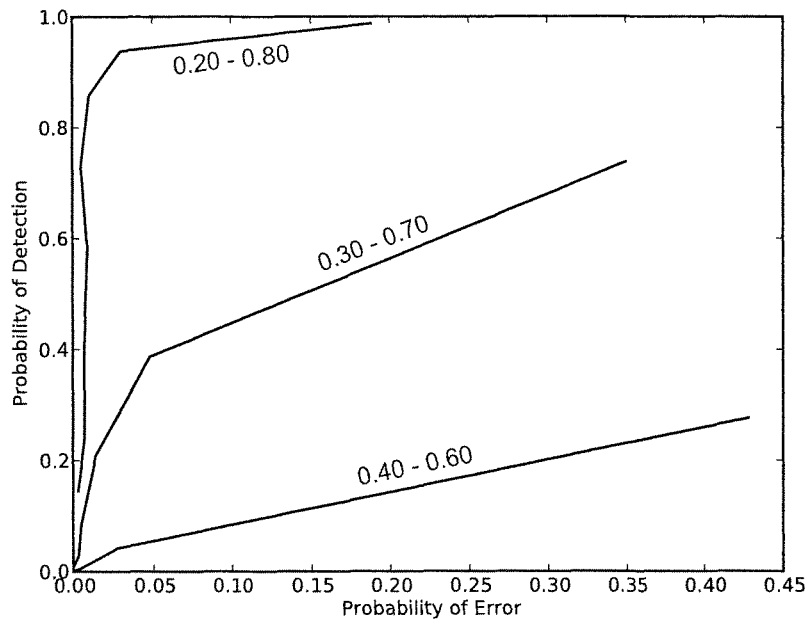
Figure 29A:
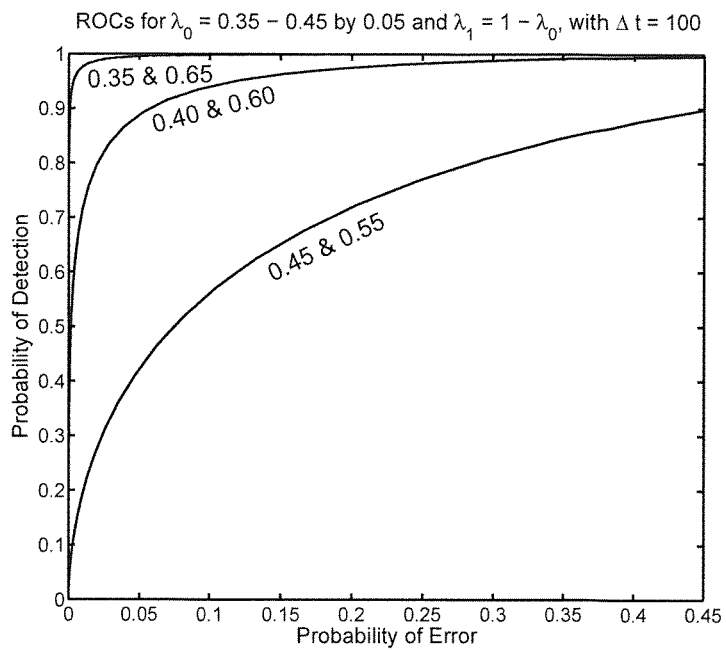
FIG. 29A are similar ROC curves to FIG. 28A for different values of $(\lambda_0, \lambda_1)$
Figure 29B:
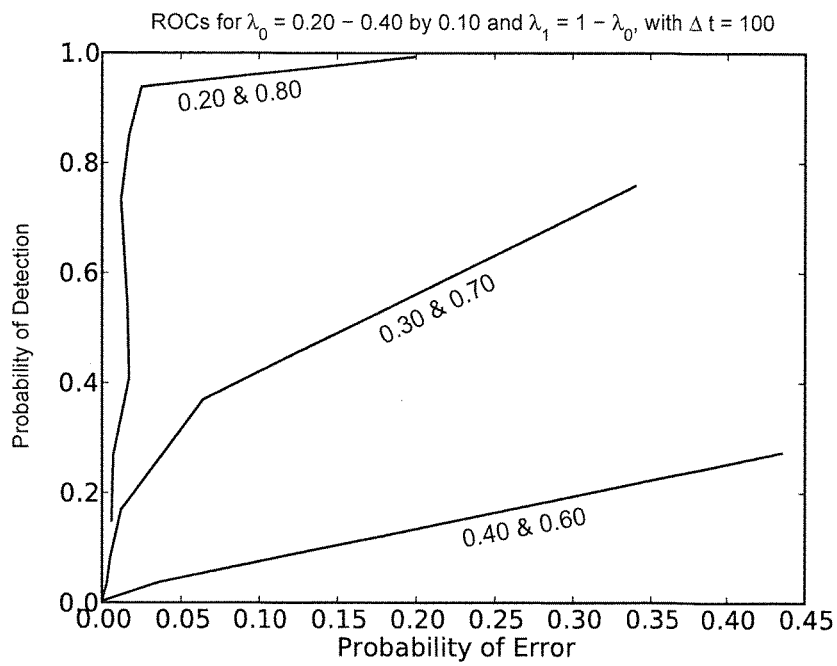
FIG. 29B shows a similar related set of graphs for probability of error versus probability of detection similar in form to FIG. 28B.

An alternative approach using Neyman-Pearson detectors (Vantrees 1968; see pp. 23-46), which compare a computed likelihood ratio against a threshold, is used here to explore how the probability of detection changes with a constraint on the maximum allowed probability of error, expressed graphically as receiver operating characteristic (ROC) curves (see FIGS. 28A, 28B, 29A and 29B for exemplary curves. If the probabilities of observation of a signal S given hypotheses $H_0$ and $H_1$, $p(S|H_0)$ and $p(S|H_1)$, are known, the likelihood ratio (LR)

$$\Lambda(S) = \frac{p(S|H_1)}{p(S|H_0)}$$

can be compared against a threshold $\eta$ determined by the solution of a constrained optimization problem, yielding a decision that $H_1$ is true if the LR $\Lambda(S) > \eta$ and that $H_0$ is true if it is less. FIGS. 28A and 28B show representative ROC curves for Neyman-Pearson detectors and FIGS. 29A and 29B show representative ROC curves for an ANN detector for different values of $\lambda_0$ and $\lambda_1$. The Neyman-Pearson optimal detector, which is a function of the maximum allowed probability of error, is used to generate the curves of FIGS. 28A and 28B for each pair of mean arrival rates. In contrast, the same ANN detector structure is used for all pairs of FIGS. 29A and 29I. In order to evaluate the ANN detector in a like manner, the detector's output events within intervals $[t-\Delta t, t]$ are counted and compared against a threshold. A detection at time t corresponds to the count exceeding the threshold at that time, and frequencies of detection and error are computed for a range of thresholds and graphs.

The salient point here is the ANN detector is providing a (probably suboptimal) solution to a much more challenging detection problem than can be solved mathematically, where the statistics of the underlying processes are not known and must be learned (along with the solution) by observing the input event sequence. The learning problem is supervised, as an oracle is assumed that allows evaluation of the fitness function during training, but this is not sufficient to drive an optimal detector. It is sufficient at this point to recognize that the ANN detector's performance has similar behavior to an (over-simplified) optimal detector, exhibiting increasing detection probability with increasing allowable probability of error, and increasing probability of detection with an increasing difference in mean arrival rate of the events. The two types of detectors are qualitatively, but not quantitatively, comparable.

With very little human interaction, outside of specifying one input node and one output node, the algorithm produced networks that can detect changes in the statistics of the arrival rate of packets in a network security system. Dynamic components are absolutely necessary for these problems. A NIDA ANN can evolve to include the structural elements and dynamic elements that each separate problem requires, rather than rely on hand-tuning of the structure or dynamic components, as is often required for other types of neural networks. We have also found that our network structure can be trained to perform well on the exclusive-or problem and the cart and pole (inverted pendulum) problem.

Classification (Hand-Written Number Classification)

An embodiment of a neuroscience-inspired dynamic architecture has been applied to a classification problem with success, in particular, to the MNIST handwritten digit classification task. In this task, 28 by 28 pixel images of handwritten digits (0-9) are given as input, and the goal of the task is to produce the correct digit corresponding to the image as output. FIG. 30 shows scanning by row, by column and by row and column (not necessarily in that order). Examples of MNIST digits are shown in FIG. 30.

This task is entirely static; there is no time component. Thus, simply feeding the image as input to a NIDA network does not take advantage of the dynamic components of our network. To take advantage of the information content that can be stored in a network via synaptic delays and neuronal charges, we chose to add a time component to the task. In particular and referring to FIG. 30, rather than feeding the entire image into the network at once, the network "scans" the image in one of three ways: (1) a row at a time, (2) a column at a time, or (3) both a row and a column at a time (or by entropy as will be discussed further herein). This allows the task to take advantage of the inherent dynamical properties of NIDA networks. This approach also significantly reduces the size of the network (by reducing the number of input neurons from 784 to 28 or 56). There are several ways one might use our networks to solve this task. A single network could be trained that takes the image as input (in the scanning way as described above) and has 10 output neurons (one corresponding to each digit). Then, based on the activity of the network a guessed digit or digits can be produced, for example, by choosing the digit that corresponds to the output neuron that fires the most during simulation. This is the most straightforward approach; however, because the network is required to recognize each digit type, the resulting networks may be very complex. We instead use many small networks that contribute to the final solution results of these networks can then be combined via a winner-take-all (WTA) scheme to produce the guessed digit for any given test case. There are multiple fitness or scoring functions that can be defined for this task. We explored two different fitness functions.

The first fitness function takes 500 randomly selected images at a time from the training set (50 representing each digit type). Then, of those 500, the fitness function takes 10 at a time (one for each digit type), and simulates the network on each of those images. Suppose we are training a network to recognize images of the digit d (where d∈{0, ..., 9}). If the network correctly classifies an image of type d and correctly identifies that the other nine are not of digit type d, the network's score is increased by 10. If the network fails on any of those ten classifications, its score is unchanged. The goal of this fitness function is to produce networks that are able to identify a particular digit and only digits of that type.

The second fitness function is based on entropy. Again, suppose we are training a network to recognize images of digit type d. For each network, we evaluate that network on all of the training set images to produce a listing of the number of times that network fires (in some window or over the course of the entire simulation). Once all of the training images have been evaluated, a set of 2-tuples is produced for the network, one for each training image: $S=\{(f_1,d_1), (f_2,d_2), \ldots, (f_n,d_n)\}$, where $f_i$ is the number of times the network fired for training image i and $d_i$ is the correct digit associated with training image i.

Define a threshold parameter $T \in \{f_i\}_{i=1}^n$. If $f_i \geq T$, let $(f_i,d_i) \in S_{yes}$; otherwise, let $(f_i,d_i) \in S_{no}$. Let $n_{yes,c} = |\{(f_i,d_i) \in S_{yes}: d_i = d\}|$, and let $n_{yes,w} = |\{(f_i,d_i) \in S_{yes}: d_i \neq d\}|$. Let $n_{no,i} = |\{(f_i,d_i) \in S_{no}: d_i \neq d\}|$, and let $n_{no,w} = |\{(f_i,d_i) \in S_{no}: d_i \neq d\}|$.

The entropy for a particular threshold value T is calculated as follows:

$$H(T) = - \sum_{r \in \{yes,no\}} \frac{|S_r|}{|S|} \sum_{k \in \{o,w\}} \frac{n_{r,k}}{|S_r|} \log_2 \frac{n_{r,k}}{|S_r|}.$$

The fitness function for training is defined as:

$F(\text{Network}) = \min_{T \in \{f_i\}_{i=1}^n} H(T).$

The EO attempts to find the network (and associated threshold T) that minimizes the fitness function.

In both fitness functions, rather than training over the entire set of training images at a time, 5,000 of the 60,000 are randomly chosen, where 500 of each digit type are represented in the 5,000. This is done to avoid over fitting to the training set. Then, rather than using only one network for each digit, many networks are chosen. Using one or both of these fitness functions, we assume that the networks that are being produced are recognizing particular features of each digit type, but not necessarily recognizing every feature of a particular digit.

Figure 31:
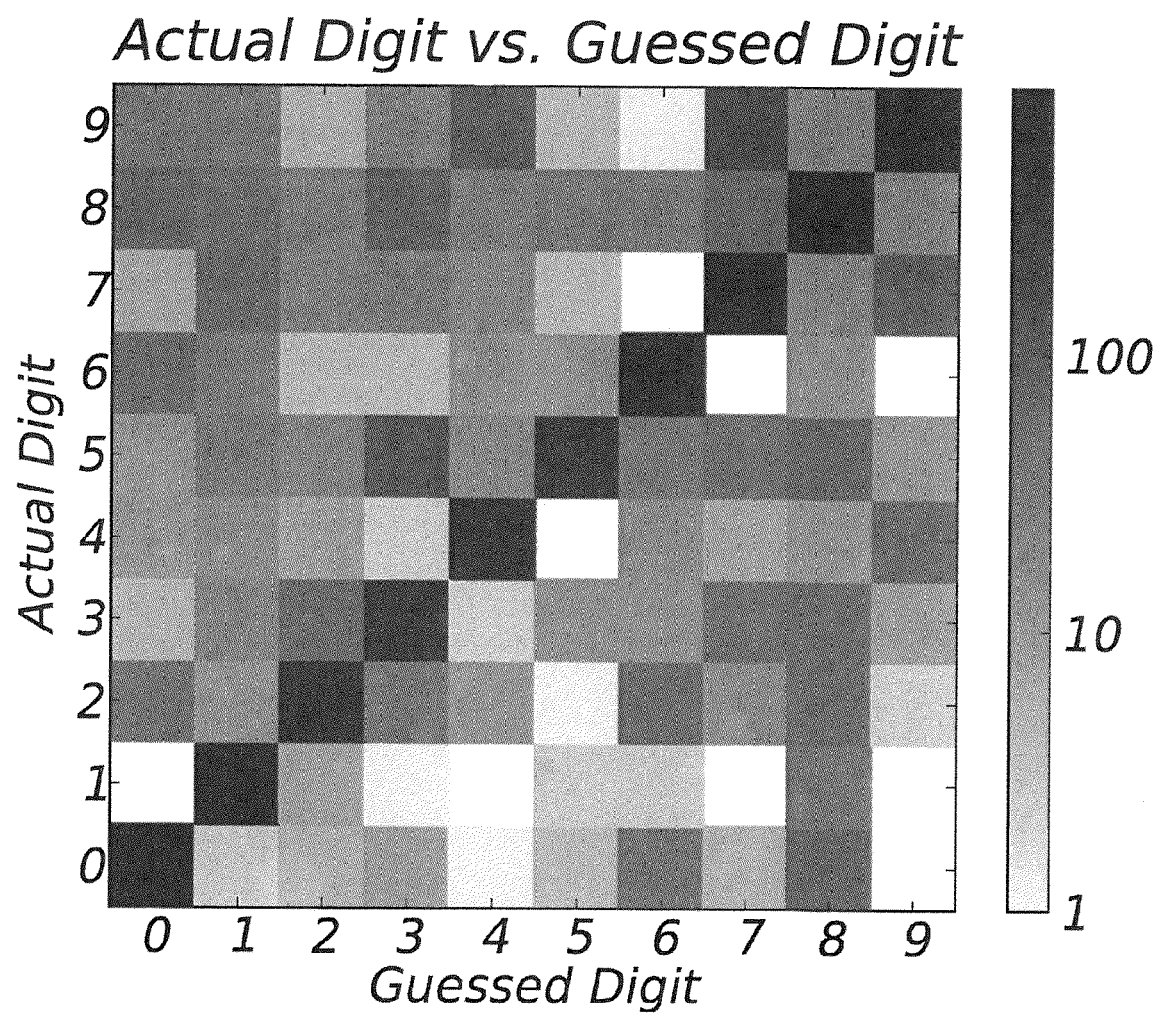
FIG. 31 shows classification results for the first fitness function as actual digit versus guessed digit on a logarithmic scale of 1 to 100+ adapted from published color version, FIG. 2, of C. D. Schuman, J. D. Birdwell and M. E. Dean, "Spatiotemporal Classification Using Neuroscience-Inspired Dynamic Architectures." *Biologically Inspired Cognitive Architectures*, pp. 1-9, 2014, (hereinafter, BICA 2014).

The first fitness function produced an ensemble of networks that resulted in 83.7 percent accuracy on the testing set of handwritten digits. This results ensemble was made up of 600 networks, 20 for each digit for each scanning type. The accuracies for each scanning type were as follows: 72.1 percent accuracy by row, 79.6 percent accuracy by column, and 76.0 percent accuracy for both row and column. FIG. 31 shows the results for each digit type. This figure gives some insight as to how the networks are operating. For example, nines were often mis-classified as either fours or sevens, which we categorize as a valid mis-guess, as some nines may often appear very similar to fours or sevens. Similarly, threes are often mis-classified as fives or eighths. Again, threes have many similar features as fives and eighths, so the mis-guess makes sense within the construct of the problem. It also indicates that this fitness function may be inadvertently producing networks that recognize features, rather than the entire digit, so the second, more complex fitness function may not be required.

Figure 32:
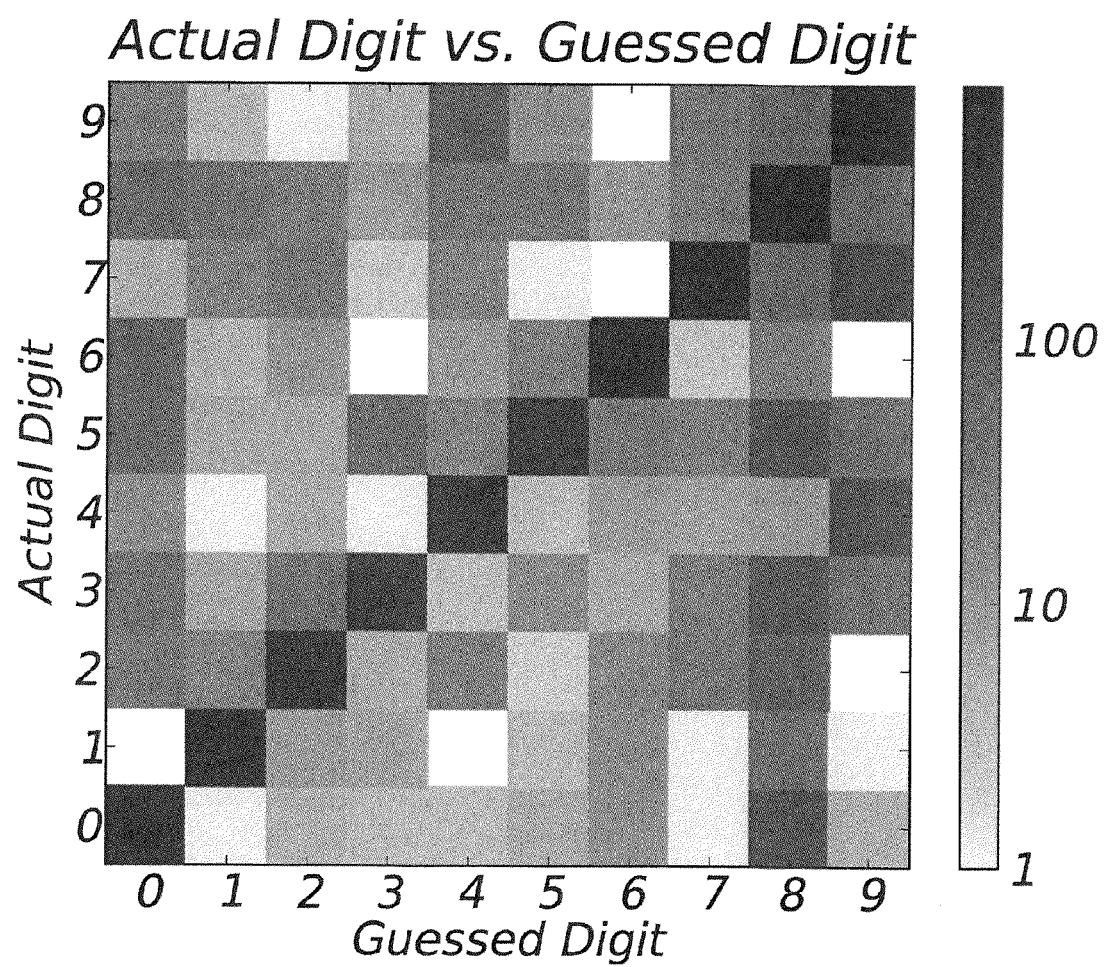
FIG. 32 shows classification results for the second fitness function as actual digit versus guessed digit on a logarithmic scale of 1 to 100+ adapted from published color version, FIG. 3, of BICA 2014.

The second fitness function (for example, based on entropy) produced an ensemble of networks that results in 83.2 percent accuracy on the testing set. An important feature of the second fitness function is that it is just as likely to produce networks to recognize a particular digit type that fire when the image is not of that digit type. For example, if the network is supposed to recognize threes, this fitness function may produce networks that fire when an image is not of a three, rather than firing when recognizing a three. We tested each network's classification accuracy on the training set to determine if the network fired when recognizing the digit it was supposed to classify or if the network fired when it determined the current image was not the digit it was meant to recognize. The results ensemble was made up of 200 networks, 20 for each digit. For this fitness function, only networks scanning by column were produced, as those networks resulted in the best individual accuracy. FIG. 32 shows the results for each digit type. Two anomalies occurred with the set of networks produced. Similar to the results for the first fitness function, sevens and fours were often mistaken for nines, and zeros, threes and fives were often mistaken for fives. Eighths, fives, threes and zeros share many features, such as a backwards C-like shape on the bottom. We are interested in this type of fitness approach because it admits the possibility of unsupervised learning, finding classifiers that efficiently segregate input streams into dissimilar collections, with the possibility of later using these networks as feature extractors in more complex classifiers or controllers.

We also combined both sets of ensembles to produce one large ensemble of 800 networks (80 for each digit type). This ensemble produced a testing classification accuracy of 87.1. The sizes of the networks for each digit type are shown in FIG. 33A through FIG. 33H. Most of the networks were very similar in size, with networks scanning both by row (FIG. 33A) and column (FIG. 33B) being larger in number of neurons (FIGS. 33E and 33F show numbers of synapses when scanning by row and by column respectively. FIG. 33C shows numbers of neurons when both row and column are scanned (synapses in FIG. 33G). This inflation is mostly due to the fact that these networks had 56 input neurons rather than 28 as the other network types did. An interesting point to note about the sizes of the networks produced is that the networks that recognized ones had noticeably more synapses than other networks for those trained with the first fitness function (FIGS. 33E through 33G show the high number of synapses for digit type 1). Classification of ones was also the most accurate of any digit for the ensemble of networks produced using the first fitness function (97.2 percent classified correctly). The second fitness function produces networks with more neurons than those scanning only by row or by column using the first fitness function (FIG. 33D), but the lumber of synapses was comparable (FIG. 33H).

Each of the networks produced by the first fitness function was generated in two hours, and those produced by the second fitness function were generated in 24 hours. No pre-processing was done on the handwritten images. Some pre-processing on the images may also improve performance. These results are not yet comparable with the state-of-the-art results on classification of handwritten digits, which are published and which have less than 1 percent error in classification of the testing set. However, many of the other methods used in solving this problem are tailored specifically for problems such as this one, whereas NIDA networks are meant to perform relatively well on a wide variety of problem types, including those with temporal components.

Classification—Breast Cancer, Diabetes and Iris Applications

NIDA networks which may be categorized as spiking neural network architectures trained with genetic algorithms or evolutionary strategies may be applied to compare against published results of other known networks using these datasets. The three classification data problem sets are the Wisconsin breast cancer data set, the Pima Indian Diabetes data set and the iris (flower) data set. Methods known in the literature using neuroevolution to train include the following all of which can be found in the literature and are not described in detail here: MPANN (Memetic pareto ANN, Abbass 2002); Fogel (Fogel et al. 1990 and 1995); Alba-GA (Alba and Chicano 2004); Alba-GALM (Alba and Chicano 2004); Alba-GABP (Alba and Chicano 2004); GP-StdX (Garcia-Pedrajas et al. 2006); GP-GaX (Garcia-Pedrajas et al. 2006); GP-SaX (Garcia-Pedrajas et al. 2006); MGNN-roul (Palmes et al. 2005); MGNN-rank (Palmes et al. 2005); MGNN-ep (Palmes et al. 2005); and EPNet (Yao and Liu 1997).

Spiking neural network methods include: SRM SNN (Belatreche et al. 2007); DSSNN (Belatreche et al. 2007); SpikeProp (Bohte et al. 2002 and Belatreche et al. 2007); Jin (Jin et al. 2007); SNN-PARDE (Pavlidis et al. 2005). Other methods compared include MDT (Abbass et al. 2001 and Abbass 2002); MatlabBP (Belatreche et al. 2007); Alba-BP (Alba and Chicano 2004); Alba-LM (Alba and Chicano 2004); HDAANNs (Yao and Liu 1997); FNNCA (Yao and Liu 1997); Perceptron (Parekh et al. 2000); MPyramid-real (Parekh et al. 2000); MTiling-real (Parekh et al. 2000); Pav-BP (Pavlidis et al. 2005); Pav-MBP (Pavlidis et al. 2005); and Pav-SMBP (Pavlidis et al. 2005).

Results for the diabetes set were also given for the following as reported by Michie et al. 1994: Logdisc, logistic discrimination; Cal5, a decision tree method; DIPOL92, a hybrid algorithm; Discrim, a linear discriminant analysis; Quadisc, a quadratic discriminant analysis; CART, a classification and regression tree analysis; RBF, radial basis function; CASTLE, casual structures from inductive learning; NaiveBay, Naïve Bayesian classifier; IndCart, a CART extgension; and SMART, another classification and regression analysis. The first appearing acronyms are used in the tables and figures introduced below.

Breast Cancer

The Wisconsin breast cancer data set comprise 699 instances of patient information related to diagnosing breast cancer. There are nine relevant attributes per instance, each of which may be assigned a value between 1 and 10: clump thickness, uniformity of cell size, uniformity of cell shape, marginal adhesion, single epithelial cell size, bare nuclei, bland chromatin, normal nucleoli and mitoses. These nine attributes serve as inputs to all the networks including NIDA. The output of the network corresponds to one of two values: benign or malignant. There are missing values in the data set, which means that some of the instances are incomplete. The 699 instances can be divided into two sets: training and testing, where the training instances are used to train networks to complete the task and the testing set is used to verify how well the network was trained to complete the task. Results are reported in terms of classification error on the testing set.

The networks used in this comparison had nine inputs neurons, one corresponding to each attribute. There is a single output neuron. If that output neuron fires in the last 50 time steps of a 500 time step simulation, then the network classifies that instance as malignant; if the output neuron does not tire in that window, the network classifies that instance as benign. The values of each attribute are integer values and thus are easily converted into pulse streams. If the value is x, then x pulses were applied to the corresponding input neuron, starting at time 0, and spaced five simulated time steps apart. Thus, if the value is 3, then three pulses are applied to that neuron, one at time 0, one at time 5, and one at time 10. The missing values were set as 0 and thus ignored by the network. Other encoding schemes can be used.

A population of size 100 was used, with a crossover rate of 0.9 and a mutation rate of 0.99. The NIDA evolutionary optimization was allowed to proceed for 100 epochs or until the best fitness was achieved. The fitness function ran 150 randomly selected training instances of both malignant and benign types and evaluated how the network performed on those training instances. The fitness value was the fraction correctly classified. A perfect fitness function score corresponds to correctly classifying all 300 randomly selected instances, which may be a second stopping condition of the evolutionary optimization.

Figure 46:
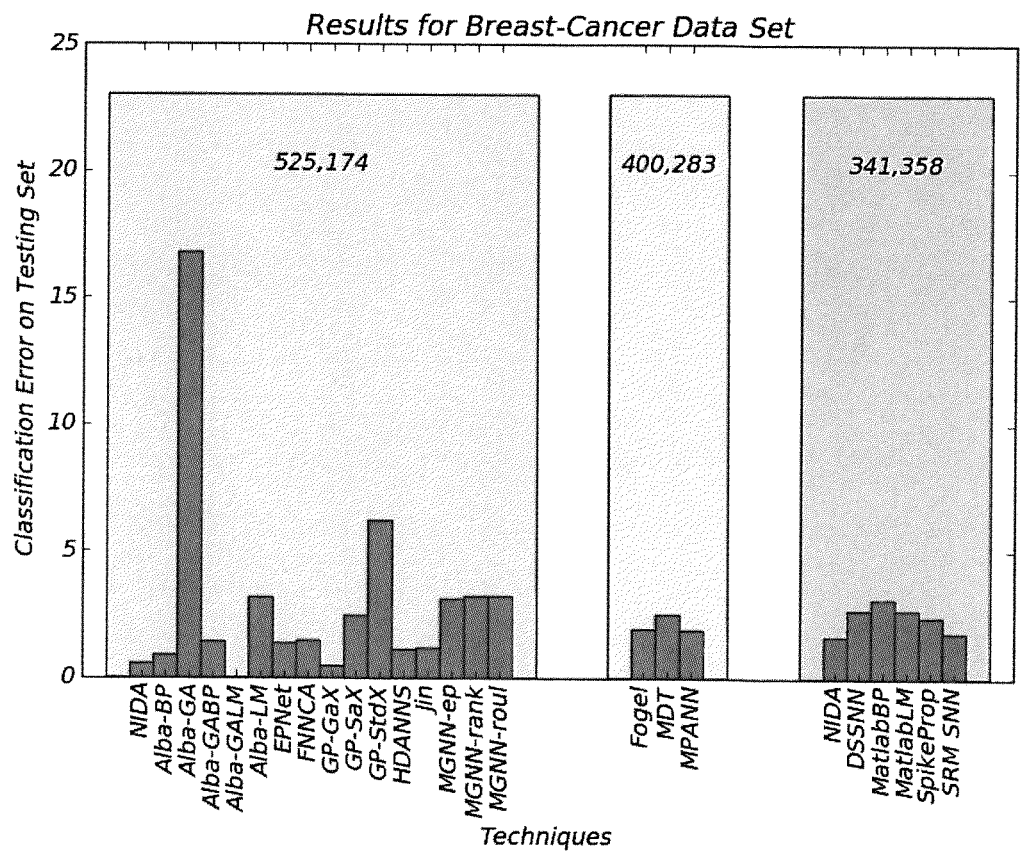
FIG. 46 provides a bar chart of comparative results of the present system as compared with others utilizing the breast cancer data set.

Table 7 below and FIG. 46 show the results, listed by increasing testing error rate for a variety of methods on the breast cancer data set. Various known methods used different sized training/testing sets. NIDA's results are in bold type in Table 7 and are shown for two sizes of training/testing set. NIDA obtained the third best overall results amongst these comparative results and the best results for the smaller training size. The two methods with higher results than NIDA are Alba-GALM and GP-GaX, both neuroevolution methods that train traditional artificial neural networks. It is important to note that Alba-GALM is a method that made use of both a genetic algorithm and the Levenberg-Marquardt method to train the neural network for this task. This method may outperform NIDA because Levenberg-Marquardt is particularly suited for solving this type of problem for feed-forward neural networks. GP-GaX, on the other hand, uses an advanced crossover operation based on genetic algorithms to avoid the competing conventions problem, so it is essentially a nested genetic algorithm. Both of these methods are restricted to feed-forward neural network architectures, unlike NIDA, which works on recurrent architectures and with spiking neural networks. NIDA outperforms all of the spiking neural network methods on this task in terms of classification error.

TABLE 7

| Technique | Number Training Examples | Number Testing Examples | Testing Error |
|---|---|---|---|
| Alba-GALM | 525 | 174 | 0.02 |
| GP-GaX | 525 | 174 | 0.46 |
| NIDA | 525 | 174 | 0.5747 |
| Alba-BP | 525 | 174 | 0.91 |
| HDANNS | 525 | 174 | 1.149 |
| Jin | 525 | 174 | 1.2 |
| EPNet | 525 | 174 | 1.376 |
| Alba-GABP | 525 | 174 | 1.43 |
| FNNCA | 525 | 174 | 1.45 |
| NIDA | 341 | 358 | 1.676 |
| SRM SNN | 341 | 358 | 1.8 |
| MPANN | 400 | 283* | 1.9 |
| Fogel | 400 | 283* | 1.95 |
| SpikeProp | 341 | 358 | 2.4 |
| GP-SaX | 525 | 174 | 2.48 |
| MDT | 400 | 283* | 2.5 |
| DSSNN | 341 | 358 | 2.7 |
| MatlabLM | 341 | 358 | 2.7 |
| MatlabBP | 341 | 358 | 3.1 |
| MGNN-ep | 525 | 174 | 3.14 |
| Alba-LM | 525 | 174 | 3.17 |
| MGNN-rank | 525 | 174 | 3.22 |
| MGNN-roul | 525 | 174 | 3.23 |
| GP-StdX | 525 | 174 | 6.19 |
| Alba-GA | 525 | 174 | 16.76 |

Diabetes

The Pima Indian diabetes data set is composed of 768 instances of patient information related to diagnosing diabetes. There are eight attributes per instance: number of times pregnant, plasma glucose concentration, diastolic blood pressure, triceps skin fold thickness, 2-hour serum insulin, body mass index, diabetes pedigree function, and age. These attributes serve as input to the network. The output of the network corresponds to whether or not the patient has diabetes, based on those attributes. There are missing values in the data set, which means that some of the instances are incomplete.

The networks used in this comparison had eight input neurons, one corresponding to each attribute. There is a single output neuron. If that output neuron fires in the last 50 time steps of a 500 time step simulation, then the network classifies that instance as positive for diabetes; if the output neuron does not fire in that window, the network classifies that instance as negative. The input values were real-valued and not easily translatable to pulse streams, so, as was done in many of the other works using these data set, the values for each attribute were scaled to between 0 and 10 and rounded to the nearest integer. As in the breast cancer test case, if the scaled value is x, then x pulses were applied to the corresponding input neuron, starting at time 0, and spaced five simulated time steps apart. The missing values were set as 0 and thus ignored by the network. Other encoding schemes can be used.

A population of size 100 was used, with a crossover rate of 0.9 and a mutation rate of 0.99. The evolutionary optimization was allowed to proceed for 100 epochs or until the best fitness was achieved. The fitness function ran 75 random training instances of both class types and evaluated how the network performed on those training instances. The fitness value was the fraction correctly classified. A perfect fitness function value corresponds to correctly classifying all 150 randomly selected instances, which is the second stopping condition of the evolutionary optimization.

Figure 47:
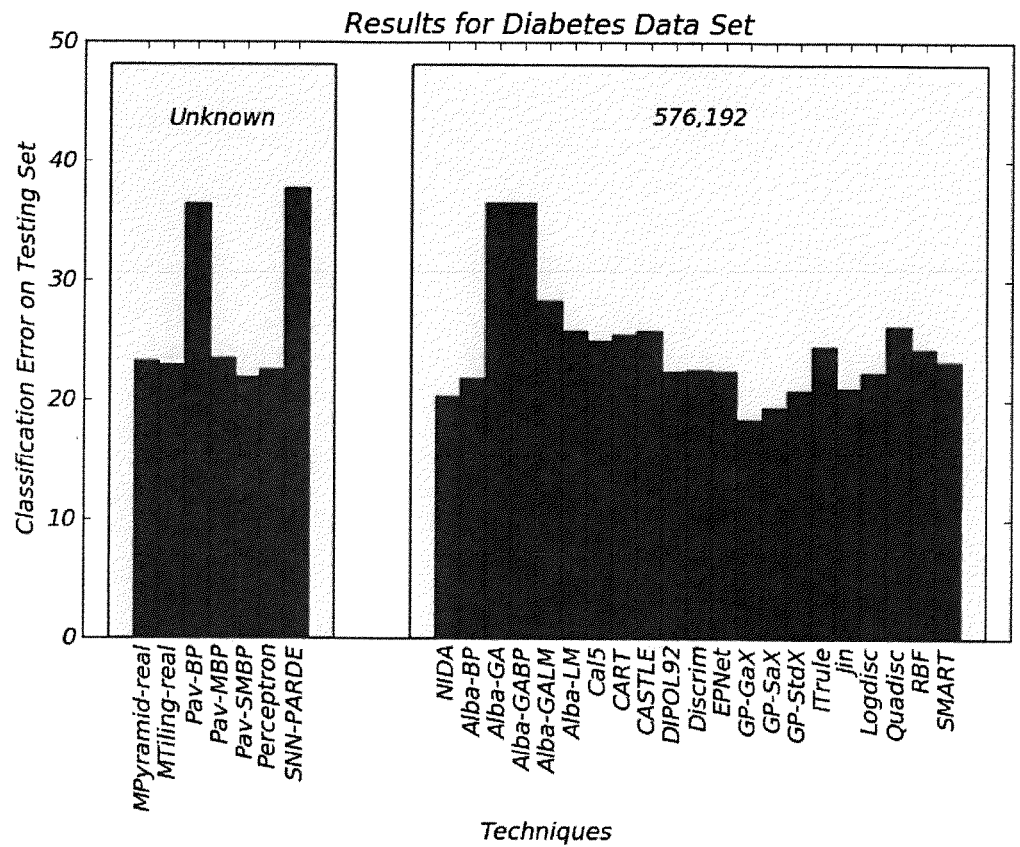
FIG. 47 provides a bar chart of comparative results of the present system as compared with others utilizing the diabetes data set.

Table 8 and FIG. 47 give the classification error results for the diabetes classification task. The results in the table are listed in increasing order by testing error. This task has a much higher testing error for all methods than both the breast cancer and iris testing sets, indicating that this task is particularly difficult to perform. For this method, NIDA again achieved the third lowest testing error. GP-GaX and GP-SaX outperformed NIDA on this task. GP-SaX uses simulated annealing instead of genetic algorithms to perform crossover, but again, it is a nested optimization algorithm. The same weakness applies to GP-SaX as GP-GaX; it is a method that is restricted to traditional artificial neural network architectures, specifically networks with a single hidden layer, whereas NIDA is a more flexible architecture and training method. Again, NIDA outperformed the spiking neural network methods given, as well as all of the statistical methods reported in Michie et al. (1994).

TABLE 8

| Technique | Number Training Examples | Number Testing Examples | Testing Error |
|---|---|---|---|
| GP-GaX | 576 | 192 | 18.4 |
| GP-SaX | 576 | 192 | 19.39 |
| NIDA | 576 | 192 | 20.3125 |
| GP-StdX | 576 | 192 | 20.82 |
| Jin | 576 | 192 | 21 |
| Alba-BP | 576 | 192 | 21.76 |
| Pav-SMBP | | | 21.88 |
| Logdisc | 576 | 192 | 22.3 |

TABLE 8-continued

| Technique | Number Training Examples | Number Testing Examples | Testing Error |
| --- | --- | --- | --- |
| EPNet | 576 | 192 | 22.4 |
| DIPOL92 | 576 | 192 | 22.4 |
| Perceptron | | | 22.5 |
| Discrim | 576 | 192 | 22.5 |
| MTiling-real | | | 22.9 |
| SMART | 576 | 192 | 23.2 |
| MPyramid-real | | | 23.2 |
| Pav-MBP | | | 23.43 |
| RBF | 576 | 192 | 24.3 |
| ITrule | 576 | 192 | 24.5 |
| Cal5 | 576 | 192 | 25 |
| CART | 576 | 192 | 25.5 |
| Alba-LM | 576 | 192 | 25.77 |
| CASTLE | 576 | 192 | 25.8 |
| Quadisc | 576 | 192 | 26.2 |
| Alba-GALM | 576 | 192 | 28.29 |
| Pav-BP | | | 36.45 |
| Alba-GA | 576 | 192 | 36.46 |
| Alba-GABP | 576 | 192 | 36.46 |
| SNN-PARDE | | | 37.69 |

Iris

The iris data set is composed of 150 instances of measurement information of irises. There are four attributes for each instance: sepal length, sepal width, petal length, and petal width. These attributes will serve as input to the network. Each of the instances belongs to one of three classes of irises: Iris Setosa (class 0), Iris Versicolour (class 1), or Iris Virginica (class 2). The output of the network will correspond to one of these three class types.

The networks used in this comparison had four input neurons, one corresponding to each attribute. There is a single output neuron. The number of fires of the output neuron in the last 100 times steps of a 500 time step simulation was used to determine class. If the output neuron fired 10 times or less in this time window then the network classified the iris as class 0. If it fired between 10 and 20 times (including 20) then the network classified the iris as class 1. If it fired more than 20 times, then the iris was classified as class 2. The input values were real-valued and not easily translatable to pulse streams, so, as was done in many of the other works using these data set, the values for each attribute were scaled to between 0 and 10 and rounded to the nearest integer. As in the breast cancer and diabetes test cases, if the scaled value is x, then x pulses were applied to the corresponding input neuron, starting at time 0, and spaced five simulated time steps apart. Other encoding schemes can be used.

A population of size 100 was used, with a crossover rate of 0.9 and a mutation rate of 0.99. The evolutionary optimization was allowed to proceed for 100 epochs or until the best fitness was achieved. The fitness function ran all 75 training instances and evaluated how the network performed on those training instances. The fitness value was the fraction correctly classified. A perfect fitness function value corresponds to correctly classifying all instances, which is the second stopping condition of the evolutionary optimization. Using all of the training data may lead to over fitting, but because of the small training size as much information as possible was used during training.

Figure 48:
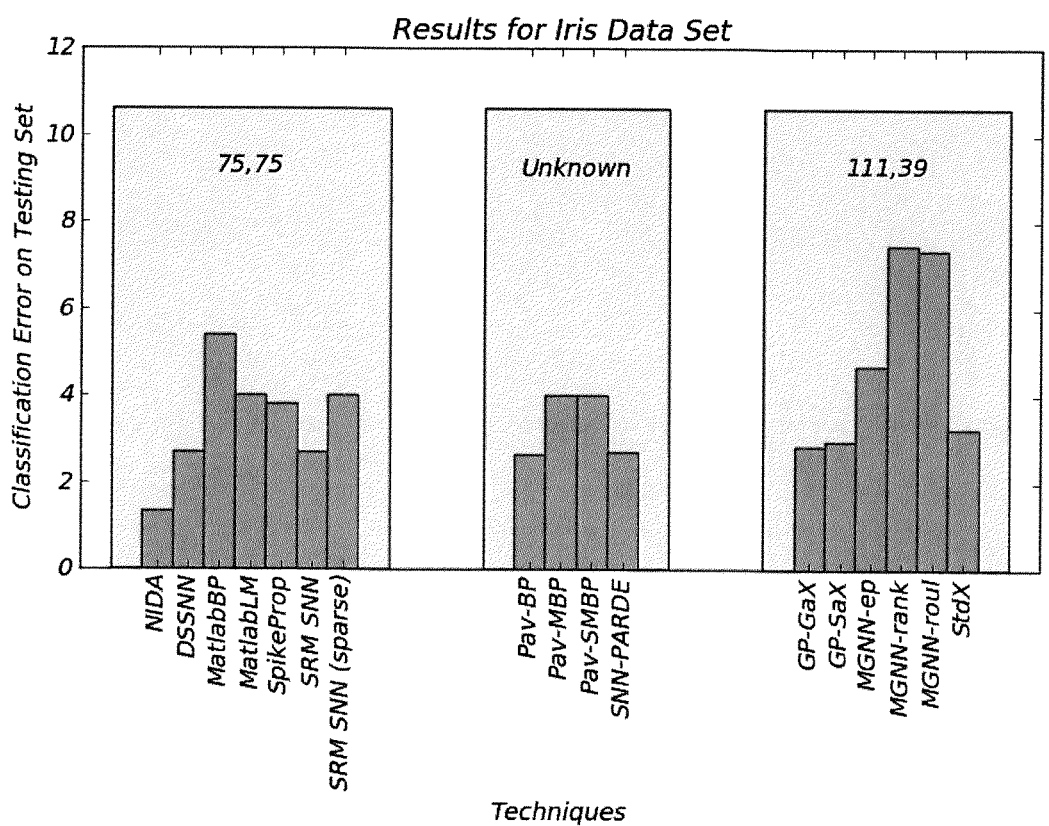
FIG. 48 provides a bar chart of comparative results of the present system as compared with others utilizing the iris data set.

Table 9 and FIG. 48 give the results for the iris classification task. The table lists the results in increasing order by testing error. NIDA achieved the best results for this task, outperforming both GP-GaX and GP-SaX, even though both of those methods used a larger training set. NIDA also outperformed all of the spiking neural network methods. NIDA often achieved perfect classification accuracy for the training set over the course of training, which may be one reason it was able to achieve a higher testing accuracy. Other methods have less restrictive stopping conditions for their training algorithms. This stopping condition is not good to use in general because it may lead to over fitting to the training set. However, NIDA may be less susceptible to that problem than methods using gradient methods for training because of the use of the genetic algorithm.

TABLE 9

| Technique | Number Training Examples | Number Training Examples | Testing Error |
| --- | --- | --- | --- |
| NIDA | 75 | 75 | 1.3333 |
| Pav-BP | | | 2.66 |
| SNN-PARDE | | | 2.7 |
| DSSNN | 75 | 75 | 2.7 |
| SRM SNN | 75 | 75 | 2.7 |
| GP-GaX | 111 | 39 | 2.84 |
| GP-SaX | 111 | 39 | 2.95 |
| GP-StdX | 111 | 39 | 3.24 |
| SpikeProp | 75 | 75 | 3.8 |
| SRM SNN (sparse) | 75 | 75 | 4 |
| MatlabLM | 75 | 75 | 4 |
| Pav-MBP | | | 4 |
| Pav-SMBP | | | 4 |
| MGNN-ep | 111 | 39 | 4.68 |
| MatlabBP | 75 | 75 | 5.4 |
| MGNN-roul | 111 | 39 | 7.35 |
| MGNN-rank | 111 | 39 | 7.46 |

In these three examples (breast cancer, diabetes and iris), we discuss a neuroscience-inspired dynamic architecture (NIDA) and an associated design method based on evolutionary optimization. We present the results of this architecture and design method for a static classification task.

We note that our NIDA networks are not directly suited to static tasks (tasks in which there is no time component). However, many such tasks can be adapted to include a time component, as we did with the "scanning" of the handwritten digit images, thus taking advantage of the dynamic properties of our network. The main advantage of our network architecture and design method is that it can produce networks to solve a wide variety of tasks, including anomaly detection tasks, control tasks, and classification tasks. A primary disadvantage of using evolutionary optimization as the training method is that it can be relatively slow to adapt for some problem types. However, the flexibility that evolutionary optimization provides justifies its use.

Recognizing a Vertical Line in Space or all Hand-Written Digits 0-9

By applying a feature of the present invention described herein as finding a "causality path," a substructure for recognizing the digit 0 may be differentiated from a substructure for recognizing the digit 1. Sub-networks (substructures) of networks may be identified and trained to recognize all the various digits 0-9 in hand-written digital images. In these sub-networks, the neurons and synapses may be sized based on the number of times they appear in a causality path for a firing event, for example, in the last 50 (range of 25 to 100's) of time steps of a simulation which signifies a detection of a particular image. The causality path is the collection of neural pathways from, for example, at least one input neuron to at least one output neuron. In practicality, neural pathways that are not utilized at all will not appear and those that are used the most appear. Taking this process to its conclusion, a large network comprising a plurality of such sub-networks may be used to recognize the range of digits 0-9. Similarly, the same process has been used to hand-tool a network to recognize a vertical line and that sub-network repeated many times to recognize vertical lines in any location in a large grid containing vertical lines.

An example substructure may be hand-designed to recognize a vertical line and may comprise a simple substructure of, for example, three input neurons and one output neuron. A network of substructures may be built from a plurality of these sub-structures so that it will detect a vertical line in any location in a large grid or image comprising one or more vertical lines within the large grid or image. This process may be extended to recognizing horizontal lines and then to recognizing horizontal lines in a grid image containing same. These networks for vertical lines and horizontal lines, in turn, may be combined to recognize horizontal and vertical lines in grid images. Right angles, squares and rectangles, (or lines at another angle between 0 and 180°, by way of example, may each be another project or special purpose network comprising substructures for recognizing components (horizontal or vertical lines) of images. These networks can be combined to recognize multiple features. The networks so generated may be generated from a library of stored substructures preserved in a database.

In exploring useful substructures, the visualization tool thus may trace important events in the network back to the initiating events on input neurons. We refer to these paths as "causality paths." The activity along the path can be animated in the same way as standard network activity in order to trace the precipitating actions from input neuron pulse to the occurrence of the event itself. One experiment with these paths explores the differences in the network activity between input images of the digit d that a network has been trained to recognize and input images of digits other than d. Of particular interest are images of non-d digits that share certain characteristics with d.

Causality paths are helpful in understanding what structure in the network is important in producing the functionality of the network. They are another automated way to track useful substructures that may be exploited during the evolutionary optimization method.

It is important to note that much of the network's behavior is governed by inhibition of activity (that is, keeping neurons from firing rather than causing neurons to fire). This is true in many different task types, but it is especially true in this task example, in which the network must not fire in approximately 90 percent of the input cases (because the network is only recognizing one digit type of 10 possible digit types). This type of activity is much harder to track using conventional analysis methods, but it is clearly vital to understanding how each network operates. A major advantage of our existing visualization tool is that it allows us to observe the propagation of charge along the synapses, which are clearly either excitatory or inhibitory, and to see precisely how different input events affect the behavior of the rest of the network.

Another feature of an embodiment of the present invention is that it allows a rendering of causality paths to trace through the events that led to a particular fire or change in charge event. This is a more complex computational operation, so it may not be a real-time tool to extract substructures for re-use during evolution. However, these causality paths provide a greater understanding to the user of the behavior of the network.

NIDA networks may solve tasks in a variety of domains, including control, anomaly detection, and classification. However, in the development of a new architecture and associated design method, it can be difficult to identify what characteristics of the architecture and the method are important, as well as how to improve the overall performance of the architecture and design method. With this in mind, visual analytics tools have been developed to facilitate the understanding of both the structure of the NIDA networks produced for different tasks and the behavior of these networks on different tasks and for different input types.

Instead of producing a single network to solve the entire handwritten digit classification problem, we produce many networks solving a sub-problem of the classification problem (identifying a particular digit) and combine the results to produce a solution. This approach produces useful networks that could be combined into one larger network to produce the solution, if needed. In particular, the approach produces useful sub-networks to be included in the network that solves the larger problem of taking an image as input and identifying the digit represented in that image. By breaking a problem into smaller sub-problems and solving those, we can then combine the networks into a single larger network and use evolutionary optimization to discover the connections required between the sub-networks. A similar approach can be applied in many anomaly detection and control problems, in which there are sub-problems to be solved. In fact, many problems reuse the same sub-network many times. Furthermore, we suspect that networks that are useful for one problem may also be useful for other problems, as is observed in biology. By building a library of networks that solve sub-problems, we can re-use these networks in special purpose applications and improve learning time by tweaking existing networks instead of generating networks from scratch for each problem.

We present two fitness functions to develop networks that classify handwritten digits. We believe that the second fitness function or similar functions based on entropy are worth pursuing for classification tasks. In particular, the second fitness function may be able to produce networks to be used in a decision tree framework, used in combination with algorithms such as ID3 or CART. Either of these approaches could be just a tree of classifiers that utilize the entropy-based feature extraction maximize information gain.

This architecture is has been adapted for hardware; see the DANNA patent application related by subject matter to the present application filed concurrently herewith and incorporated by reference as to its entire contents. The DANNA hardware implementation enables simulations to take place at a greater speed, which will significantly decrease training time, allowing for better networks to be produced in a shorter amount of time. Moreover, both the present application and the DANNA hardware implementation have an associated visualization special purpose computer and method described in the visualization tool patent application related by subject matter to the present application filed concurrently herewith and incorporated by reference as to its entire contents.

A neuroscience-inspired dynamic architecture (NIDA) and its associated design method based on evolutionary optimization have been introduced and extensions to this architecture explored based on the recognition and reuse of useful substructures and on affective systems in biology. An implementation of NIDA networks suitable for hardware, Dynamic Adaptive Neural Network Arrays (DANNA) is the subject of a related patent application incorporated by reference. We discuss the potential for a real-time learning method for NIDA networks using evolutionary optimization.

Figure 37:
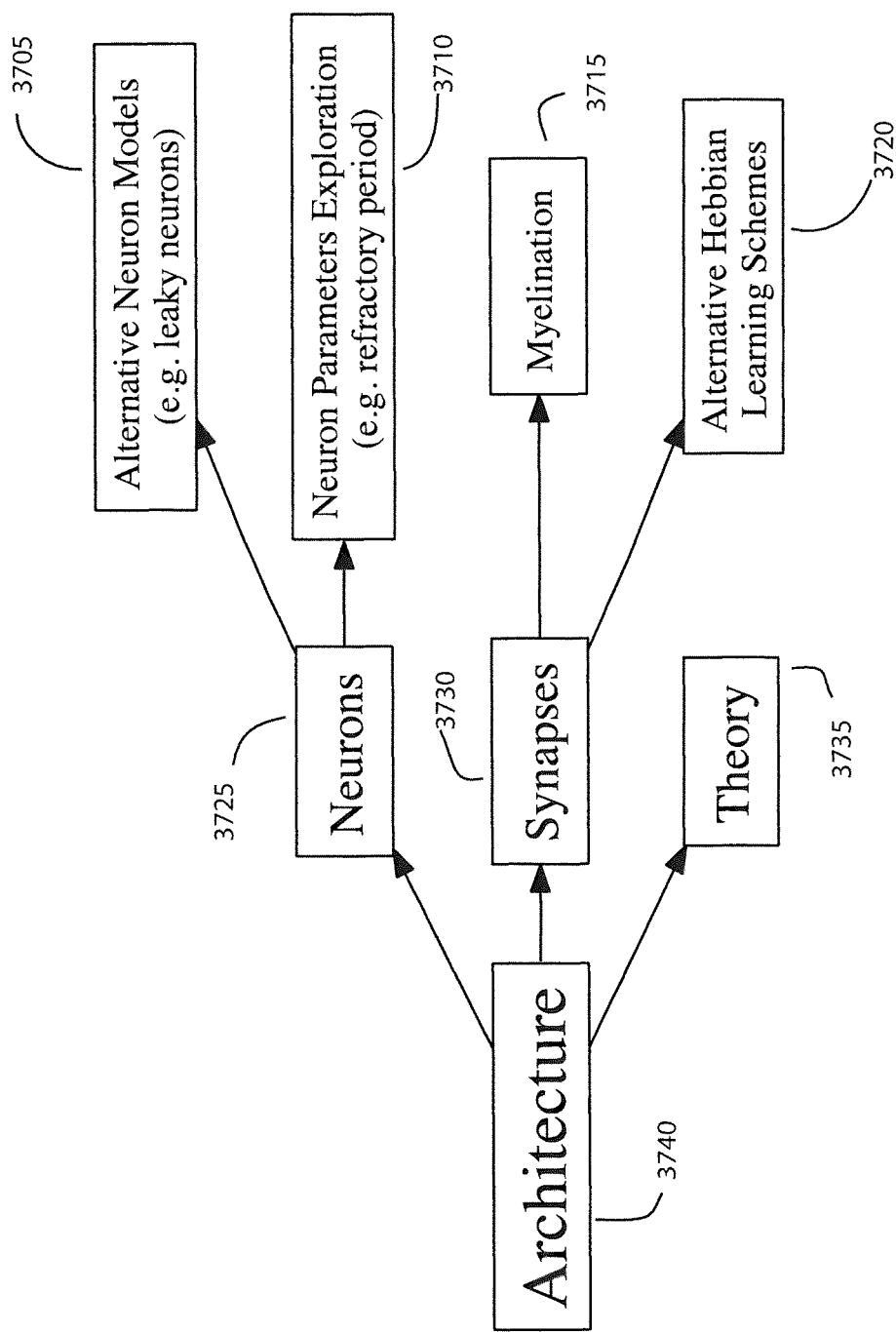
FIG. 37 is an example of expanding a NIDA architecture with work on neurons, synapses and theory.
Figure 38:
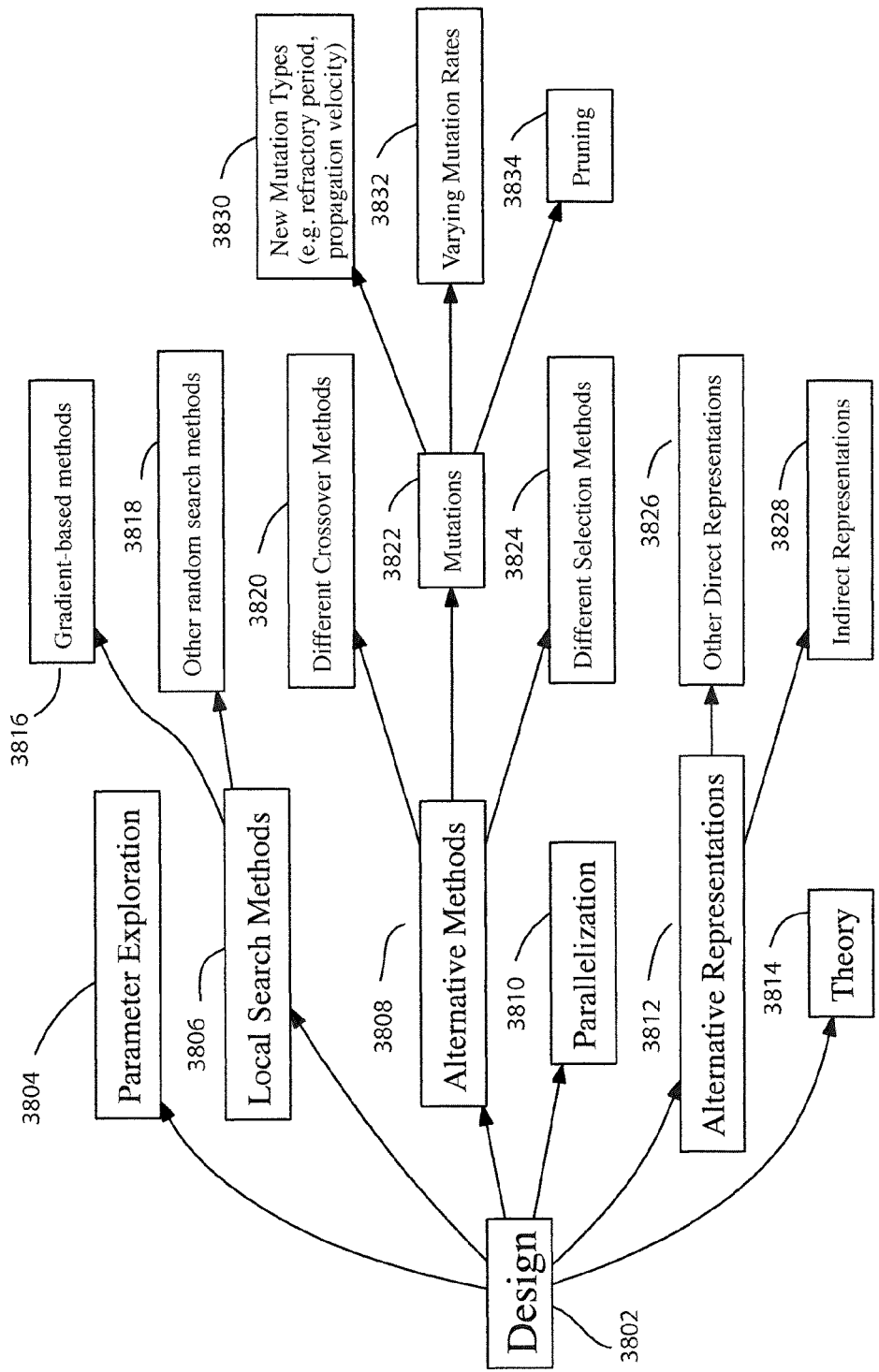
FIG. 38 is an example of expanding NIDA design, exploring parameters, search methods, alternative methods, parallelization, alternative representations and theory.
Figure 39:
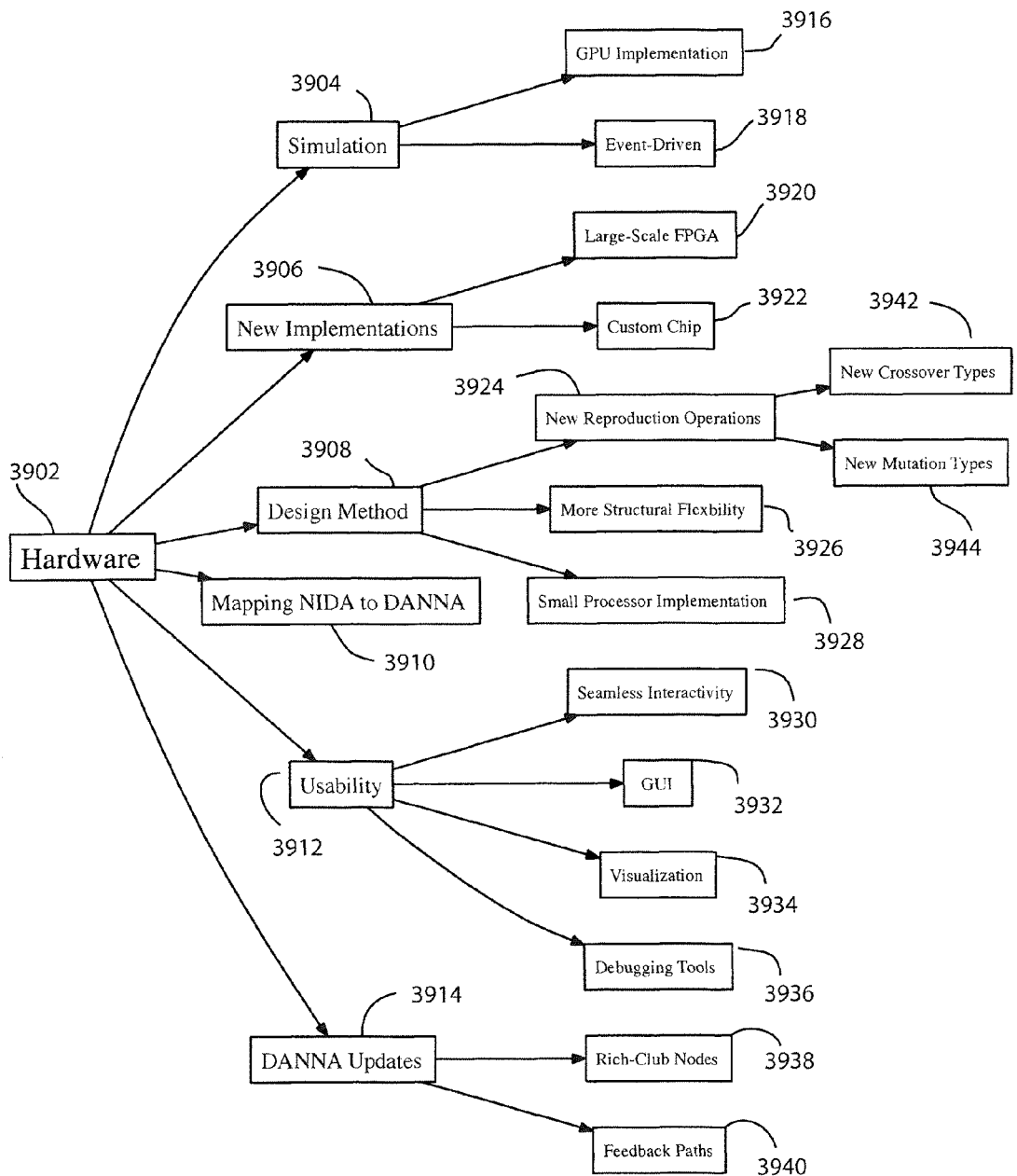
FIG. 39 is an example of expanding DANNA hardware and utilizing DANNA to improve NIDA and vice versa.
Figure 43:
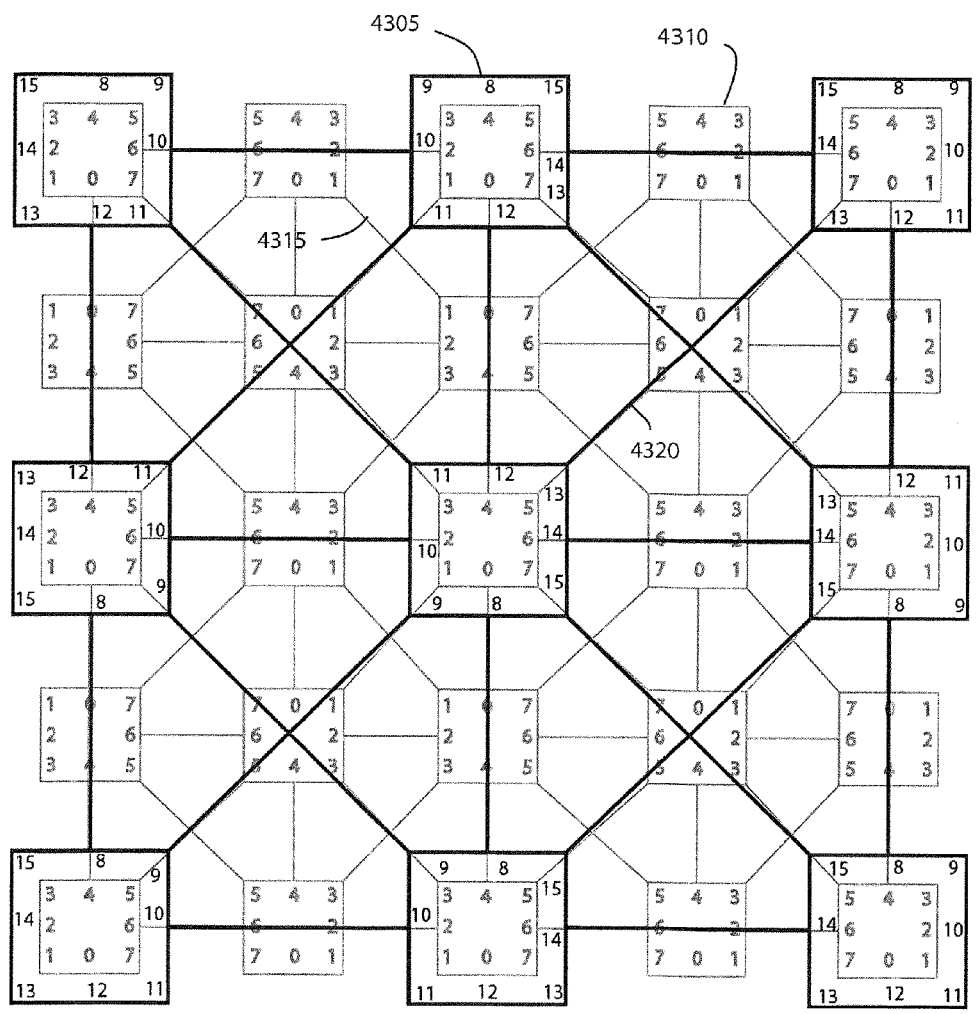
FIG. 43 is an example of interconnections of DANNA array elements to achieve multiple levels of interconnection.

Referring briefly to FIG. 37, there is shown a graphic overview of a neuroscience inspired dynamic architecture 3740 and a design FIG. 38 for expansion into exploring further areas of development. FIGS. 39 and 43 are more directed toward hardware or DANNA.

We will first discuss ways in which the architecture of NIDA networks may be extended (architecture 3740). NIDA networks may be designed to be simple but flexible. NIDA neurons have very few parameters: position, threshold and refractory period. Both the positions of neurons and thresholds of neurons are changeable parameters in many of the tests described in the three related patent applications. However, refractory period changes may be explored. See, for example, architecture FIG. 37 and refractory period study 3710 under Neurons 3725 and Design 3802 of FIG. 38 studying new mutation types 3830. Refractory periods are imposed on the neurons 3325 to maintain an upper limit on the amount of possible activity in the networks. One may explore how altering this refractory period (while maintaining some refractory period in order to bound activity) during training affects performance of the training method. Our neurons (simulated or built as a DANNA element) also maintain accumulated charge over the course of the simulation, either until the neuron fires or the simulation ends. Consequently, one may explore a more biologically realistic neuron in which neurons 3725 slowly return to a neutral state (i.e. "leaky" neurons). The leaky neuron example 3705 is shown in architecture FIG. 37 under alternative neuron models 3705.

Synapses in this design may have delays entirely based on distance between neurons. This may not be biologically realistic, as synapses (or more accurately axons and dendrites, along with synapses) often have myelination, which can speed up the propagation of charge along the synapses. On the other hand, a concept of myelination in the networks may allow for changes in propagation speed in the network. This is shown in FIG. 37 under Mylineation 3715 under Synapses 3730. This may be implemented by imposing another parameter on each synapse, namely, delay. This delay parameter may maintain a relationship with the distance of the synapse, or it may be entirely independent of the distance of the synapse. The delay parameter may also provide another adaptation mechanism. In the original NIDA networks described above, this was not incorporated because we wanted two networks that are similar structurally to have similar behavior. By allowing for arbitrary delays on synapses, this link between structure and functionality may be lost. It may be beneficial to instead include special types of synapses between neurons that are far apart that allow for rapid transfer of information between those neurons. These types of pathways have been observed in the brain. In this method, most synapses in the network may maintain the relationship between delay and distance, but the special types of synapses may allow for additional flexibility. This may be generalized to allow for multiple classes of synapses having different propagation velocities.

One may also explore different implementations of weight-change learning mechanisms, in addition to our simple implementation based on long-term potentiation (LTP) and long-term depression (LTD). For example, we may include more biologically realistic LTP/LTD, or we may explore alternative implementations, such as the spike-time dependent plasticity and other forms of Hebbian learning. Alternative Hebbian learning schemes are shown in FIG. 37 as block 3720 under Synapses 3730 of the architecture 3740.

There are several extensions that may be made to the design method as well. A limited number of mutation operations and crossover types have been explored. There are certainly a wider variety that could be added to extend the functionality of the evolutionary optimization. For example, we have implemented but not explored random crossover, in which each neuron of each of the parent networks is randomly selected to appear in one of the two children networks and synapses are created between neurons as they are created in plane crossover described above. In design FIG. 38, different crossover methods are indicated as block 3720 under alternative methods 3808. An example mutation that could be included is neuron migration. In this mutation, an existing neuron in the network would be moved to a new location but maintain all of its connectivity with other neurons in the network, thus altering the set of delays to and from that neuron. New mutation types are considered in design FIG. 38 as block 3830 along with varying mutation rates 3832 and pruning (for example, dead elements) 3834 under mutations 3822.

A mutation type that may be explored is pruning 3834 of FIG. 38. We implemented structural pruning of the network in which all "dead cells" (hidden neurons without any incoming connections or neurons without any outgoing connections) and their existing connections may be pruned out. Including dead cell pruning as a mutation may be used to limit the complexity of the generated network. However, it may also hinder the development of more complex structures that may be required for some problems.

We may also implement pruning based on activity in the network by pruning out neurons and synapses that are not very active or inactive over the course of simulation (potentially a much more drastic pruning than simple structural pruning). As discussed above simpler structures may generalize better than more complex structures, so pruning (either over the course of simulation or after training takes place) may improve performance of the network.

A simple version of tournament selection has been described as the selection method for evolutionary optimization because of its flexibility and ease of implementation. Other possible selection methods that may be used include and are not limited to fitness proportion, rank, kernel, and roulette wheel selection (Koza (1992)). Any of these selection methods as well as other known selection methods may significantly change the performance of the evolutionary optimization method as per design FIG. 38, Different Selection Methods 3824.

There are many ways in which we may exploit the inherent parallelism of the evolutionary optimization in order to improve performance. Parallel genetic algorithms have also been widely studied, so there are a variety of approaches that may be suitable for this implementation as well as that described in Tomassini (2005). For example, maintaining mini-populations but passing along the best networks from each population to other mini-populations (or allowing for "drift" between mini-populations) is another example parallel implementation for evolutionary optimization that may be worth exploring (Parallelization 3810) under Design 3802 in design FIG. 38).

There may be a faster training mechanism for NIDA networks (analogous to back-propagation or based on steepest-descent approaches) that could be used to refine the parameters of a network once a good structure is discovered. Many approaches discussed herein use a hybrid learning approach, where structural learning occurs at a slower rate than weight training. A tiered training system may use simulated annealing as a training mechanism, but there may be a better, non-random optimization method to use for these networks in order to improve convergence rates. See, for example, design FIG. 38, Local Search Methods 3806, Gradient-based methods 3816 and Other Random Search Methods 3818.

A direct representation 3826 of the network may implement evolutionary optimization. There are many ways that a NIDA network may be represented directly (e.g. as a vector of real-values) or indirectly (e.g. as a genome that "unfolds" into a network). It may be prudent to explore alternative representations of the network and how these different representations alter the performance of the training method. For example NEAT (Stanley and Miikkulainen (2002); Stanley et al. (2003)), HyperNEAT Stanley et al. (2009) and other methods discussed above use indirect representations of network structures. These network structures were not spiking neural networks, which have different characteristics than traditional neural network structures, and though HyperNEAT included a notion of geometry, it placed neurons in the space based on functions. Both of these characteristics of NIDA networks (dynamics and geometric space) would have to be accommodated when developing an indirect representation 3828.

Fixed crossover rates and mutation rates are used in training methods discussed above. It would be worthwhile to explore parameter values (and variability) for these rates and other parameters in the evolutionary optimization 3804. It may also be prudent to change mutation and crossover rates 3832 (FIG. 38) based on various metrics over the course of training. For example, we may selectively mutate neurons and synapses based on how active (or inactive) they are in simulation, or we may want to make crossover and mutations less likely as performance improves.

Figure 40:
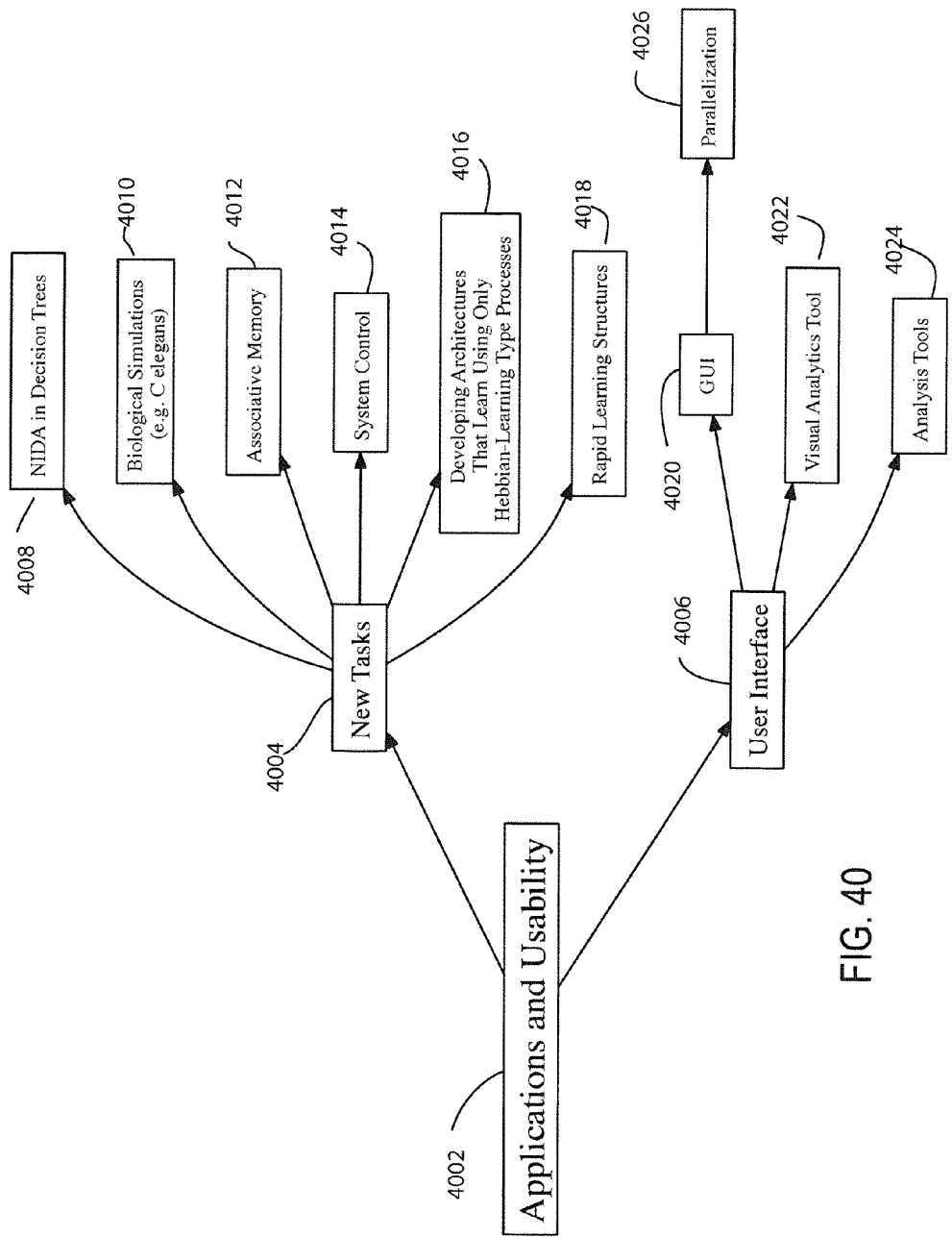
FIG. 40 is an example of expanding applications and usability by taking on new tasks (applications) and improving the user interface.

Referring to FIG. 40, there are many research directions for NIDA networks in terms of both applications and usability 4002 that are being studied. A small selection of tasks 4004 have been exemplified above: classification, control, and anomaly detection. There are many other tasks to which NIDA and DANNA networks may be applicable, including audio processing, signal processing, biological simulations (FIG. 40, 4010) (such as a *C. elegans* simulation Palyanov et al. (2014)), synchronization of processes, system control (FIG. 40, 4014), and many more. We have only scratched the surface of possible applications of NIDA and DANNA. One of the tasks worth exploring is using a NIDA network to realize an associative memory (FIG. 40, 4012). In this task, a set of patterns is presented to the network, and the network may be trained to recognize similar patterns or to produce whole patterns from partial patterns.

A fitness function based on entropy proposed above may be used to extract features of a problem space. Using a similar fitness function one may build nodes in a decision tree. That is, this fitness function may be used to split a set of inputs into two (or more) groups and to train NIDA networks on each new group as needed, until each group consists of only one classification type. NIDA in decision trees is shown as element 4008 under new tasks 4004 in an expansion of applications and usability 4402. It is shown expanded in FIG. 42.

Figure 42:
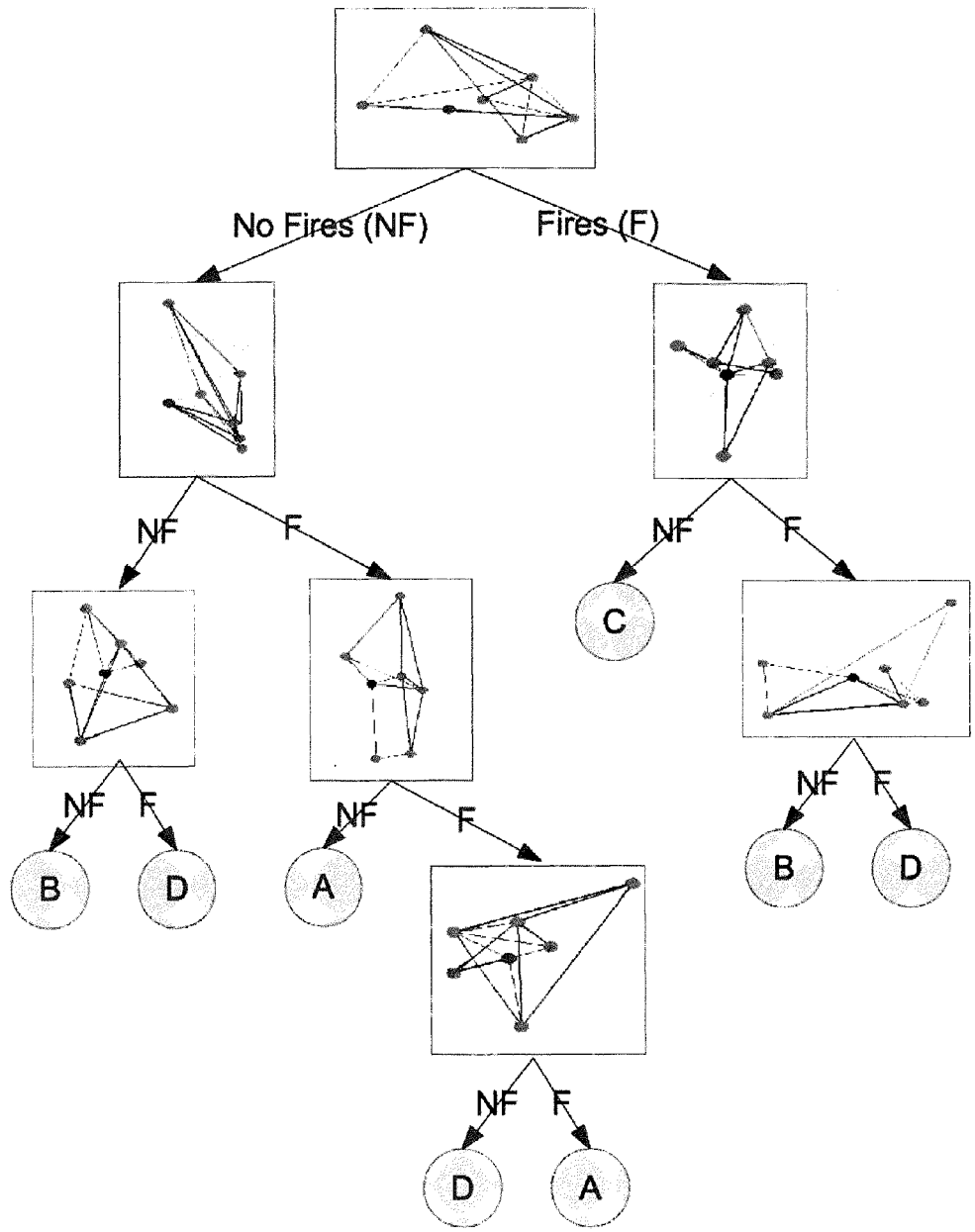
FIG. 42 is an example of using one or more networks in a decision tree to select one or more outcomes A, B, C and D.

Referring to FIG. 42, the decision tree application is explored wherein a form of decision tree is shown with F representing "fires" and NF representing "no fires" in exemplary network paths. Starting at a root node at the top of the diagram, one may see that a NIDA or DANNA may result in reaching points A, B, C and D via a decision tree. So NIDA's or DANNA's may be used to make decisions at each node of a decision tree. For example, a decision may be based on whether an output neuron of the network fires in a particular time window. Based on the decision, a new network can be simulated on the input to further classify it.

One major question regarding biological neural systems is how they are able to learn so quickly. In FIG. 40, this concept is shown under developing architectures that learn using only Hebbian learning 4016. One reason they may be able to learn so quickly is that structures were evolved in the brain that are able to learn or adapt quickly to new tasks through Hebbian learning-type mechanisms. One possible task for the present networks may be to develop network structures that can learn quickly using on-line learning mechanisms such as Hebbian learning or spike-time dependent plasticity in order to learn to do a set of tasks. See rapid learning structures 4018 in FIG. 40. That is, the goal would not be to develop one network to solve one task, but to develop a network structure with weights that can be adjusted using one of these rapid learning mechanisms to solve one of a set of tasks.

While significant theory has been developed above on spiking neural networks and their properties, one may further develop further theory 3735, architecture FIG. 37, and 3814, under design 3802 in FIG. 38, which theory might be later exploited to improve the architecture and/or the design method. There is significant potential for developing a user-friendly environment with which to design tasks for NIDA networks to solve, run existing NIDA networks on tasks and varying inputs, and explore the activity of NIDA networks. A visual analytics tool has been developed in accordance with our related visualization tool patent application. This tool includes the ability to visualize activity in a network, as well as to find and trace causality paths (FIG. 41, 4136) in the network.

Figure 44:
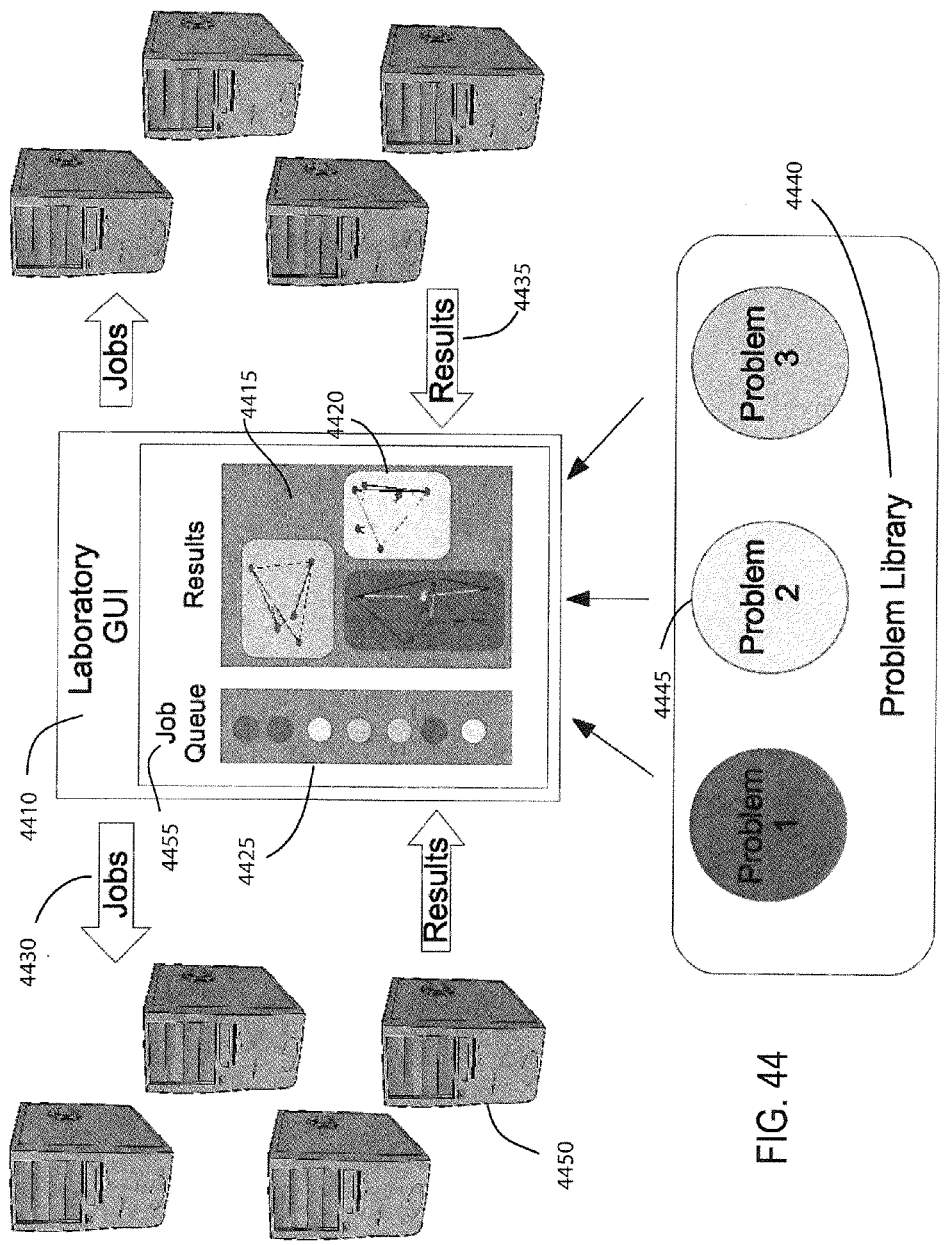
FIG. 44 shows an example of forming a problem library or database and utilizing a central graphical user interface to select a special purpose processor for handling a particular problem, for example, from the problem library, and receiving results in the form of display, network decision, network performance or error rate, print-out or real world actualization of results.

A tool (for example, a graphical user interface 4006, 4020 of FIG. 40) or laboratory GUI 4410 of FIG. 44) in which a user can select from various problems or applications (e.g. the benchmark problems of control, anomaly detection and classification), create jobs associated with those problems to be run on whatever resources are available (for example, within a cluster), and view the results of those job runs via visualization or visual analytics tools 4022. Examples of jobs may be instances of the evolutionary optimization on that task, or they may be analysis jobs 4024 associated with that task, such as structural or activity analysis to extract a useful substructure. Examples of resources include special purpose processors and networks (NIDA's and DANNA's) for specific applications and problems.

Referring to FIG. 44, there is shown an exemplary laboratory graphical user interface (4410) having a job queue 4455, holding submitted jobs 4425, results 4415 and networks 4420. A plurality of special purpose processors 4450 may receive jobs 4430 via GUI 4410 or a plurality of different jobs may be sent to a second set of special purpose processors outputting results 4435. Also shown may be a problem library 4440 of different problems or applications which may provide input to the laboratory GUI 4410. An example problem may be problem 4445 which, for example, may be a classification problem. GUI 4410 may be useful so a user may select from various problems/tasks and so create and distribute jobs/tasks to available resources which may be nodes in a cluster, gather results from these depending on application, display or affect results in a meaningful manner and so on. A visual analytics tool may be utilized as a way to analyze networks 4420 and/or display results meaningfully.

There are multiple mechanisms for identifying useful substructures, such as common substructures, activity-based substructures and causality paths 4136. We have also created networks for simpler tasks that can be combined and used in a more complicated task. Finally, we have extracted activity-based substructures from networks during training and incorporated those structures into the networks, with middling results. We have only explored including activity-based structures over the course of training. It may be beneficial to extract and include causality-based structures over the course of training as well.

There are potentially many more "useful substructure" types that exist in these networks. For example, graph analysis tools may be used to identify important structures in a network. Also, one may develop a canonical network representation that abstracts out position of nodes in the network while maintaining labels as to which neurons correspond to which input and output information in order to compare structure of the network. For example, referring to FIG. 41, there are shown useful substructures 4102 which may be identified at 4104, their structures may be analyzed at 4114 and canonical representations result at 4138.

One possible way to compare networks is to look at their activity (rather than their structure). See FIG. 41, activity analysis 4112. For example, a similarity metric may be developed in which networks that perform similarly (or produce the same result, if not the same firing patterns) for a set of input values are defined as similar. It may be difficult to compare firing patterns directly between networks because two sets of firing patterns may produce the exact same behavior, depending on delays in the network. Alternatively, one may develop a graph of activity in the network and use that graph to compare activity across networks (see, for example, graph-based methods 4132 of FIG. 41). However, this may have the same pitfall as comparing networks directly, in that graph analysis quickly becomes intractable as many graph analysis techniques are NP-complete or NP-hard problems. One may also examine activity using visualization tools 4134.

Once a set of tools is established to extract sub-networks from network structures, we may maintain an external library 4108 of useful substructures. Currently, a library is maintained over the course of a single learning instance, thus it is "internal" to a particular task and particular learning instance. It may also be useful to maintain a library external to a task and an instance. For example, under useful substructures 4102 in FIG. 41, maintaining an external library 4108 may lead to a database 4122, small network representation 4124 and local or global fitness scores 4124. That is, the external library may include substructures from not only many instances of a single task (e.g. many different pole balancing networks) but many tasks as well (e.g. sub-networks from anomaly detection and handwritten digit recognition). Substructures in the brain are often useful for more than one task. Our substructures may also be useful for more than one task; thus, we may maintain useful substructures to be included over the course of an evolutionary optimization 4106.

Such an external library may be maintained within a database system 4122, in which information about the structure of that sub-network may be stored. We may also track further information about each structure in the network, such as an overall score for how that network performs within various tasks or specific scores for each task (for example, a specific score for how helpful that sub-network was for the task solved by the network from which it was extracted). These local or global fitness scores 4126 may be used to decide which substructures should be selected for inclusion during learning for another task.

Structures may be analyzed over the course of learning in a separate thread or process from the optimization algorithm. For example, we may want to analyze activity of the best network in the population. It would be useful to develop a parallel version of the optimization algorithm that performs this analysis separately from the optimization, so that the optimization is not slowed (see parallelization 4120 under inclusion in G(enetic) A(lgorithm) 4106 in FIG. 41 and 4026 in FIG. 40). Using this method, more complex analyses can be performed and utilized to improve the training or learning rates, without incurring as much of a penalty in training time.

A structure may be built using evolutionary optimization 4130 or hand-tooled 4128 to solve a small problem and one may repeat that structure to tackle a larger problem. It may also be useful to design an existing structure for one problem and tweak that structure or weights in that structure for a similar, though slightly different problem. For example, one task might be recognizing piano notes. The structure to recognize one note (e.g. F) may be very similar to the structure required to recognize another note (e.g. F#), but the distances or delays may need to be scaled. This general idea has wider applications as well, such as frequency recognition, edge detection, and character recognition.

Figure 41:
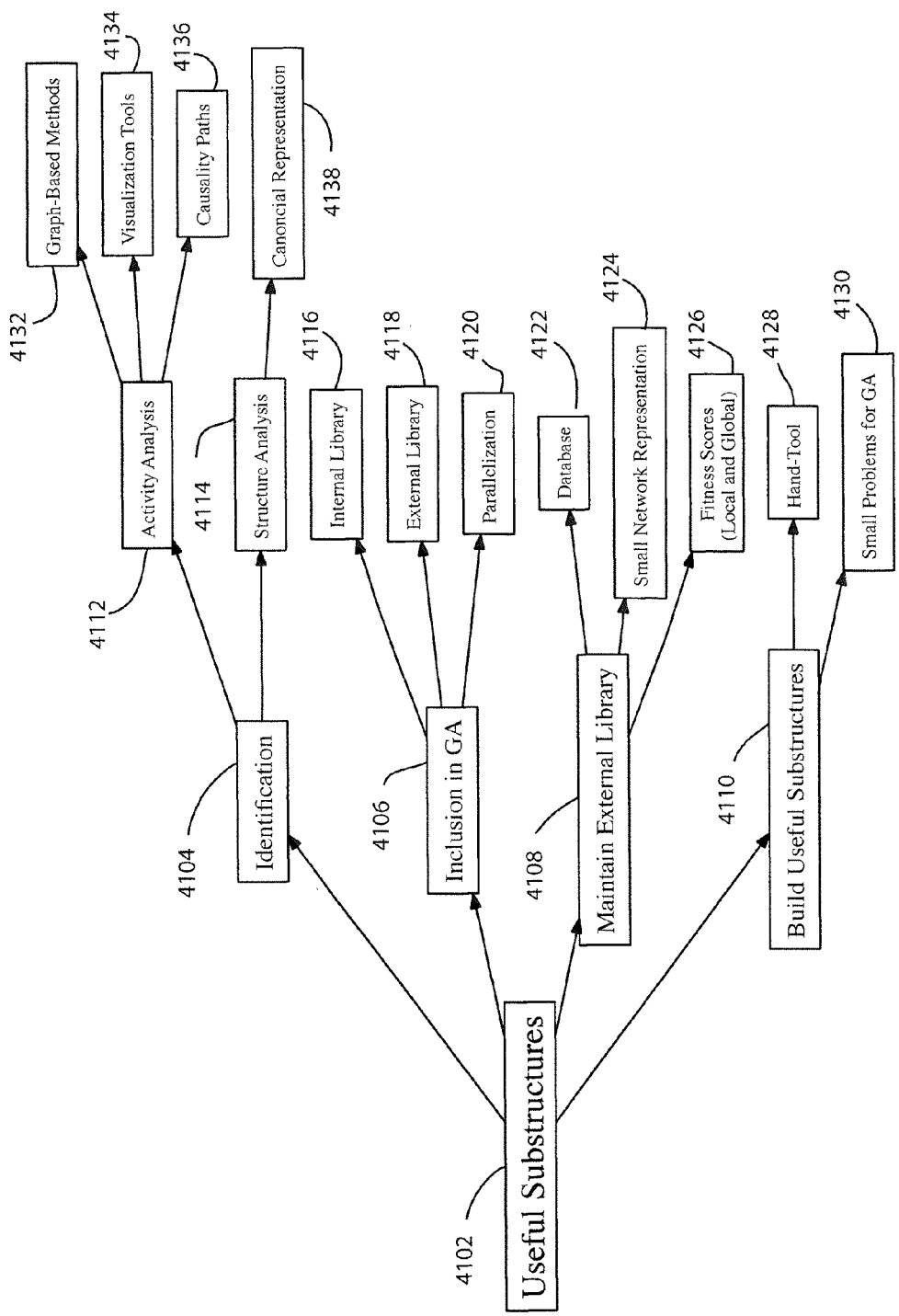
FIG. 41 is an example of expanding useful substructures of developed networks for certain applications.

Development of a library of components may be explored of components analogous to components needed in signal processing, communication systems or controls (see internal library 4116 or external library 4118 of FIG. 41). Examples include libraries of oscillators, band pass and band stop filters, feedback regulators, and pattern generators. Such a library may be utilized to select possibly useful sub-networks as discusses above using evolutionary optimization. One could use the library to handcraft solutions to particular applications. See building useful substructures 4110 in FIG. 41.

Figure 36:
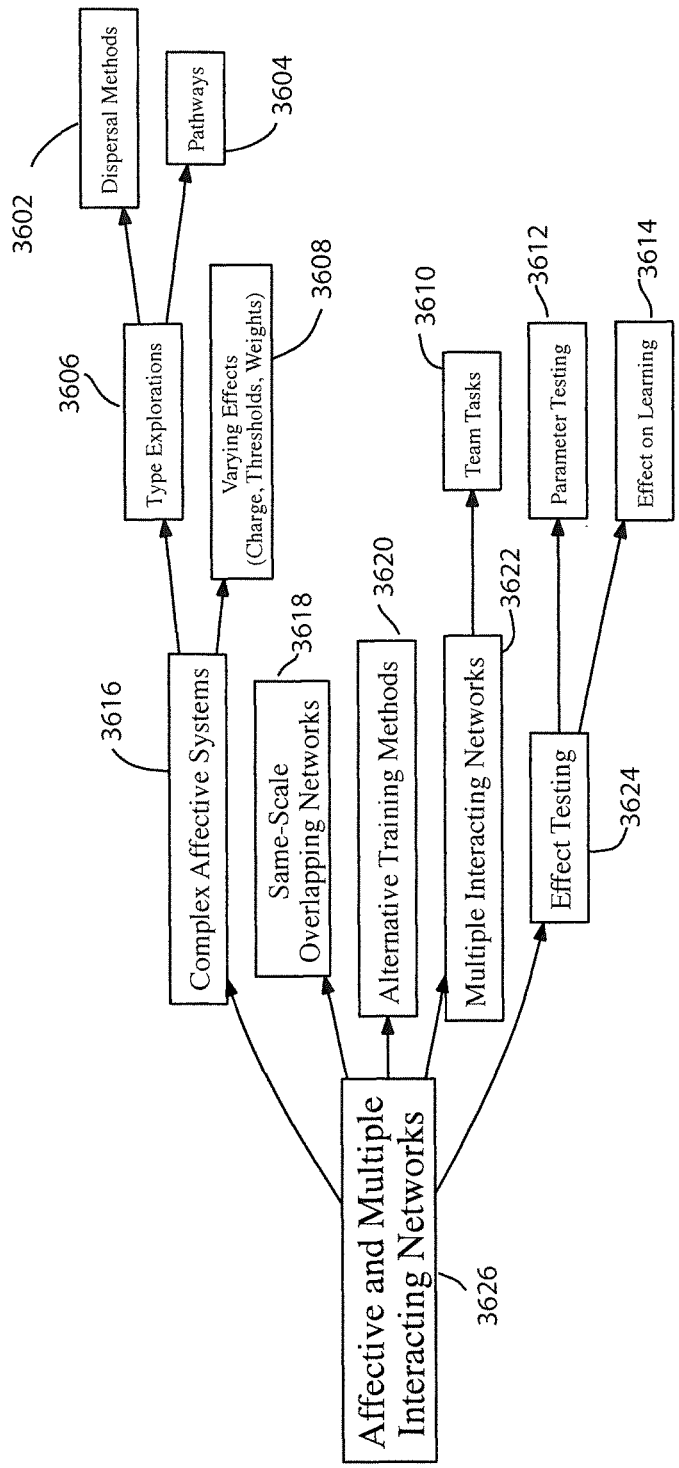
FIG. 36 is an example of expanding NIDA concepts of affective and multiple interacting networks.

FIG. 36 shows implementations of affective and multiple interacting networks 3626. There are multiple complex affective system types 3616, 3608. Sub-networks in computational networks may implement a "dispersal" mechanism that may cause a change in charge or thresholds on nearby neurons or a change in weight values on nearby synapses so that they change instantaneously with the firing of the output neurons within the sub-network 3608. More complicated dispersal 3602 (FIG. 36) may be implemented in which the changes in charge, threshold or weight value are scheduled events in the event simulation and occur at some point in the future after the output neuron has fired (perhaps relative to the distance from the sub-network). Taking a cue from biological systems, this mechanism can also modify localized energy available to neurons, modulating or suppressing the firing rates of neurons in a localized neighborhood of the network. Neural pathways 3604 may affect changes in charge, thresholds, or synapse weights from neurons within affective networks to neurons in computational networks.

An alternative multi-network description may be defined so that multiple network structures that are represented in the same space overlap and interact but are evolved separately. This is similar to the notion of subsystems in the network, but instead of the sub-networks occupying a smaller space than the original network, all of the networks would exist on the same scale 3618 (FIG. 36), but each network would have a different goal which may conflict with the goals of other networks.

There are many multi-objective optimization algorithms that may be explored for this task. However, in contrast to these methods, simultaneously evolving multiple may have interacting networks, each of which has its own objective and for which there may be an overall objective of the system of networks. Moreover, one may optimize over the connections between these networks. In many examples in which these would be useful, these networks may not operate in isolation; that is, they exist as part of a system or team of networks in order to be evaluated. For example, consider an exploration/foraging task in which the agent must explore an environment to find food but to also avoid predators. In this example, the agent may comprise a computational network that receives sensory information and outputs an action for the agent, as well as sub-networks (affective substructures) that are trained to be "seeking" and "fear" networks, which encourage exploration for food and avoidance of predators, respectively. A "seeking" sub-network may not be evaluated alone on its task; it may be embedded or implanted in an agent to be evaluated. That is, one may not simulate the seeking network and assign it a score; one may see how the seeking network influences the larger network to behave in the environment and assign it a score based on the agent's behavior. Optimization algorithms may be developed that work in this realm of alternative training methods 3620 (FIG. 36).

The inclusion of affective systems within a computational network may naturally be extended to a team of interacting networks being trained to work together on a task, but in which different team members have different objectives. In this case of developing more complex affective systems 3616, there may not be direct connections (synapses) between sub-networks, but it may be that these networks can be simulated simultaneously so that they may communicate in some other way. For example, suppose we want to evolve a team of simulated ant-like agents, in which the role of some agents is to explore new environments and find food (type A agents), while the role of other agents (type B) is to discover when a type A agent has found food and to collect food from that food source until it is exhausted. In this situation, it would be possible to evolve type A agents without the type B agents, but it might not be possible to evolve type B agents without existing type A agents because type B agents rely on communications from type A agents. One may simulate how a type A agent will behave when training type B agents, but there is no guarantee that the evolved type A agents will behave in this way. By evolving two sets of agents simultaneously, one can evolve agents that learn to work together. One may also simultaneously evolve a team of agents in which each agent is composed of multiple interacting networks 3622, where the agents may all have the same (or different) goals (for example, team tasks 3610 for same goals) and where the sub-networks per agent may each have their own goal.

The effects (effect testing 3624) of simple affective systems and complex affective systems may be explored on the dynamics and behavior of the network and effect on learning 3614. For example, one may examine how the complex affective systems affect LTP and LTD and how those parameters interact by parameter testing 3612. Studying the general properties of these affective systems is worthwhile, so that one may better understand their utility in the scope of NIDA and DANNA networks.

We include affective networks in ANNs because they are an important part of biological neural systems that are, for the most part, not considered in artificial neural network systems. One potential role of affective systems is for modulation of behavior of a network based on sensory information (as also noted by Krichmar in Krichmar (2008)). By evolving affective systems alongside network structures, a possibly different set of potentially important input information may be processed in an alternate framework (using different objectives) and affective the behavior of an agent. Again, consider an agent in an environment seeking food and avoiding predators. By including notions of affective systems, a fear sub-network may be trained to modulate behavior only when a predator is near, while a seeking sub-network may be trained to modulate behavior only when the agent is "hungry." These affective controls allow for an on-line mechanism to change behavior based on environmental cues that may not be directly related to the task.

Referring to hardware FIG. 39 (Hardware 3902), a DANNA or related hardware array may utilize an updated simulation 3904 that may use graphics processing units (GPUs) 3916 to significantly speed up performance. This type of simulation is suited to GPUs 3916 because of its synchronous nature and the division of computation into elements within a grid that only communicate with their neighbors (or with elements relatively near to them). A GPU implementation 3916 would allow many (if not all) elements to be updated in parallel, avoiding serial updates of elements. One may also simulate the network directly on implementations 3906 on an FPGA 3920 or custom chip 3922 or other known implementation. The DANNA simulation may also be significantly improved by developing an event-driven version, rather than a clocked version. An improved version may be made similar to NIDA simulation, which is event-driven. In this simulation, events may be scheduled in an event queue and the state of the system may be updated only when an event occurs. It may also be possible to restrict state updates to a subset of the array at each event, rather than the entire array, improving performance of the simulation. Many of the hardware implementations discussed in the corresponding DANNA applications have developed event-driven (or partially event-driven) simulations 3918 because of the slow nature of clock-driven simulations.

By replacing the simulation code with a new, faster simulation, whether it is the GPU or event-driven simulation or running directly on the hardware, the performance of the design method will improve. As discussed above with respect to the evolutionary optimization for NIDA networks, there are many facets of evolutionary optimization for the hardware platform, such as selection methods, alternative reproduction operators 3914. These may lead to new crossover types 3942 or mutation types 3944, and parallelization methods.

For the 16-connection (input) element shown here as FIG. 43 with its interconnected circuit elements) (shown also in detail in the DANNA patent application), more structural alterations may be included, as the 16-connection neuron or synapse element allows for more complex structures without fear of blocking. One may also implement pathways 3604 that affect changes in charge, thresholds, or synapse weights from neurons within affective networks to neurons in computational networks. The 16-connection element scheme can be extended arbitrarily to allow for more and more distant connectivity among elements, though there is a penalty incurred for additional complexity within each element. Since the ability to include major structural flexibility is one of the notable features of our NIDA networks, we want to allow for as much structural flexibility 3926 within our hardware networks as well, while maintaining a reasonable sized element.

The design method 3908 may be implemented on a small processor 3928 (such as an ARM processor) that does all simulations on hardware (networks on an FPGA or on a custom chip). The design method 3908 requires the storage of a population of networks (both parents and children), as well as scores for those networks. The design method may use a very simple algorithm to select parents to produce children and to create children using simple reproduction methods, all of which may be implemented on the ARM processor. Depending on the size of the networks and the hardware (GPU, FPGA, or ASIC/custom VLSI), it may be possible to simulate multiple networks at once on the hardware, allowing for parallelization of the design method. An issue with implementing the design method on an ARM or other small processor is the implementation of task-specific fitness functions. Some fitness functions may require off-chip interactions (for example, interacting with a real cart and pole for the pole balancing problem) or may require large scale simulations or large amounts of input/output information (such as in the handwritten digit problem). One approach is to use additional hardware components, or a combination of hardware and software, to implement either a simulation/emulation of a system or process interfaced to the network, or to provide such an interface 3922 to a physical system or external process. This issue may be addressed when implementing the design method 3908 on alternative processors, whether small or not, to gain increased learning/adaptation performance.

In addition to developing a design method specifically for DANNAs, it may be useful to develop a mapping mechanism 3910 that converts NIDA networks directly into DANNA networks and to use the DANNA design method to refine parameter values to produce desired operations. Direct mappings have been attempted by hand for small networks (e.g. 5-10 neurons and 10-30 synapses), but this mapping process of 3910 is more complicated than may be done by hand for larger networks. It may be possible to adapt existing mapping software (e.g. circuit board layout software) to perform the mappings 3910 between NIDA and DANNA. Otherwise, a stochastic optimization approach, such as a genetic/evolutionary method or simulated annealing can be utilized. This problem is similar to circuit and component layout problems in electronics and digital system (e.g., VLSI) design.

The VHDL code for an array element provided in the corresponding DANNA patent application may be designed and implemented on an FPGA. Arrays of 16 by 16 elements and 50 by 50 elements have been constructed and tested on the FPGA. Larger arrays on FPGAs may be tested, while simultaneously developing a VLSI implementation that can be used to create a custom chip for DANNA arrays.

There are also updates to the DANNA architecture 3914 that may be implemented. One may include "rich-club" nodes 3938 or hub neurons in arrays, which are neurons that are highly connected locally and have long-range connections to other rich-club or hub neurons in the network. Rich-club neurons have been observed in biological neural networks (Harriger et al. (2012)). In our networks, these would be developed as elements 3938 that have long-range connections to other elements in the network (rather than just near-neighbor or local connectivity). There is also biological evidence that there is significant feedback to sensory neurons, or other neurons near input processes, from the equivalent of "hidden neurons" in the brain (Alitto and Usrey (2003)). We may include pathways from many elements (if not all elements) in the grid to the input neurons to mimic these feedback patterns 3940. In all cases, the evolutionary optimization method may be adapted to utilize the features and restrictions of a particular hardware or combination hardware/software implementation of an array.

As in the software implementation, there is significant room to develop a user-friendly development and testing environment for a DANNA to increase usability 3912 of the system. Ideally, this environment would be implemented as a GUI that provides the user with easy interface to both hardware and software simulations of the network, analysis and visualization tools 3934, and debugging tools 3936. A goal is to develop an environment that allows users to load a network (either to simulation using software, hardware or a combination of both, to an FPGA, or to a custom chip), and allows the user to provide some form of input to that network (e.g. input from a camera, audio device, or other type of sensor), and to output information in a form that the user selects for some type of output device (e.g. motors or actuators in a robot). This interface between the GUI 3932 and some form of the network should be abstracted so that it is capable of connecting to a software simulation (which may be done on a GPU), to an FPGA or to a custom chip, and able to run seamlessly (have seamless interactivity 3930), treating each of these as if they are identical except for differences in size and features as discussed above.

Software may be developed to simultaneously produce output for a real-time system, while also continuing to learn. For this type of system, we may allow an initial oil-line learning process until a pre-defined performance threshold is reached. Then, learning may be converted to on-line, so that the system is producing usable output, while adapting to changes in its environment. This is a biological model, in that humans are continually learning and improving beginning as infants, and accomplish tasks on a day-to-day basis beginning in childhood and continuing throughout their lives.

Figure 45:
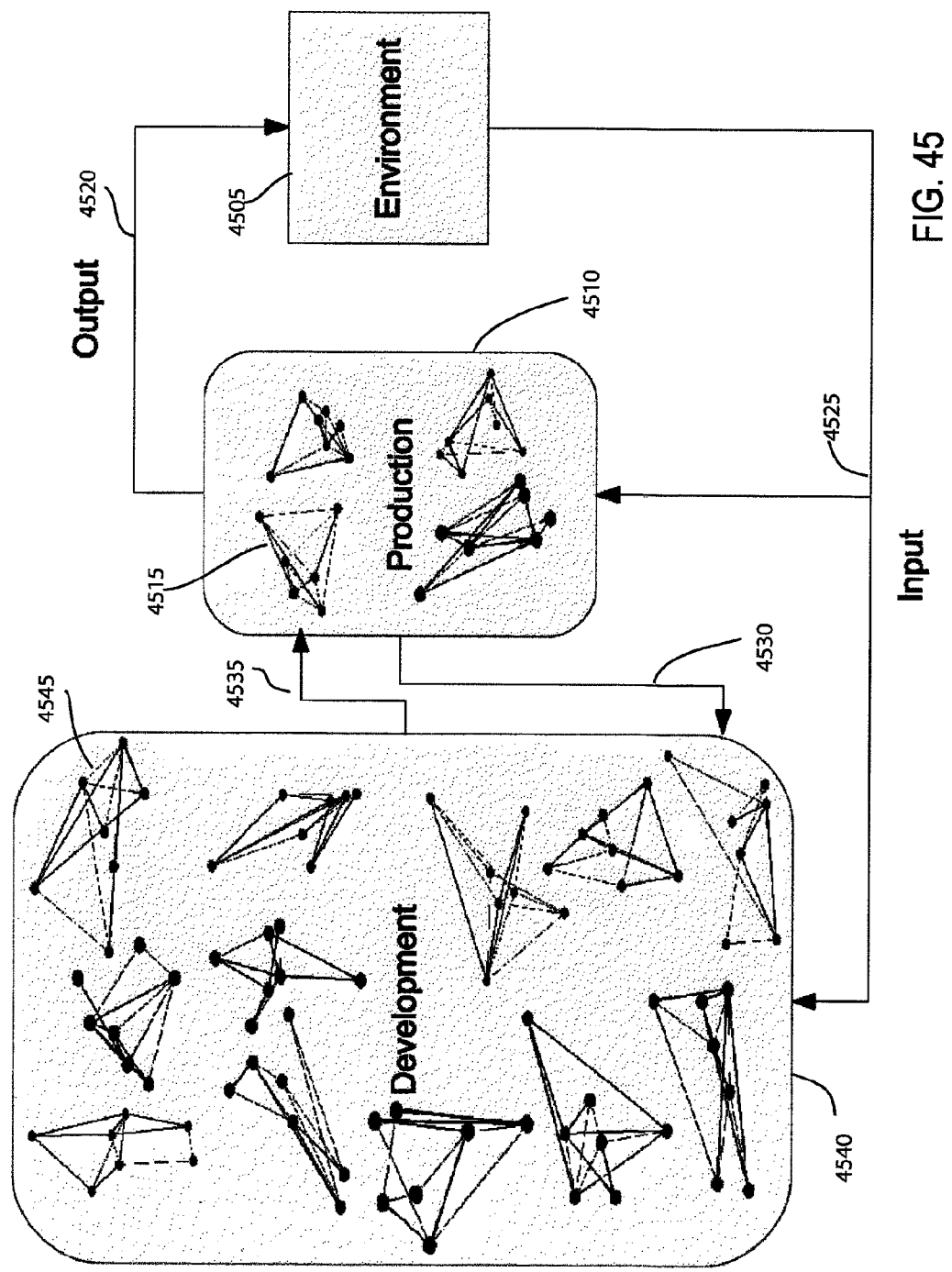
FIG. 45 is a general network diagram showing the relationship among development networks, production networks, and environment (where one or more NIDA or DANNA or substructure may affect a real world solution) and input and output among development, production and the environment.

Referring to FIG. 45, one approach is to split an evolutionary algorithm population pool into two teams: a production team 4510 and a development team 4540. The production team 4510, for example, may be made up of networks 4515 that perform well in the population. Inputs 4525 are provided by the environment 4505 to production team 4510 and to development team 4540. The output 4520 of the system will be an aggregate, selection, or weighted combination of the outputs of the networks in the production team 4510. The development team 4540 will be lower performing networks that are maintained as part of the population for diversity. The entire population will be iterated over, except the production team 4510 will stay mostly in place (with fewer changes to the members), while the development team will change much more rapidly. Members 4545 will be promoted to the production team 4510 from the development team 4540 via 4435 depending on their performance. Similarly, members 4515 of the production team 4510 may be demoted 4530 to the development team 4540 or die off from the population entirely depending on their performance.

The intent of this type of organization is that the production networks keep the overall system working regardless of the learning that is happening in the development networks. With this system, safeguards would be required to keep the production team's performance above a certain threshold. However, this threshold may not be explicitly given. For this type of system, an approximate value function, such as that used in reinforcement learning and approximate dynamic programming, may be useful.

Using this system, the overall performance of the algorithm should continue to improve. Also, using this method, the system should be adaptable to changes in the task at hand, if the task is changing over time. There are several issues associated with this approach that must be addressed in the design of an appropriate artificial neural network. One issue is how to score the networks that are part of the development population. The output of these networks is never reaching the environment and thus they have no effect on the performance of the task. Similarly, it may be difficult to score individual production-level networks as well, if there are many production networks and the result presented to the environment is some aggregate of the output calculated by the networks. Guidance on methods for doing this is available in the dynamical systems and control systems literature, as follows.

One approach is to maintain a model of the environment that is being updated based on the environment's behavior and to use the model of the environment to calculate the scores of the networks. For example, an error between the model's prediction of a system's behavior and the system's observed behavior can be used both to control, or improve, the system's behavior in a desired manner and to select or improve a model that can be used to predict future behavior. It is known in the field of neuroscience that regions of the human cortex implement models of, for example, the sensory systems on the surface of the body and the body's orientation and position in its environment. These models are utilized by neural systems to control the interaction of, for example, a hand with a coffee cup, or to maintain an upright posture while standing, walking, or climbing stairs. This approach is similar to model predictive control (Morari and Lee, 1999; Qin and Badgwell, 2003; and Garcia and Prett, 1989), internal model control (Garcie and Morari, 1982), multiple model adaptive control (Athans et al, 1977; Narendra and Balakrishnan, 1997; and Anderson et al, 2001), or to model reference adaptive control (Goodwin and Mayne, 1987; and Landau, 1974), and other known schemes reported in the systems and control literature such as QDES (Boyd et al, 1998), QDMC (Garcia and Morshedi, 1986), nonlinear QDMC (Gattu and Zafiriou, 1992), and LDMC (Morshedi et al. 1985). These methods provide computational techniques and estimation and/or control structures to select or adapt an appropriate model and utilize that model to control or improve the system's behavior with respect to a define measure of the system's performance. The present and related patent applications represent an analogous approach utilizing evolutionary optimization (EO) and one or more artificial neural networks of a population of artificial neural networks to implement and solve a control system application such as the pole balancing problem, a detection problem (such as a data failure) and a classification application. The concept is to preferentially utilize models that accurately predict an observed process's behavior to decide what control actions or decision to apply. A typical method is to monitor an error, or innovations, process as a measure of a system's ability to surprise a model-based prediction of its behavior. Although the model may be out-of-date with the current environment, it may still give some information about how the controller or artificial neural network(s) perform and can this be used to guide the adaptation, modification, or replacement of an artificial neural network using a procedure such as evolutionary optimization (EO). It can be difficult to maintain an accurate model of a complex environment, but it is in general somewhat easier to steadily improve an existing model through its modification or replacement.

All United States and foreign patents and articles whose citations are provided above and below in the Bibliography should be deemed to be incorporated by reference as to their entire contents for the purposes of understanding the underlying technology behind an embodiment of a method and apparatus for constructing an artificial neural network in hardware or software according to the various embodiments of the several related patent applications. The embodiments of a method and apparatus for constructing a neuroscience-inspired artificial neural network architecture described above should only be deemed to be limited by the scope of the claims which follow.

BIBLIOGRAPHY

1) Xin Yao, "Evolving artificial neural networks." *Proceedings of the IEEE,* 87(9):1423-1447. September 1999.
2) David J. Montana and Lawrence Davis, "Training feedforward neural networks using genetic algorithms." *Proceedings of the 11th international joint conference on Artificial intelligence—Volume* 1, pps. 762-767, San Francisco, Calif., USA, 1989, Morgan Kaufmann Publishers Inc.
3) 1). B. Fogel, L. Fogel, and V. Porto, "Evolving neural networks." *Biological Cybernetics,* 63(6): 487-493, 1990.
4) Randall D. Beer and John C. Gallagher. Evolving dynamical neural networks for adaptive behavior," *Adapt. Behav.,* 1(1):91-122, June 1992.
5) A. P. Wieland, "Evolving neural network controllers for unstable systems." *Neural Networks,* 1991, *IJCNN-91-Seattle International Joint Conference on,* volume ii, pages 667-673, July 1991.
6) S. Dominic, R. Das, D. Whitley, and C. Anderson. "Genetic reinforcement learning for neural networks. *Neural Networks.* 1991. *IJCNN-91-Seattle International Joint Conference on,* volume ii, pages 71-76 vol. 2, July 1991.
7) Faustino Gomez, Jürgen Schnidhuber, and Risto Miikkulainen. "Efficient non-linear control through neuroevolution," Johannes Fürnkranz," Tobias Scheffer, and Myra Spiliopoulou, editors, *Machine Learning: ECML* 2006, volume 4212 of *Lecture Notes in Computer Science,* pages 654-662, Springer Berlin/Heidelberg, 2006.
8) Faustino Gomez, Jürgen Schmidlhuber, and Risto Miikkulainen, "Accelerated neural evolution through cooperatively coevolved synapses," *J. Mach. Learn. Res.,* 9: 937-965, June 2008.
9) Dario Floreano, Peter Dürr, and Claudio Mattiussi, "Neuroevolution: from architectures to learning," *Evolutionary Intelligence,* 1(1): 47-62, 2008.
10) Jürgen Branke, "Evolutionary algorithms in neural network design and training—A review," Jarmo T. Alander, editor. *Proc. of the First Nordic Workshop on Genetic Algorithms and their Applications (INWGA),* volume 95-1, pages 145-163, Vaasa, Finland, 1995.
1) D. Whitley. T. Starkweather, and C. Bogart, "Genetic algorithms and neural networks: optimizing connections and connectivity," *Parallel Computing,* 14(3): 347-361, 1990.
12) J. R. Koza and J. P. Rice. "Genetic generation of both the weights and architecture for a neural network. In *Neural Networks,* 1991, *IJCNN-91-Seattle Inter-national Joint Conference on,* volume ii, pages 397-404 vol. 2, July 1991.
13) D. Dasgupta and D. R. McGregor, "Designing application-specific neural networks using the structured genetic algorithm," *Combinations of Genetic Algorithms and Neural Networks,* 1992. *COGANN-92. International Workshop on,* pages 87-96, June 1992.

14) David White and Panos Ligomenides, "Gannet: A genetic algorithm for optimizing topology and weights in neural network design," José Mira, Joan Cabestany, and Alberto Prieto, editors, *New Trends in Neural Computation*, volume 686 of *Lecture Notes in Computer Science*, pages 322-327, Springer Berlin/Heidelberg, 1993.

15) V. Maniezzo. Genetic evolution of the topology and weight distribution of neural networks. *Neural Networks, IEEE Transactions on*, 5(1):39-53, January 1994.

16) P. J. Angeline, G. M. Saunders, and J. B. Pollack, "An evolutionary algorithm that constructs recurrent neural networks." *Neural Networks. IEEE Transactions on*, 5(1): 54-65, January 1994.

17) K. S. Tang. C. Y. Chan, K. F. Man, and S. Kwong. "Genetic structure for nn topology and weights optimization," *Genetic Algorithms in Engineering Systems: Innovations and Applications*. 1995. GALESIA. First International Conference on (Conf. Publ. No. 414), pages 250-255. September 1995.

18) Yong Liu and Xin Yao, "A population-based learning algorithm which learns both architectures and weights of neural networks," *Chinese Journal of Advanced Software Research (Allerton)*, 10011:54-65, 1996.

19) David E. Moriarty and Risto Mikkulainen, "Efficient reinforcement learning through symbiotic evolution," *Machine Learning*, 22(1):11-32, 1996.

20) David E. Moriarty and Risto Miikkulainen, "Forming neural networks through efficient and adaptive coevolution," *Evol. Comput.*, 5(4):373-399, December 1997.

21) Faustino Gomez and Risto Miikkulainen. "2-d pole balancing with recurrent evolutionary networks," *Proceeding of the International Conference on Artificial Neural Networks (ICANN)*, pages 425-430, 1998.

22) Xin Yao and Yong Liu. "A new evolutionary system for evolving artificial neural networks," *Neural Networks. IEEE Transactions on*, 8(3): 694-713, May 1997.

23) Joo Carlos Figueira Pujol and Riccardo Poli, "Evolving the topology and the weights of neural networks using a dual representation," *Applied Intelligence*, 8:73-84, 1998.

24) Hussein A. Abbass, "An evolutionary artificial neural networks approach for breast cancer diagnosis," *Artificial Intelligence in Medicine*, 25(3):265-281, 2002.

25) Kenneth O. Stanley and Risto Miikkulainen, "Evolving neural networks through augmenting topologies," *Evolutionary Computation*. 10(2): 99-127, 2002.

26) K. O. Stanley, B. D. Bryant, and R. Miikkulainen, "Evolving adaptive neural networks with and without adaptive synapses," *Evolutionary Computation*, 2003. CEC '03. *The* 2003 *Congress on*, volume 4, pages 2557-2564, December 2003.

27) Enrique Alba and J. Chicano, "Training neural networks with ga hybrid algorithms," Kalyanmoy Deb, editor, *Genetic and Evolutionary Computation, GECCO* 2004, volume 3102 of *Lecture Notes in Computer Science*, pages 852-863. Springer Berlin/Heidelberg, 2004.

28) J. E. Fieldsend and S. Singh. "Pareto evolutionary neural networks," *Neural Networks, IEEE Transactions on*. 16(2):338-354, March 2005.

29) P. P. Palmes, T. Hayasaka, and S. Usui, "Mutation-based genetic neural network." *Neural Networks, IEEE Transactions on*, 16(3):587-600, May 2005.

30) Y. Kassahun. *Towards a Unified Approach to Learning and Adaptation,"* PhD thesis, Christian-Albrechts-University, Kiel. Germany, February 2006.

31) Nils T. Siebel and Gerald Sommer, "Evolutionary reinforcement learning of artificial neural networks," *Int. J. Hybrid Intell. Syst.*, 4(3):171-183, August 2007.

32) N. T. Siebel, J. Botel, and G. Sommer, "Efficient neural network pruning during neuroevolution, *"Neural Networks*. 2009, *IJCNN* 2009, *International Joint Conference on*, pages 2920-2927, June 2009.

33) Kenneth O. Stanley, David B. D'Ambrosio, and Jason Gauci, "A hypercube-based encoding for evolving large-scale neural networks," *Artificial Life*, 15(2):185-212, 2009.

34) Jason Gauci and Kenneth O. Stanley, "Autonomous evolution of topographic regularities in artificial neural networks," *Neural Computation*, 22(7):1860-1898, 2010.

35) Henry Markram, Wulfram Gerstner, and Per Jesper Sjöström, "A history of spike-timing-dependent plasticity," *Frontiers in Synaptic Neuroscience*, 3:4, 2011.

36) Randall D. Beer, "On the dynamics of small continuous-time recurrent neural networks," *Adaptive Behavior*, 3(4): 469-509, 1995.

37) Randall D. Beer, "The dynamics of adaptive behavior: A research program," *Robotics and Autonomous Systems*, 20(2-4):257-289, 1997, ice:title; Practice and Future of Autonomous Agents.

38) John C. Gallagher and Saranyan Vigraham, "A modified compact genetic algorithm for the intrinsic evolution of continuous time recurrent neural networks," *Proceedings of the Genetic and Evolutionary Computation Conference*, GECCO '02, pages 163-170, San Francisco, Calif. USA, 2002, Morgan Kaufmann Publishers Inc.

39) P. Merolla. J. Arthur, F. Akopyan. N. Imam, R. Manohar, and D. S. Modha, "A digital neurosynaptic core using embedded crossbar memory with 45pj per spike in 45 nm," *Custom Integrated Circuits Conference (CICC)* 2011 *IEEE*, pages 1-4, September 2011.

40) Robert Preissl, Theodore M. Wong, Pallab Datta, Myron Flickner, Raghavendra Singh, Steven K. Esser, William P. Risk, Horst D. Simon, and Dharmendra S. Modha. "Compass: a scalable simulator for an architecture for cognitive computing," *Proceedings of the International Conference on High Performance Computing, Networking. Storage and Analysis*, SC '12, pages 54:1-54:11, Los Alamitos, Calif., USA, 2012. IEEE Computer Society Press.

41) Nadav Kashtan, Uri Alon, and Jr. Callan, Curtis G., "Spontaneous evolution of modularity and network motifs," *Proceedings of the National Academy of Sciences of the United States of America*, 102(39): pp. 13773-13778, 2005.

42) T. Caelli. Ling Guan, and W. Wen, "Modularity in neural computing," *Proceedings of the IEEE*, 87(9): 1497-1518, September 1999.

43) Sung-Bae Cho and K. Shimohara, "Modular neural networks evolved by genetic programming," *Evolutionary Computation*, 1996, *Proceedings of IEEE International Conference on*, pages 681-684, May 1996.

44) N. Garcia-Pedrajas, C. Hervas-Martinez, and J. Munoz-Perez. "Covnet: a cooperative coevolutionary model for evolving artificial neural networks," *Neural Network, IEEE Transactions on*, 14(3): 575-596, May 2003.

45) N. Garcia-Pedrajas, C. Hervas-Martinez, and D. Ortiz-Boyer. Cooperative coevolution of artificial neural network ensembles for pattern classification," *Evolutionary Computation, IEEE Transactions on*, 9(3):271-302, June 2005.

46) Joseph Reisinger, Kenneth O. Stanley, and Risto Miikkulainen, "Evolving reusable neural modules. In *Proceedings of the Genetic and Evolutionary Computation Conference*, 2004, 47) Gregory S. Hornby, "Measuring, enabling and comparing modularity, regularity and hierarchy in evolutionary 48) Takumi Kamioka, Eiji Uchibe, and Kenji Doya, "Neuroevolution based on reusable and hierarchical modular representation." *Proc. 15th Int. Conf. Advances in Neuro-Information Processing, Part I (ICONIP '08)*, pages 22-31. Berlin, Heidelberg: Springer-Verlage, 2009.
49) Xin Yao and M. M. Islam, "Evolving artificial neural network ensembles." *Computational Intelligence Magazine, IEEE*, 3(1): 31-42, February 2008.
50) S. Singh, A. Barto, and N. Chentanez, "Intrinsically motivated reinforcement learning," 18*th Annual Conference on Neural Information Processing Systems (NIPS)*, 2004.
51) Jeff Hawkins et al. "Sequence memory for prediction, inference and behavior," *Phil. Trans. Royal Soc. B*, pp. 1203-1209, 2009
52) Glackin et al., "A Novel Approach for the Implementation of Large Scale Spiking Neural Networks on FPGA Hardware," *IWANN* 2005, LNCS 3512, pp. 552-563, 2005.
53) Cassidy et al., "FPGA Based Silicon Spiking Neural Array," *Biomedical Circuits and Systems Conference* (BIOCAS 2007), pp. 75-78, IEEE, 2007.
54) Cassidy et al., "Cognitive Computing Building Block: A Versatile and Efficient Digital Neuron Model for Neurosynaptic Cores," *IBM Research*, 2013.
55) Sharp et al. "Power-efficient simulation of detailed cortical microcircuits on SpiNNaker," *Journal of Neuroscience Methods*, 201, pp. 110-118, 2012.
56) M. Anthony Lewis et al., "Control of a robot leg with an adaptive a(nalog) VLSI CPG chip," *Neurocomputing*, 38-40, 2001, pp. 1409-1421.
57) M. Anthony Lewis et al., "CPG Design Using Inhibitory Networks," *Proc. of the 2005 IEEE International Conference on Robotics and Automation*, (ICRA 2005), pp. 3682-3687, 20(15.
58) Simon Friedmann et al., "Reward-based learning under hardware constraints—using a RISC processor embedded in a neuromorphic substrate," *Frontiers in Neuroscience*, 7, p. 160, 2013.
59) B. V. Benjamin et al., "Neurogrid: A mixed-analog-digital multichip system for large-scale neural simulations." *Proceedings of the IEEE*, 102, pp. 699-716, 2014.
60) Giacomo Indiveri et al., "Neuromorphic silicon neuron circuits." *Frontiers in Neuroscience*, 5, 2011.
61) Preiss et al. "Compass: A scalable simulator for an architecture for cognitive computing," *Proceedings of the International Conference on High Performance Computing, Networking, Storage and Analysis*, p. 54. IEEE Computer Society Press, 2012.
62) U.S. Pat. No. 7,533,071, entitled "Neural Modeling and Brain-based Devices Using Special Purpose Processor" and issued to Snook on May 12, 2009.
63) U.S. Pat. No. 8,311,965 entitled "Area Efficient Neuromorphic Circuits Using Field Effect Transistors and Variable Resistance Material" issued to Breitwisch et al., Nov. 13, 2012.
64) U.S. Pat. No. 8,433,665 entitled "Methods and Systems for Three-Memristor Synapse with STDP and Dopamine Signaling" issued to Tang et al. Apr. 30, 2013.
62) U.S. Pat. No. 8,510,239 entitled "Compact Cognitive Synaptic Computing Circuits with Crossbar Arrays Spatially in a Staggered Pattern" issued to Dharmendra S. Modha, Aug. 13, 2013.
63) U.S. Pat. No. 8,515,885 entitled "Neuromorphic and Synaptronic Spiking Neural Network with Synaptic Weights Learned Using Simulation" issued to Modha, Aug. 20, 2013.
63) U.S. Pat. No. 8,600,919 entitled "Circuits and Methods Representative of Spike Timing Dependent Plasticity of Neurons," to Poon et al., Dec. 3, 2012.
64) U.S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass.
65) U.S. Published Patent Application No. 2012/0036099 entitled "Methods and Systems for Reward-Modulated Spike-Timing-Dependent Plasticity" on Feb. 9, 2012, to Venkatraman et al.
66) U.S. Published Patent App. No. 2012/0109863 entitled "Canonical Spiking Neuron Network for Spatiotemporal Associative Memory," on May 3, 2012, to Esser et al.
68) U.S. Published Patent App. No. 2013/0073497 entitled "Neuromorphic Event-Driven Neural Computer Architecture in a Scalable Neural Network" on Mar. 21, 2013, to Filipp Akopyan et al.
69) WO Patent App. 2004/027704 published Apr. 1, 2004, entitled "Spiking Neural Network Device." by Dario.
70) Abbass, Hussein A., Michael Towsey, and G. Finn. "C-Net: A method for generating non-deterministic and dynamic multivariate decision trees." *Knowledge and Information Systems* 3.2 (2001): 184-197.
(71) Belatreche, Ammar, Liam P. Maguire, and Martin McGinnity. "Advances in design and application of spiking neural networks." *Soft Computing* 11.3 (2007): 239-248.
(72) Bohte, Sander M., Joost N. Kok, and Han La Poutre. "Error-backpropagation in temporally encoded networks of spiking neurons." *Neurocomputing* 48.1 (2002): 17-37.
(73) Garcia-Pedrajas, Nicolás, Domingo Ortiz-Boyer, and César Hervás-Martinez. "An alternative approach for neural network evolution with a genetic algorithm: Crossover by combinatorial optimization." *Neural Network* 19.4 (2006): 514-528.
(74) Jin, Yaochu, Ruojing Wen, and Bernhard Sendhoff. "Evolutionary multi-objective optimization of spiking neural networks." *Artificial Neural Networks—ICANN* 2007. Springer Berlin Heidelberg, 2007, 370-379.
(75) Mangasarian, Olvi L., R. Setiono, and W. H. Wolberg. "Pattern recognition via linear programming: Theory and application to medical diagnosis." *Large-scale numerical optimization* (1990): 22-31.
(76) Michie, Donald, David J. Spiegelhalter, and Charles C. Taylor. "Machine learning, neural and statistical classification." (1994).
(77) Parekh, Rajesh, Jihoon Yang, and Vasant Honavar. "Constructive neural-network learning algorithms for pattern classification." *Neural Networks, IEEE Transactions on* 11.2 (2000): 436-45.
(78) Pavlidis, N. G., et al. "Spiking neural network training using evolutionary algorithms." *Neural Networks*, 2005, *IJCNN'05, Proceedings. 2005 IEEE International Joint Conference on*, Vol. 4., IEEE, 2005.
(79) Setiono, Rudy, and Lucas Chi Kwong Hui. "Use of a quasi-Newton method in a feedforward neural network construction algorithm." *Neural Networks, IEEE Transactions on* 6.1 (1995): 273-277.
(80) Moore, Kendra E., and lack C. Chiang. "ALPHA/Sim: ALPHA/Sim simulation software tutorial." *Proceedings* of the 32nd conference on Winter simulation, pp. 259-267. Society for Computer Simulation International, 2000.
(81) Poor, H. Vincent, and Olympia Hadjiliadis. *Quickest detection*, Vol. 40, Cambridge: Cambridge University Press, 2009.
(82) Trees, Van, and L. Harry. *Detection, Estimation, and Motivation Theory-Part 1-Detection. Estimation, and Linear Modulation Theory*, John Wiley & Sons, 2001.
(83) F. Rosenblatt, "The perception: A probabilistic model for information storage and organization in the brain." *Psychological Review.* 65(6): 386-408, 1958.
(84) Fogel, David B., Eugene C. Wasson III, and Edward M. Boughton. "Evolving neural networks for detecting breast cancer." *Cancer letters*, 96.1, pp. 49-53 (1995).
(85) Boyd, Stephen P., Venkataramanan Balakrishnan, Craig H. Barratt, Nasser M. Khraishi, Xiaoming Li, David G. Meyer, and Stephen A. Norman. "A new CAD method and associated architectures for linear controllers." *IEEE Transactions on Automatic Control*, 33, no. 3, pp. 268-283, 1988.
(86) Garcia, Carlos E., and A. M. Morshedi. "Quadratic programming solution of dynamic matrix control (QDMC)." *Chemical Engineering Communications* 46, no. 1-3, pp. 73-87, 1986.
(87) Athans. Michael, David Castanon, K-P. Dunn, C. Greene, Wing Lee, N. Sandell Jr, and Alan S. Wilisky. "The stochastic control of the F-8C aircraft using a multiple model adaptive control (MMAC) method—Part I: Equilibrium flight." *IEEE Transactions on Automatic Control*, 22, no. 5, pp. 768-780, 1977.
(88) Narendra, Kumpati S., and Jeyendran Balakrishnan. "Adaptive control using multiple models." *IEEE Transactions on Automatic Control*, 42, no. 2, pp. 171-187, 1997.
(89) Anderson. Brian, Thomas Brinsmead, Daniel Liberzon, and A. Stephen Morse. "Multiple model adaptive control with safe switching." *International journal of adaptive control and signal processing* 15, no. 5, pp. 445-470, 2001.
(90) Morshedi, A. M., C. R. Cutler, and T. A. Skrovanek. "Optimal Solution of Dynamic Matrix Control with Linear Programming Techniques (LDMC)," *Proc. American Control Conference*, pp. 199-208, 1985.
(91) Gattu, Gangadhar, and Evanghelos Zafiriou. "Nonlinear quadratic dynamic matrix control with state estimation." *Industrial & engineering chemistry research* 31, no. 4, pp. 1096-1104, 1992.
(92) Morari. Manfred, and Jay H Lee. "Model predictive control: past, present and future." *Computers & Chemical Engineering* 23, no. 4, pp. 667-682, 1999.

REFERENCES AUTHORED BY INVENTORS

1) C. D. Schuman and J. D. Birdwell, "Dynamic Artificial Neural Networks with Affective Systems," *PLOS ONE*, vol. 8, is. 11, pp. 1-16, 2013.
2) C. D). Schuman, J. D. Birdwell and M. E. Dean. "Spatiotemporal Classification Using Neuroscience-Inspired Dynamic Architectures." *Biologically Inspired Cognitive Architectures*, pp. 1-9, 2014.
(3) Schuman, Catherine D., and J. Douglas Birdwell. "Variable structure dynamic artificial neural networks." *Biologically Inspired Cognitive Architectures* 6 (2013): 126-130.
(4) Dean, Mark E., Catherine D. Schuman, and J. Douglas Birdwell. "Dynamic Adaptive Neural Network Array." *Unconventional Computation and Natural Computation.* Springer International Publishing, 2014, 129-141.
(5) Schuman, Catherine D., J. Douglas Birdwell, and Mark Dean. "Neuroscience-inspired dynamic architectures." *Biomedical Science and Engineering Center Conference (BSEC)*, 2014 Annual Oak Ridge National Laboratory. IEEE, 2014.
(6) Drouhard. Margaret, Catherine D. Schuman, J. Douglas Birdwell, and Mark E. Dean. "Visual Analytics for Neuroscience-Inspired Dynamic Architectures," *IEEE Symposium Series on Computational Intelligence*, 2014.

What we claim is:

1. A method of detecting a change in an input stream via sensing events to a spiking neural network for one of a control, detection and classification application using a processor apparatus, the processor apparatus comprising a special purpose processor and memory and executing a special purpose stored program for the one of the control, the detection and the classification application, the method comprising:
   constructing at least one spiking neural network in the memory, the at least one spiking neural network comprising at least one input neuron and at least one output neuron, each neuron having a threshold parameter;
   defining at least one synapse between a pair of neurons of the spiking neural network, one neuron comprising a source neuron and the other neuron comprising a destination neuron, the synapse having a parameter that specifies a propagation delay through the synapse, the synapse permitting at least two discrete events to propagate together through the synapse from the source neuron to the destination neuron;
   executing the stored program in the special purpose processor, the execution resulting in the simulation of the at least one spiking neural network, the simulation causing the at least one spiking neural network to produce at least one output event at an output neuron in response to said input stream;
   evolutionary optimization of the at least one spiking neural network comprising a crossover operation, said crossover operation comprising selection of parent neural networks; selection of two randomly chosen neurons from at least one of said selected parent neural networks; choosing a plane using locations of the selected two randomly chosen neurons of the at least one selected parent neural network; and using a signed distance from the chosen plane to a third neuron from the at least one selected parent neural network to construct two child neural networks; assigning the third neuron to the first child network if the signed distance is non-negative and otherwise to the second child network; and
   mutation comprising structural pruning of the at least one spiking neural network by pruning at least one of a neuron and a synapse based upon at least one of existing connections and activity.

2. The method of claim 1 additionally comprising:
   evaluating the performance of the at least one spiking neural network by (a) examining the events in the input stream to detect changes in the input stream, and one of (b) comparing the behavior of one of a physical system and of a process in response to output events to a desired behavior and (c) comparing classification error rates to desired error rates; and
   using the spiking neural network and performance evaluation to create at least one new spiking neural network.

3. The method of claim 2 being repeated at least once to obtain a third spiking neural network such that said third spiking neural network performs better than the new spiking neural network first constructed responsive to the performance evaluation.

4. The method of claim 1, each neuron having a spatial position in the at least one spiking neural network, the delay associated with a synapse connecting two neurons being dependent upon the relative spatial positions of the two neurons.

5. The method of claim 4 wherein the spatial positions of the neurons are positions in an N-dimensional coordinate system and N is at least two.

6. The method of claim 1 wherein the delay parameter of the synapse is determined by a distance from the source neuron to the destination neuron.

7. The method of claim 1 wherein the application is a detection application, the input stream is a stream of discrete events and the method further comprises detecting a change in an arrival rate of discrete events.

8. The method of claim 1 wherein the at least one synapse has a second parameter specifying a weight that is applied to a destination neuron that receives an event traversing the synapse.

9. The method of claim 1 wherein each neuron has a parameter specifying a refractory period and wherein, once a neuron fires, the neuron is prevented from firing again until after a time has elapsed equal to the refractory period of the neuron.

10. The method of claim 1 wherein the at least one spiking neural network comprises at least two spiking neural networks constructed in the memory and each of the at least two spiking neural networks has at least one defined synapse, and the performances of the at least two spiking neural networks are evaluated and compared, said evaluation and comparison causing at least one new spiking neural network to be constructed.

11. The method of claim 10 wherein said at least one new spiking neural network is constructed by modification of one of said at least two spiking neural networks.

12. The method of claim 10 wherein said construction of said at least two spiking networks results in a third spiking neural network stored in the memory using information obtained from the said at least two spiking neural networks.

13. The method of claim 10 wherein said construction of said at least two spiking neural networks comprises identifying a useful substructure for performing a particular sub-task of one of said at least two spiking neural networks, forming a new spiking neural network using the previously identified useful substructure and forming at least a portion of the new spiking neural network to perform a task comprising the particular sub-task, the new spiking neural network comprising the identified useful substructure.

14. The method of claim 1, the method further comprising:
connecting an affective system to said at least one spiking neural network wherein the affective system is designed to alter the behavior of the at least one spiking neural network, and
executing the stored program in the processor apparatus responsive to the connected affective system, the execution resulting in the simulation of the at least one spiking neural network and the affective system, the simulation causing the at least one spiking neural network to produce at least one output event at an output neuron in response to said input stream.

15. The method of claim 14 wherein the affective system is also a spiking neural network.

16. The method of claim 14 wherein the affective system regulates the firing rate of the at least one spiking neural network in order to limit the power consumed by the at least one spiking neural network.

17. The method of claim 14 wherein the affective system regulates the firing rate of the at least one spiking neural network in order to achieve a desirable output of the at least one spiking neural network in response to a change in a characteristic of the input stream.

18. The method of claim 17 wherein the input stream is a stream of events and said characteristic is the arrival rate of events.

19. The method of claim 14, wherein the affective system has first and second different parameter values.

20. The method of claim 14, wherein the affective system has first, second and third different parameter values.

21. The method of claim 14 further comprising connecting a second, different affective system to the at least one spiking neural network.

22. The method of claim 1, the method further comprising:
the at least one spiking neural network having a variable time period between discrete events.

23. The method of claim 22, the method further comprising
analyzing at least one causality neural pathway from a source neuron to a destination neuron in time units different from real time.

24. The method of claim 22, the method additionally comprising
evaluating the performance of the at least one spiking neural network by comparing times of output events to times of changes in detected events in a detection application; and
using the at least one spiking neural network and performance evaluation to create at least one new spiking neural network.

25. The method of claim 1 wherein the application is a control application and the input stream is a stream of events responsive to one of a position and a change in a position of a physical object, and wherein said at least one output event causes a force to be exerted on said physical object in order to cause said physical object to move in a desired manner.

26. The method of claim 1 wherein the application is a detection application and the input stream is a stream of events wherein at least one event at a neuron corresponds to a detection of an anomaly that is indicated by a change in an arrival rate of the stream of events.

27. The method of claim 1 wherein the application is a classification application and the input stream is representative of the intensity values of pixels of an image and wherein said at least one output event corresponds to the classification of at least a portion of said image.

28. The method of claim 1 wherein the at least one synapse has a second parameter specifying a weight that is applied to a destination neuron that receives an event traversing the synapse.

29. The method of claim 1 wherein the application comprises classification and the classification application comprises the processor apparatus determining that a substructure of the at least one spiking neural network is a useful substructure for use in classification.

30. The method of claim 29 further comprising identifying said useful substructure by analysis of at least one causality path in said at least one spiking neural network.

31. The method of claim 30 further comprising identifying said useful substructure as a substructure of said at least one spiking neural network for identifying a portion of an image.

32. The method of claim 29 wherein the classification application comprises the processor generating a new spiking neural network from a plurality of determined useful substructures.

33. The method of claim 32 wherein the plurality of determined useful substructures comprises different useful substructures, each such substructure for performing a subtask of a classification application task.

34. The method of claim 33 wherein the classification application further comprises generating a new spiking neural network from the plurality of different useful substructures.

35. The method of claim 1, wherein the application comprises a classification application and the classification application comprises one of the recognition of at least a portion of a hand-written image, the recognition of at least one line in space, the diagnosis of a disease and the recognition of a biological item.

36. The method of claim 1 wherein the application comprises a classification application and the method further comprises using a voting scheme to determine a classification.

37. The method of claim 36 wherein the voting scheme is used to classify one of a portion of an image, a line in space, a diagnosis of a disease and the recognition of a biological item.

38. The method of claim 1 wherein the construction of the at least one spiking neural network comprises determining a causality path in a different spiking neural network from a source neuron to a destination neuron to detect a useful substructure and constructing a new spiking neural network that contains the useful substructure.

39. The method of claim 38 wherein the useful substructure is stored in a library of a plurality of different useful substructures, two different substructures for recognizing at least two different classes of events and the constructed spiking neural network comprising the two different substructures for recognizing the two classes of events.

40. The method of claim 1 further comprising a learning method employing one of a tournament and a roulette method to select a child population of spiking neural networks of a parent population of spiking neural networks.

41. The method of claim 40, the learning method comprising selecting first and second parent neural networks.

42. The method of claim 41, the learning method comprising selecting a child population of two child neural networks comprising spiking neural networks responsive to one of crossover and mutation responsive to the selection of first and second parent spiking neural networks.

43. The method of claim 1, wherein the application comprises one of a classification application and a detection operation and wherein said execution operates in real-time with respect to one of a physical system and an external process.

44. The method of claim 1 wherein the propagation delay parameter is programmable.

45. The method of claim 1 further comprising construction of a second spiking neural network and a parallel implementation of a first spiking neural network with the second spiking neural network.

46. Apparatus adapted to detect a change in an input stream via sensing events to a spiking neural network for one of a control, detection and classification application, the apparatus comprising special purpose processor apparatus, the apparatus further comprising a memory, the special purpose processor for executing a special purpose stored program for the one of the control, the detection and the classification application, the apparatus further comprising:
the special purpose processor constructing at least one spiking neural network in the memory, the at least one spiking neural network comprising at least one input neuron and at least one output neuron, each neuron having a threshold parameter;
the special purpose processor defining at least one synapse between a pair of neurons of the at least one spiking neural network, one neuron comprising a source neuron and the other neuron comprising a destination neuron, the synapse having a parameter that specifies a propagation delay through the synapse, the synapse permitting at least two discrete events to propagate together through the synapse from the source neuron to the destination neuron; and
the special purpose processor executing the special purpose stored program, the execution resulting in simulation of the at least one spiking neural network, the simulation causing the at least one spiking neural network to produce at least one output event at an output neuron in response to said input stream;
the special purpose processor for further executing evolutionary optimization of the at least one spiking neural network comprising a crossover operation, said crossover operation comprising selection of parent neural networks; selection of two randomly chosen neurons from at least one of said selected parent neural networks; choosing a plane using locations of the selected two randomly chosen neurons of the at least one selected parent neural network; and using a signed distance from the chosen plane to a third neuron from the at least one selected parent neural network to construct two child neural networks, assigning the third neuron to the first child network if the signed distance is non-negative and otherwise to the second child network; and
a mutation operation comprising structural pruning of the at least one spiking neural network by pruning at least one of a one neuron and a synapse based upon at least one of existing connections and activity.

47. The apparatus of claim 46 further comprising:
the special purpose processor evaluating the performance of the at least one spiking neural network by (a) examining the events in the input stream to detect changes in the input stream, and one of (b) comparing the behavior of one of a physical system and of a process in response to output events to a desired behavior and (c) comparing classification error rates to desired error rates; and
the special purpose processor using the at least one spiking neural network and performance evaluation to create at least one new spiking neural network.

48. The apparatus of claim 47 wherein the special purpose processor repeats the performance evaluation at least once to obtain a third spiking neural network such that said third spiking neural network performs better than the new spiking neural network first constructed responsive to the performance evaluation.

49. The apparatus of claim 46, each neuron having a spatial position in the at least one spiking neural network, the delay associated with a synapse connecting two neurons being dependent upon the relative spatial positions of the two neurons.

50. The apparatus of claim 49, wherein the spatial positions of the neurons are positions in an N-dimensional coordinate system and N is at least two.

51. The apparatus of claim 46 wherein the delay parameter of the synapse is determined by a distance from the source neuron to the destination neuron.

52. The apparatus of claim 46 wherein the application is a detection application, the input stream being a stream of events and the special purpose processor detects a change in an arrival rate of the events at the input neuron.

53. The apparatus of claim 46 wherein the at least one synapse has a second parameter specifying a weight that is applied to a destination neuron that receives an event traversing the synapse.

54. The apparatus of claim 46 wherein each neuron has a parameter specifying a refractory period and wherein once a neuron fires the neuron is prevented from firing again until after a time has elapsed equal to the refractory period of the neuron.

55. The apparatus of claim 46, the special purpose processor for constructing at least two spiking neural networks in the memory, each of the at least two spiking neural networks having at least one defined synapse, and the special purpose processor comparing and evaluating the performances of the at least two spiking neural networks, said comparison and evaluation causing the processor to construct at least one new spiking neural network.

56. The apparatus of claim 55 wherein said at least one new spiking neural network is constructed by the special purpose processor modifying one of said at least two spiking neural networks.

57. The apparatus of claim 55 wherein said construction of said at least two spiking networks results in a third spiking neural network stored in the memory using information obtained from the said at least two spiking neural networks.

58. The apparatus of claim 55 wherein said construction of said at least two spiking neural networks comprises the special purpose processor identifying a useful substructure for performing a particular sub-task of one of said at least two spiking neural networks, forming a new spiking neural network using the previously identified useful substructure and forming at least a portion of the new spiking neural network to perform a task comprising the particular sub-task, the new spiking neural network comprising the identified useful substructure.

59. The apparatus of claim 46, the special purpose processor further connecting an affective system to said at least one spiking neural network wherein the affective system is designed to alter the behavior of the at least one spiking neural network, and executing the stored program responsive to the connected affective system, the execution resulting in the simulation of the at least one spiking neural network and the affective system, the simulation causing the spiking neural network to produce at least one output event at an output neuron in response to said input stream.

60. The apparatus of claim 59 wherein the connected affective system is also a spiking neural network.

61. The apparatus of claim 59 wherein the connected affective system regulates the firing rate of the at least one spiking neural network in order to limit the power consumed by the at least one spiking neural network.

62. The apparatus of claim 59 wherein the connected affective system regulates the firing rate of the at least one spiking neural network in order to achieve a desirable output of the at least one spiking neural network in response to a change in a characteristic of the input stream.

63. The apparatus of claim 62 wherein the input stream is a stream of events and said characteristic is the arrival rate of events.

64. The apparatus of claim 59, wherein the connected affective system has first and second different parameter values.

65. The apparatus of claim 59, wherein the connected affective system has first, second and third different parameter values.

66. The apparatus of claim 59, the processor further connecting a second, different affective system to the at least one spiking neural network.

67. The apparatus of claim 46, the at least one spiking neural network having a variable time period between discrete events.

68. The apparatus of claim 67, the processor for further analyzing at least one causality neural pathway from a source neuron to a destination neuron in time units different than real time.

69. The apparatus of claim 67, the processor for evaluating the performance of the spiking neural network by comparing times of output events to times of changes in detected events in a detection application and using the at least one spiking neural network and performance evaluation to create at least one new spiking neural network.

70. The apparatus of claim 46 wherein the application is a control application and the input stream is a stream of events responsive to one of a position and a change in a position of a physical object, and wherein said at least one output event causes a force to be exerted on said physical object in order to cause said physical object to move in a desired manner.

71. The apparatus of claim 46 wherein the application is a detection application and the input stream is a stream of events wherein at least one event at a neuron corresponds to a detection of an anomaly that is indicated by a change in an arrival rate of the stream of events.

72. The apparatus of claim 46 wherein the application is a classification application and the input stream is representative of the intensity values of pixels of an image and wherein said at least one output event corresponds to the classification of at least a portion of said image.

73. The apparatus of claim 46 wherein the at least one synapse has a second parameter specifying a weight that is applied to a destination neuron that receives an event traversing the synapse.

74. The apparatus of claim 46 wherein the application comprises classification and the classification application comprises the processor apparatus determining that a substructure of the at least one spiking neural network is a useful substructure for use in classification.

75. The apparatus of claim 74 further comprising identifying said useful substructure by analysis of at least one causality path in said at least one spiking neural network for use in classification.

76. The apparatus of claim 75 further comprising identifying said useful substructure as a substructure of a spiking neural network for identifying a portion of an image.

77. The apparatus of claim 74 wherein the classification application comprises the processor generating a new spiking neural network from a plurality of determined useful substructures.

78. The apparatus of claim 77 wherein the plurality of determined useful substructures comprise different useful substructures, each such substructure for performing a sub-task of a classification application.

79. The apparatus of claim 77 wherein the application further comprises generating a new spiking neural network from a plurality of useful substructures.

80. The apparatus of claim 46, wherein the application comprises a classification application and the classification application comprises one of the recognition of at least a portion of a hand-written image, the recognition of at least one line in space, the diagnosis of a disease and the recognition of a biological item.

81. The apparatus of claim 46 wherein the application comprises a classification application and the method further comprises using a voting scheme to determine a classification.

82. The apparatus of claim 81 wherein the voting scheme is used to classify one of a portion of an image, a line in space, a diagnosis of a disease and the recognition of a biological item.

83. The apparatus of claim 46 wherein the construction of at least one spiking neural network comprises determining a causality path in a different spiking neural network from a source neuron to a destination neuron to detect a useful substructure and constructing a new spiking neural network that contains at least one said useful substructure.

84. The apparatus of claim 83 wherein the useful substructure is stored in a library of a plurality of different substructures, two different substructures for recognizing at least two different classes of events and the constructed at least one spiking neural network comprises the two different substructures for recognizing the at least two different classes of events.

85. The apparatus of claim 46 further comprising a learning method employing one of a tournament and a roulette method to select a child spiking neural network population.

86. The apparatus of claim 85, the learning method comprising selecting first and second parent networks from a plurality of parent spiking neural networks fitting a fitness function.

87. The apparatus of claim 86, the learning method comprising selecting a child network population responsive to one of crossover and mutation responsive to the selecting of first and second parent spiking neural networks.

88. The apparatus of claim 46, wherein the application comprises one of a classification application and a detection operation and wherein said execution operates in real-time with respect to one of a physical system and an external process.

89. The apparatus of claim 46 wherein the propagation delay parameter is programmable.

\* \* \* \* \*